US007765197B2

(12) United States Patent (10) Patent No.: US 7,765,197 B2
Fujiyama et al. (45) Date of Patent: *Jul. 27, 2010

(54) SYSTEM AND METHOD FOR PRODUCING DATA REPLICA

(75) Inventors: Kenichirou Fujiyama, Tokyo (JP); Nobutatsu Nakamura, Tokyo (JP); Ryuichi Hiraike, Tokyo (JP)

(73) Assignee: NEC Corporation, Tokyo (JP)

( * ) Notice: Subject to any disclaimer, the term of this patent is extended or adjusted under 35 U.S.C. 154(b) by 355 days.

This patent is subject to a terminal disclaimer.

(21) Appl. No.: 11/460,837

(22) Filed: Jul. 28, 2006

(65) Prior Publication Data

US 2007/0179929 A1 Aug. 2, 2007

(30) Foreign Application Priority Data

Jan. 27, 2006 (JP) ............................. 2006-018713

(51) Int. Cl.
*G06F 7/00* (2006.01)
(52) U.S. Cl. ...................... 707/703; 707/769; 707/999.2
(58) Field of Classification Search ............... 707/1–10, 707/101, 200, 999.2, 769, 703
See application file for complete search history.

(56) References Cited

U.S. PATENT DOCUMENTS

| | | | | |
|---|---|---|---|---|
| 6,088,694 | A * | 7/2000 | Burns et al. ..................... | 707/1 |
| 7,065,538 | B2 * | 6/2006 | Aronoff et al. .................. | 707/1 |
| 7,461,103 | B2 * | 12/2008 | Aronoff et al. .................. | 707/1 |
| 7,640,276 | B2 * | 12/2009 | Watanabe et al. ............... | 707/1 |
| 2002/0049776 | A1 * | 4/2002 | Aronoff et al. ................ | 707/200 |
| 2007/0179963 | A1 * | 8/2007 | Fujiyama et al. ............. | 707/101 |

FOREIGN PATENT DOCUMENTS

| | | | |
|---|---|---|---|
| JP | 60-237551 A | 11/1985 | |
| JP | 6-19756 A | 1/1994 | |
| JP | 7-162517 A | 6/1995 | |
| JP | 9-259024 | 10/1997 | |
| JP | 2002-108681 A | 4/2002 | |
| JP | 2003-108423 A | 4/2003 | |
| JP | 2003-167684 A | 6/2003 | |
| JP | 2005-165610 A | 6/2005 | |
| JP | 2005-267216 A | 9/2005 | |

OTHER PUBLICATIONS

DeFago et al., "Totally Ordered Broadcast and Multicast Algorithms: A Comprehensive Survey", Technical Report DSC, Ecole Polytechnique Federale de Lausanne, pp. 1-52 (2000).
Fujiyama et al.; "Enhanced Java-API for Synchronous Database Replication"; Information Processing Society of Japan, 67th National Convention, Internet Systems Research Laboratories, NEC Corporation.
Fujiyama et al.; Enhanced Database Connection API for Synchronous Data Replicationi between Different Database Softwares; FIT 2005 the 4th Information Science and Technology Forum, C-031, 2006, Internet Systems Research Laboratories, NEC Corp.
Lawrence Snyder; "Introduction to the Configurable, Highly Parallel Computer"; IEEE, Jan. 1982.
Fujiyama et al.; "High-Available Database Transaction Management Framework on Cluster"; The Institute of Electronics, Information and Communication Engineers—IEICE Technical Report CPSY2005-20(Aug. 2005), vol. 105, No. 226.

* cited by examiner

*Primary Examiner*—Mohammad Ali
*Assistant Examiner*—John P Hocker
(74) *Attorney, Agent, or Firm*—Dickstein, Shapiro, LLP.

(57) ABSTRACT

In a method of producing a data replica, data processing requests are issued from application programs running in application servers. Data processing corresponding to each of the data processing requests is executed in each of database servers, and a result of the data processing is replied as a response to one of the application programs which has issued the data processing request. The supply of the data processing requests to the database servers is controlled to keep the process order of the requests between the database servers.

16 Claims, 44 Drawing Sheets

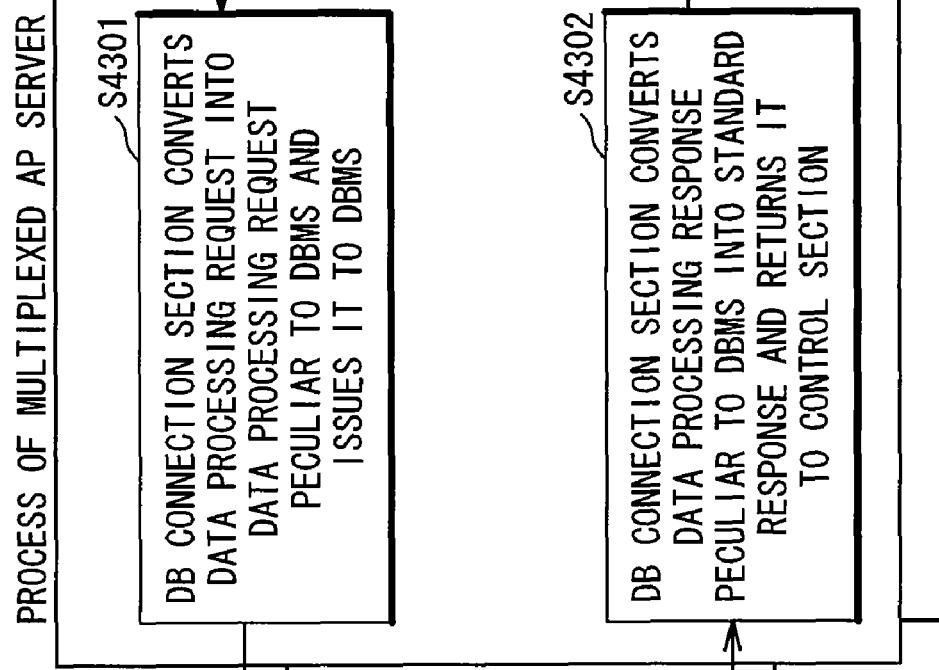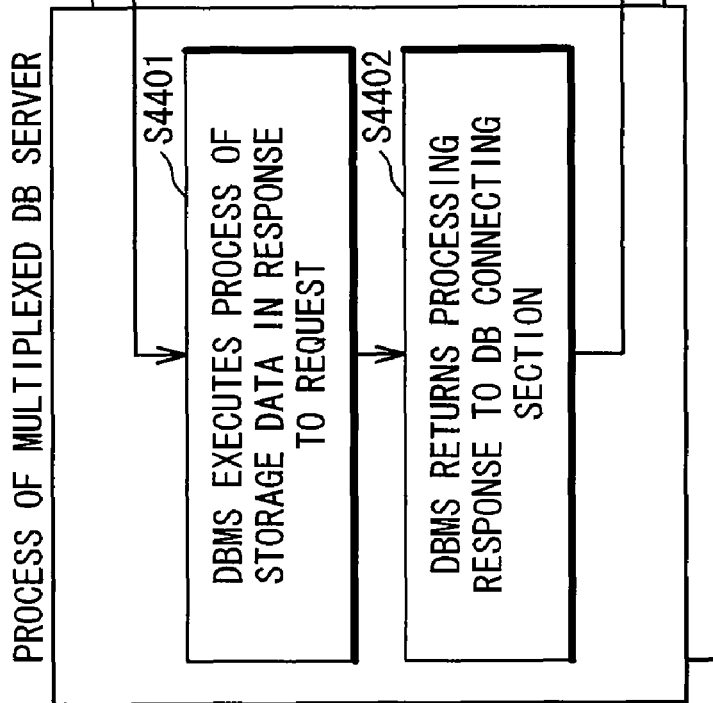

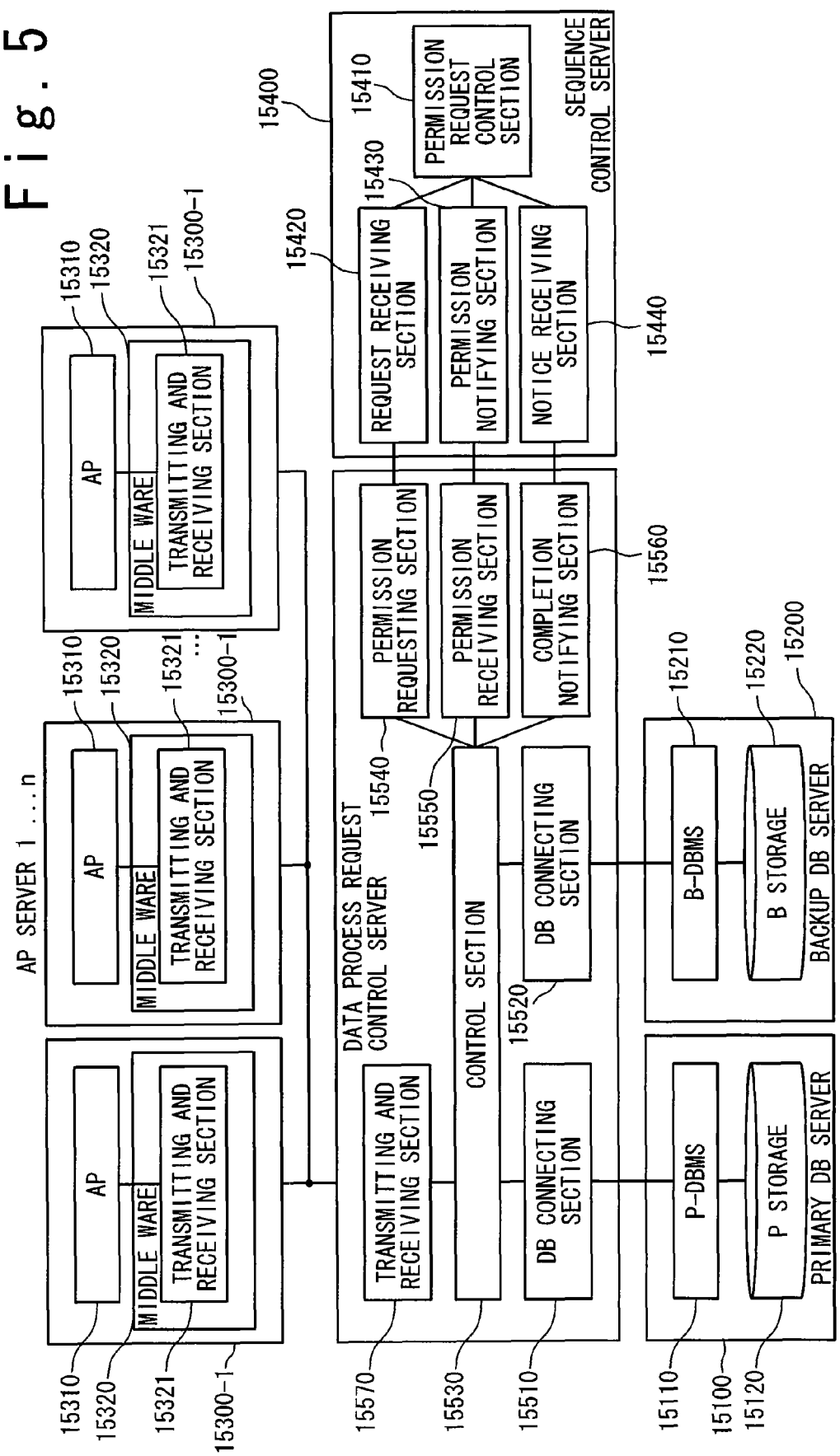

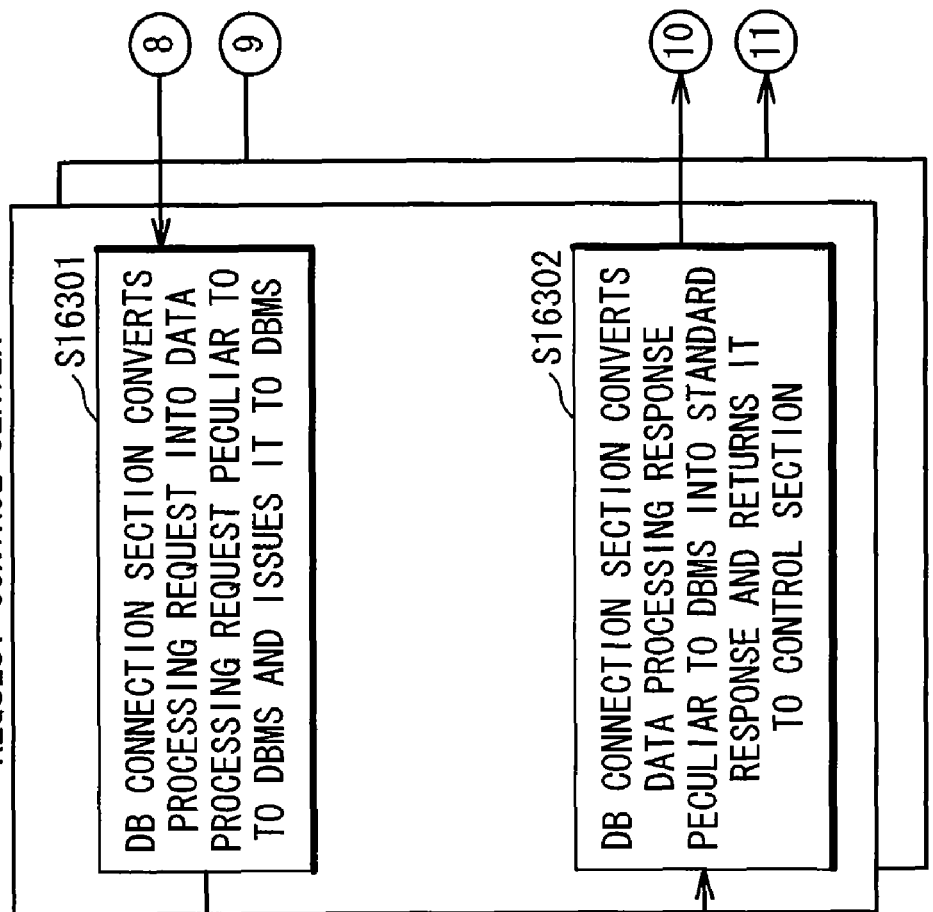
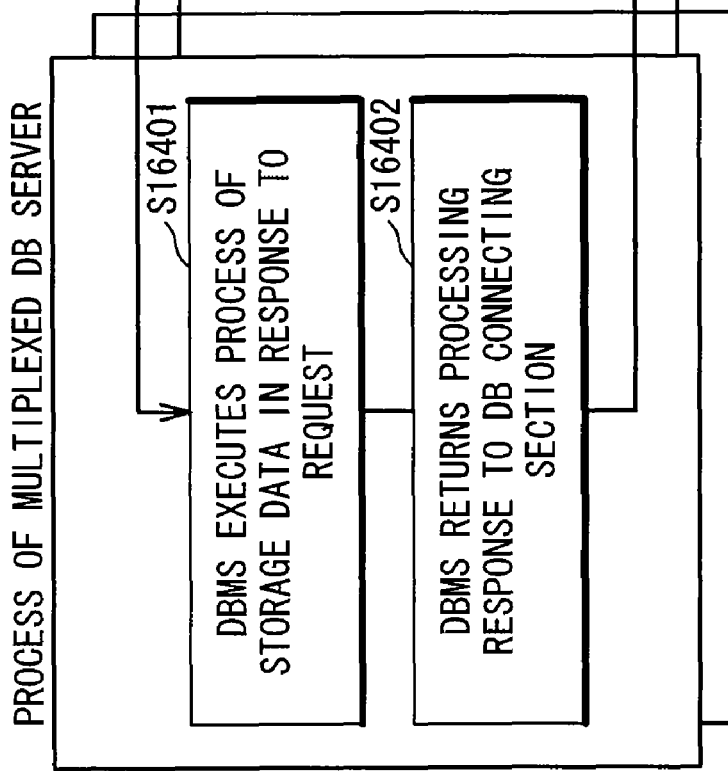

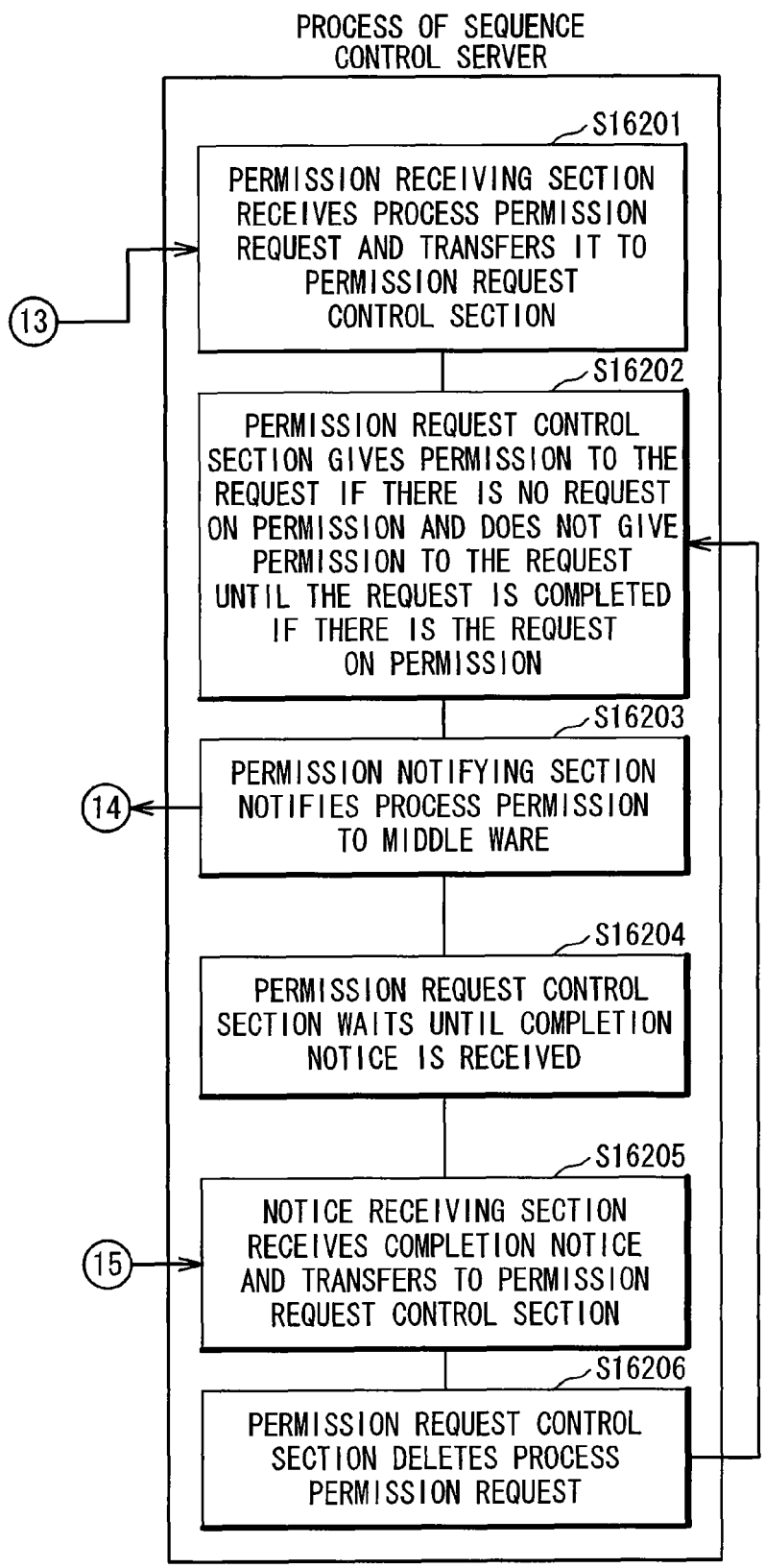

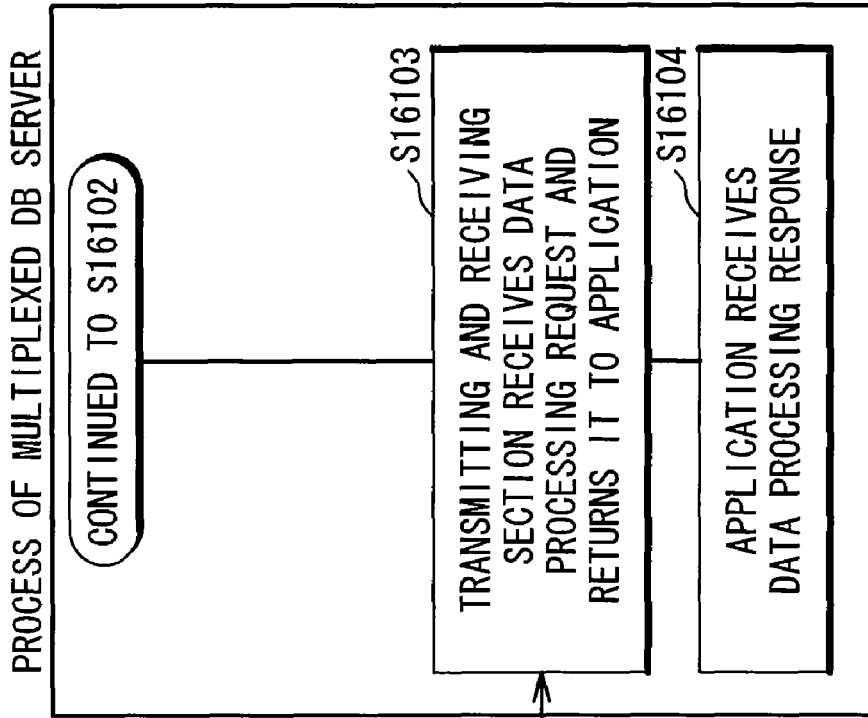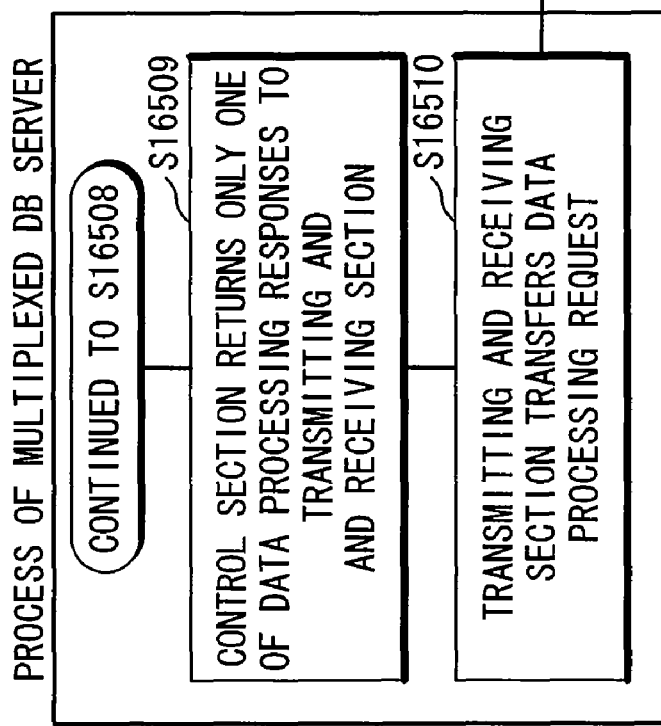

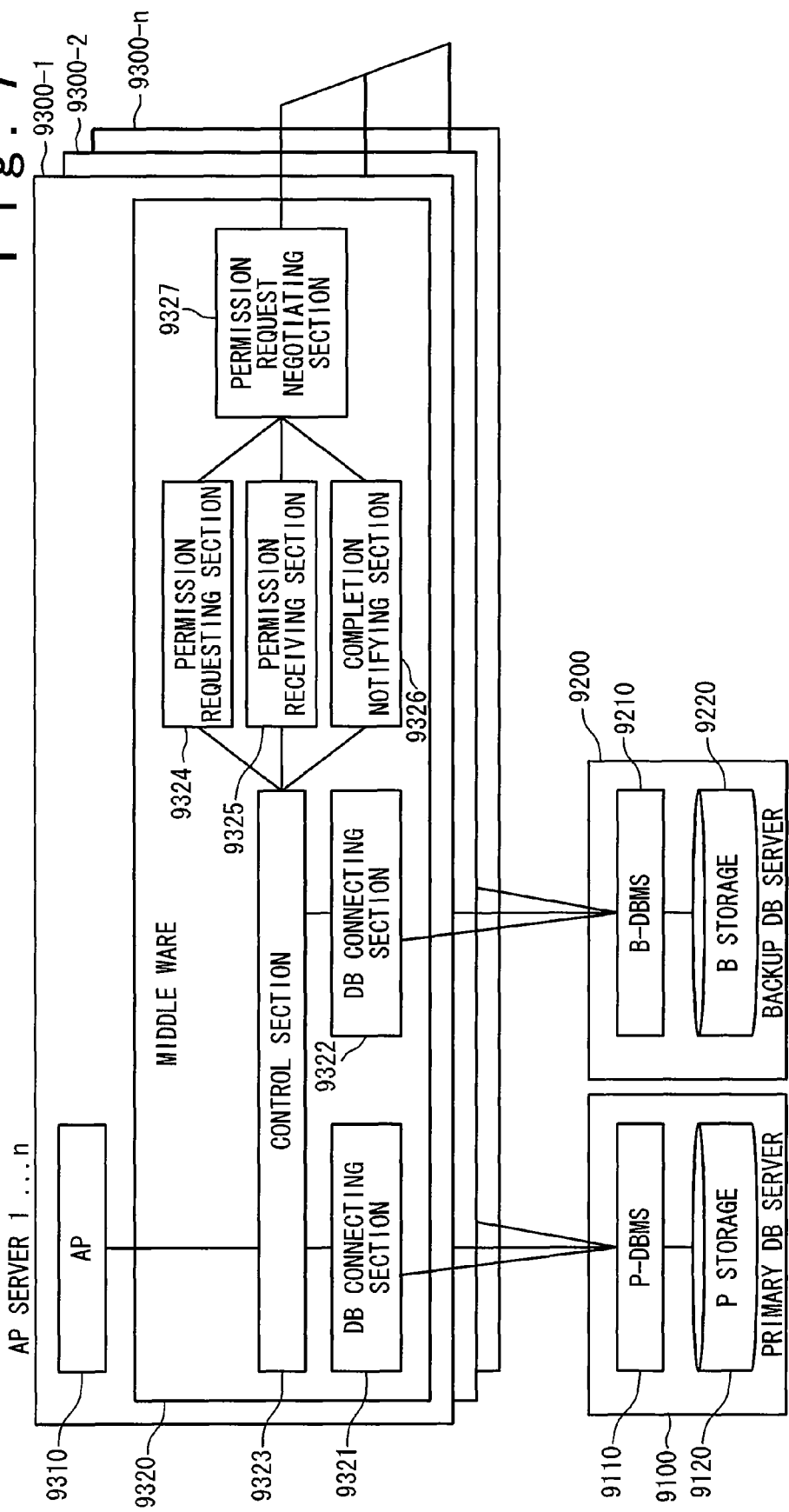

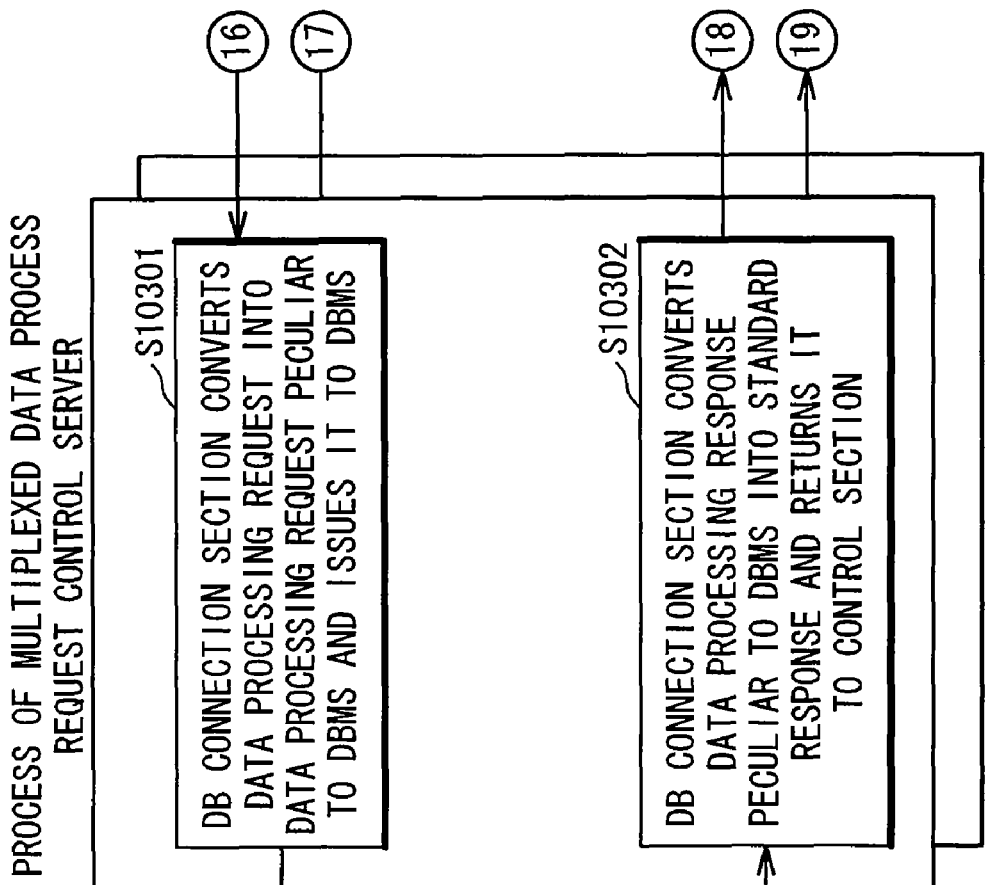

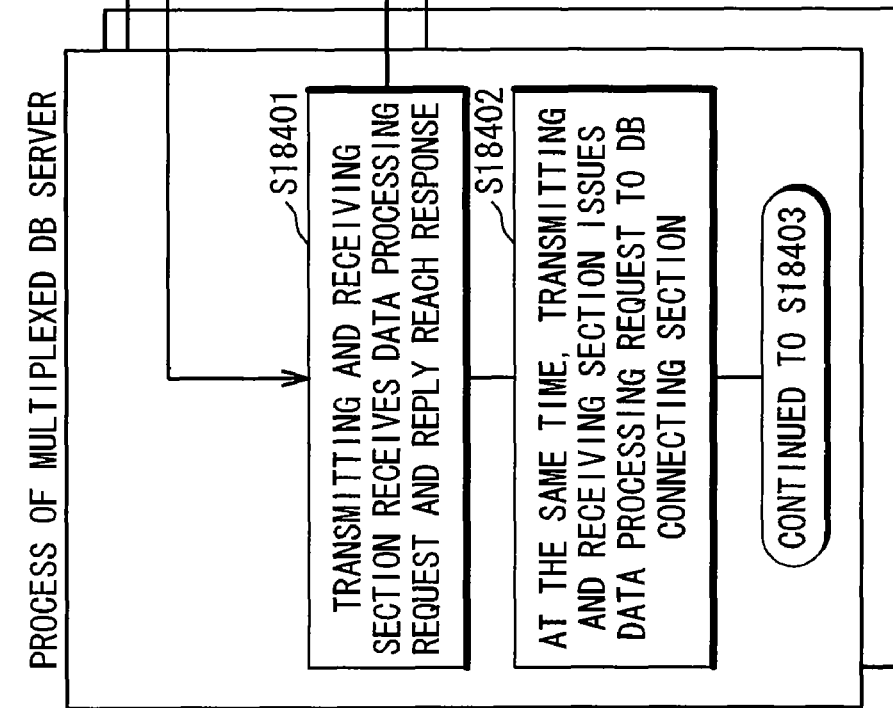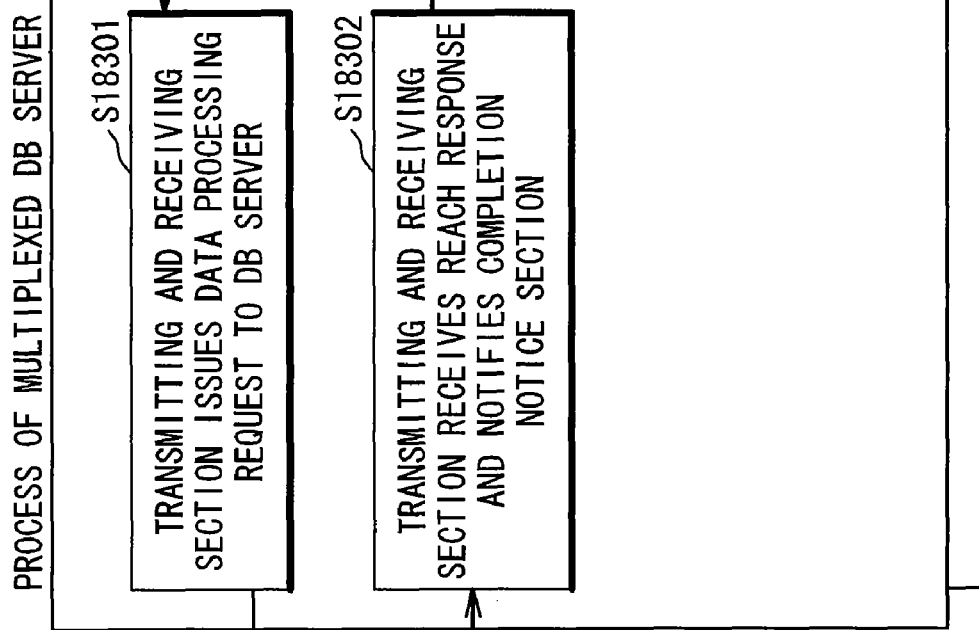

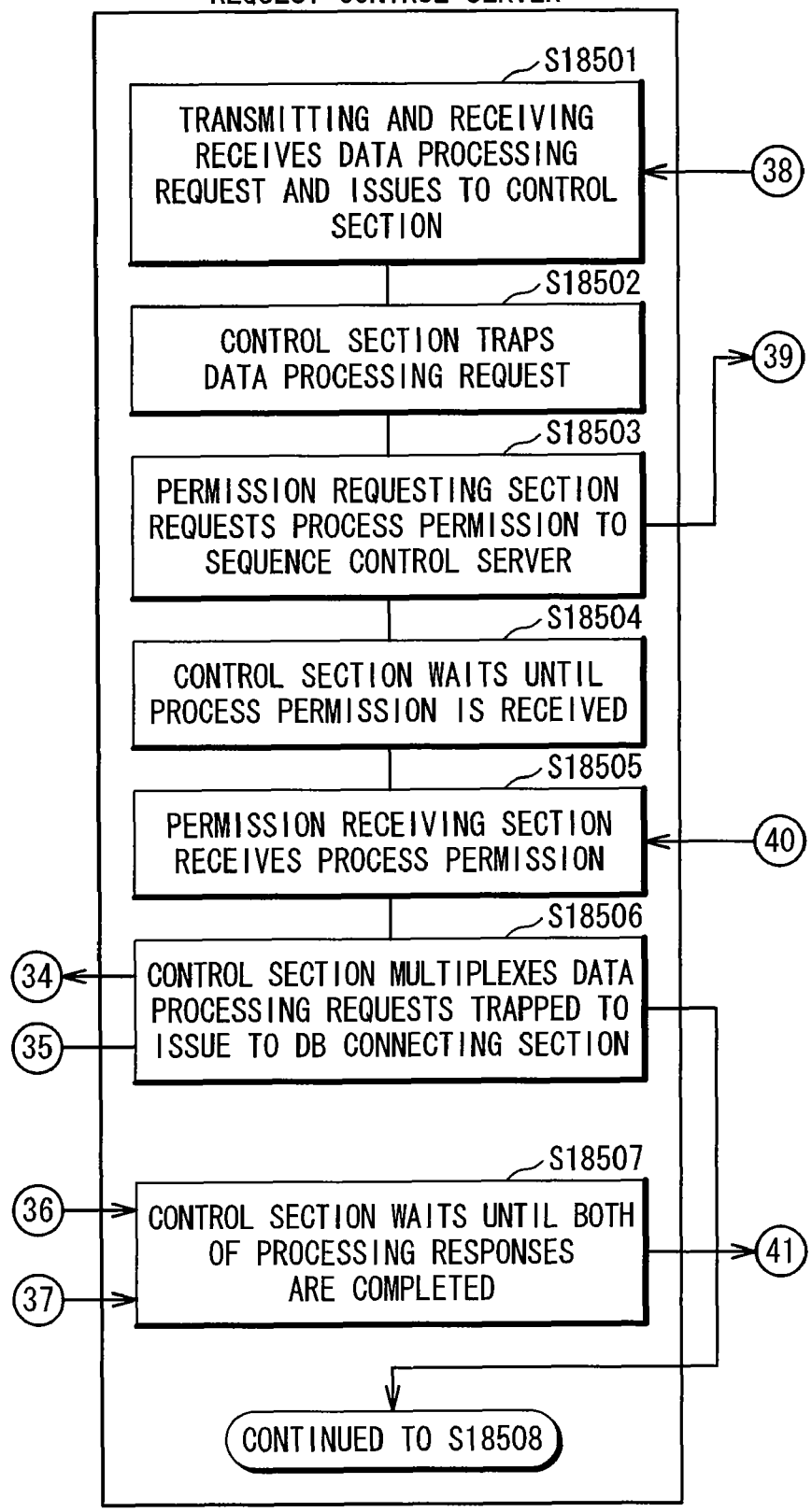
Fig. 12C PROCESS OF DATA PROCESS REQUEST CONTROL SERVER

SYSTEM AND METHOD FOR PRODUCING DATA REPLICA

BACKGROUND OF THE INVENTION

1. Field of the Invention

The present invention relates to a system and method for producing data replica for the purpose of measuring extinguishment of data stored in a storage of a computer system using a database.

2. Description of the Related Art

Conventionally, a computer system is proposed which includes one or more application servers and database servers, and refers to and updates data on a database server based on a process of an application program running on an application server. In such a computer system, it is important to produce a replica of the data in order to measure extinguishment of the data stored in the database server. Such a computer system is described in a conventional example 1 (Japanese Laid Open Patent Publication (JP-P2005-165610A)), a conventional example 2 ("Extension of Java API for Synchronous Copy of Database", by Fujiyama et al. (Information Processing Society of Japan, the 67th national convention, 1K-5, 2005)), and a conventional example 3 ("Data Synchronous Copy System Between Different DBs By Extension of DB Connection API", by Fujiyama et al., (FIT2005 the 4th Information Science and Technology Forum, C-031, 2005)).

Referring to FIG. 1, the conventional data copy system in the conventional examples 2 and 3 includes an application server 1300 which provides service, a primary database server 1100 which supplies data to the application server 1300, and a backup database server 1200 which is a replica of the primary database server 1100. The primary database server 1100 is composed of a storage 1120 which stores data, and a database management system (hereinafter, to be also referred to as a "DBMS") 1110 which manages data in the storage 1120. The backup database server 1200 is composed of a storage 1220 which stores data and a database management system 1210 which manages data in the storage 1220.

The application server 1300 is composed of an application program 1310 which issues a data processing request to the database management system and a middle ware 1320 which provides a common function to a plurality of application programs. In this case, the middle ware 1320 is composed of a database (DB) connecting section 1321, a database (DB) connecting section 1322 and a multiplexing section 1323. Each of the database connecting section 1321 and the database connecting section 1322 converts a data processing request issued from the application program 1310 into a data processing request peculiar to the database management system 1110 or database management system 1210, and converts a data processing response peculiar to the database management system 1110 or database management system 1210 into a response to the application program 1310, and the multiplexing section 1323 multiplexes each of the data processing requests before the conversion. Generally, JDBC (Java (registered trade mark) DataBase Connectivity) is used for an interface of the database connecting sections 1321 and 1322 with the application program 1310. On the other hand, an interface peculiar to the database management system is used for an interface of the database connecting section 1321 or 1322 with the database management system 1110 or 1210. The multiplexing section 1323 is recognized as a database connecting section from application program 1310 and as an application program from the database connecting section, because it has a standard interface. That is, the multiplexing section 1323 is transparent from the other components.

The conventional data replica producing system having such a configuration operates as follows.

When the application program 1310 requests data processing to the database management system 1110, the application program 1310 issues a standard data processing request, which is based on a standard interface of the database connecting section 1321, through the middle ware 1320. In the middle ware 1320 which receives the standard data processing request, the multiplexing section 1323 multiplexes the data processing request and sends the multiplexed data processing request to the database connecting section 1321 and the database connecting section 1322. The database connecting section 1321 converts the request into a data processing request peculiar to the primary database management system 1110, and the database connecting section 1322 converts the request into a data processing request peculiar to the backup database management system 1210. The sections 1321 and 1322 send the data processing requests to the database management systems. The primary database management system 1110 and the backup database management system 1210 receive logically same data processing requests, and carry out the same data processing. As a result, because data in the primary storage 1120 and data in the backup storage 1220 are similarly processed, the data of the primary storage 1120 and the data of the backup storage 1220 are the same data. That is, the effect is accomplished that the data of the primary storage 1120 is copied on the backup storage 1220.

In the above-mentioned data replica producing system, the multiplexing section 1323 is transparent from the application program 1310 and database connecting sections 1321 and 1322, and moreover, from the database management systems 1110 and 1210. Therefore, the data replica producing system can be configured by adding the multiplexing section 1323, the database connecting section 1322 and the backup database server 1200 to the existing computer system which is composed only of the application server 1300 and the primary database server 1100, without changing the other components.

Also, the multiplexing section 1323 multiplexes each of the data processing requests in the standard form between the application program 1310 and the database connecting section 1321 before the conversion into the request peculiar to the database management systems. Therefore, it is possible to generally apply the multiplexing section 1323 without depending on kinds of the application program 1310 and the database management system 1110.

Further, even if one of the database servers fails down, it is possible to continue to provide service without stop, because the other database server can supply the data to the application program 1310.

However, there is a problem to fail in production of a data replica in the above-mentioned conventional data replica producing system, when two or more connections to the database management system are present, e.g., two ore more application servers are connected with the database management system.

The above-mentioned conventional data replica producing system realizes data replica by carrying out same data processing in the primary database management system and the backup database management system. Therefore, the order of the data processing requests is same between to the primary database management system and the backup database management system. In case of single connection, the order of a plurality of data processing requests does not change in the connection. However, in case that a plurality of application servers are connected with the database management system, there is no guarantee that the order of the data processing requests issued from the application programs to the database management system, i.e., the timing of arrival to the database management system is the same between to the primary database management system and the backup database management system, when a network delay and so on have occurred, because the connections from the application servers does not have any relation. For example, in case of FIG. 2, a data processing request 1-2 is received by the primary database management system 2110 after a data processing request 1-1 is received. However, a data processing request 2-1 is received by the backup database management system 2210 from another connection before the data processing request 1-2 is received after the data processing request 1-1 is received. In this way, if the order of the data processing requests is different, the contents of the data processing are different, too. As a result, the discrepancy of the data occurs.

Generally, there is a case that the coincidence of the order of receiving and processing operations by a plurality of reception nodes to messages from a plurality of transmission nodes issues should be guaranteed. In such a case, a sequence number is allocated to each message and the message is processed based on the sequence number, as described in Japanese Laid Open Patent Application (JP-A-Showa 60-237551). In order to apply this to the data replica producing system shown in FIG. 1, it is sufficient that a sequence number is added to each of the data processing requests sent from the database connecting sections 1321 and 1322 to the database management systems 1110 and 1210, and the database management systems 1110 and 1210 carry out data processing requests in an order of the sequence numbers.

However, the interfaces between the database management systems 1110 and 1210 and the database connecting sections 1321 and 1322 are peculiar to the database management systems, and the used protocol is dependent on the database management system. Therefore, it is necessary to modify the protocol dependent on the database management system in order to add a sequence number to each of the data processing requests sent from the database connecting sections 1321 and 1322 to the database management systems 1110 and 1210. Therefore, because the database management system itself must be modified, it is difficult to accomplishing the effect by only addition to the existing database management system. Also, even if it is applicable, the modification is ad hook peculiar to the database management system, and it is difficult to generally apply to any types of database management system.

In conjunction with the above description, a conventional replication system is described in Japanese Laid Open Patent Application (JP-P2002-108681A). In this conventional example, a replica table is generated from a plurality of master tables by operation data of addition, update, and deletion in the plurality of master tables based on a data base. Replication is carried out by matching and combining data of the plurality of master tables, using specific data in the master tables as a combination key. Thus, a replica table is generated.

Also, a remote data copy method between disk array apparatuses is described in Japanese Laid Open Patent Application (JP-P2003-167684A). In this conventional example, a system is configured in which a primary disk array apparatus and a secondary disk array apparatus are connected through a communication line. In the primary disk array apparatus, an I/O process section writes an update data in a cache in response to a write request of the update data from a host apparatus. A group registering section registers groups of logical disks to guarantee the consistence of data. A plurality of storage buffers are provided for every group of the logical disk. A concentrator packs and copies the update data written in the cache from the head area of the storage buffer in a reception state in synchronization with the write request of the update data from the host apparatus in order. When the update data are packed in the storage buffer, the concentrator sends the packing data to the secondary disk array apparatus. A distributor reads out the update data in a packing order from the packing data received by the secondary disk array apparatus to copy into the cache.

Also, a storage remote copy method is described in Japanese Laid Open Patent Application (JP-P2005-267216A). In this conventional example, a first node has a first storage connected with a first computer, and a second storage connected with a second computer. The second node has a third storage. When the first computer carries out a first write to the first storage, the first storage adds an order guarantee data to the first write and sends them to the third storage. When the second computer carries out a second write to the second storage, after the order guarantee data is acquired from the first storage, the second storage adds the order guarantee data to the second write and sends them to the third storage. The third storage carries out the first and second write in a memory area of the third storage in time order based on the order guarantee data.

Also, an information processing system is described in Japanese Laid Open Patent Application (JP-P2003-108423A). In this conventional example, the information processing system includes an information service server and a plurality of client units connected with the information service server. In the client unit, an access section requests access to the information service server and is set to an accessible state after permission is given. A monitor section monitors the operation of the access section. The information service server has a memory unit for storing data. A lock control section, when being not in a lock state, gives access permission to a predetermined client unit which has issued the access request first among the client units and sets the lock state. The lock control section releases the lock state into an unlock state when it is detected from the data from the monitor section that an access end operation from the above client unit is detected or that it is impossible to normally carry out the access end operation.

Also, a message re-transmitting method is described in Japanese Laid Open Patent Application (JP-A-Heisei 7-162517). In this conventional example, a first apparatus includes an application section which has an application program to carry out a process in a second apparatus at least and generates a process request message to the second apparatus according to necessity, and an application manager section which sends the process request message from the application section to the second apparatus. At least one second apparatus includes a message processing section which determines the process request message from the first apparatus and generates and sends a response message to the application manager section, and carries out a necessary process. When a response message is given from the message processing section of the first apparatus, the application manager section determines the content of the response message, re-transmits the process request message having the same content as the process request message to the first apparatus. The application manager section also notifies the response message to the application section according to necessity.

Also, an EDI format converting method is described in Japanese Laid Open Patent Application (JP-A-Heisei 6-19756). In this conventional example, a user peculiar data is read out from a user peculiar database. The use peculiar data is developed on a first table similar to a relational database to have a table structure. A column corresponding to an item of an EDI standard data is extracted and mapped onto a second table from the table structure of the first table in accordance with a predetermined condition. A row data of the table structure held in the second table is transmitted as the EDI standard data after the format conversion.

SUMMARY OF THE INVENTION

Therefore, an object of the present invention is to provide a computer system having connections to database management systems, in which the coincidence of an order of data processing requests is guaranteed between the primary database management system and the backup database management system.

Another object of the present invention is to provide a data replica producing system which can produce a data replica without discrepancy.

In an aspect of the present invention, a method of producing a data replica is achieved by issuing data processing requests from application programs running in application servers; by executing data processing corresponding to each of the data processing requests in each of database servers; by replying a result of the data processing as a response to one of the application programs which has issued the data processing request; and by controlling supply of the data processing requests to the database servers.

Here, the issuing may be achieved by trapping the issued data processing requests; and by multiplexing the trapped data processing request in response to process permission. Also, the controlling may be achieved by requesting process permission of the trapped data processing request; and by generating the process permission based on previous data processing requests in response to the request of the process permission.

Also, the executing may be achieved by converting the multiplexed data processing request into a data processing request peculiar to a database management system of each of the database servers. Also, the replying may be achieved by converting the data processing result into a data processing response as the response to the application program which has issued the data processing request.

Also, the controlling may be achieved by detecting that one of the data processing requests reaches each of the database servers; and by supplying a next one of the data processing requests to the database servers when it is detected that the one data processing request reaches each of the database servers.

Instead, the controlling may be achieved by receiving the data processing result as the response from each of the database servers to the application program which has issued the data processing request; and by supplying a next one of the data processing requests to the database servers when the responses are received from the database servers.

Also, in another aspect of the present invention, a data replica producing system includes one or more application servers; and database servers. Each of the database servers includes a storage configured to store data; and a database management system configured to manage data of the storage, execute a data processing request to reply a processing result as a data processing response. Each of the application servers includes an application program executed to issue the data processing request. The data replica producing system further includes an order control section configured to control supply of the data processing requests to the database servers such that a process order of the data processing requests is same between the database servers.

The order control section may permit the supply of the data processing requests to the database servers one by one in response to completion notices from the database servers.

In this case, each of the application servers may further include a middle ware section configured to generate a permission request to the order control section when each of the data processing requests is received, transfers the completion notices from the database servers to the order control section, and supplies one of the data processing requests corresponding to supply permission from the order control section to the database servers. The order control section may control the application servers by issuing the supply permission.

Also, the middle ware section may further include a database connecting section provided for each of the database servers to convert the data processing request corresponding to the supply permission into a data processing request peculiar to the database management system of the database server, and to convert the data processing response from the database server into a response to the application program which has issued the data processing request.

Also, each of the database servers may further include a database connecting section configured to convert the data processing request corresponding to the supply permission into a data processing request peculiar to the database management system of the database server, and to convert the data processing response from the database server into a response to the application program which has issued the data processing request.

Also, the data replica producing system may further include a request control section provided for the application servers to generate a permission request to the order control section when each of the data processing requests is received, transfers the completion notices from the database servers to the order control section, and supplies one of the data processing requests corresponding to supply permission from the order control section to the database servers. The order control section may control the application servers by issuing the supply permission.

In this case, the middle ware section may further include a database connecting section provided for each of the database servers to convert the data processing request corresponding to the supply permission into a data processing request peculiar to the database management system of the database server, and to convert the data processing response from the database server into a response to the application program which has issued the data processing request.

Also, each of the database servers may further include a database connecting section configured to convert the data processing request corresponding to the supply permission into a data processing request peculiar to the database management system of the database server, and to convert the data processing response from the database server into a response to the application program which has issued the data processing request.

Also, the order control section may include negotiating sections provided for the application servers, respectively. The negotiating section may negotiate with the other negotiating sections to permit the supply of the data processing requests to the database servers one by one in response to completion notices from the database servers.

In this case, each of the application servers may further include a middle ware section configured to generate a permission request to the order control section when each of the data processing requests is received, transfers the completion notices from the database servers to the order control section, and supplies one of the data processing requests corresponding to supply permission from the order control section to the database servers. The order control section may control the application servers by issuing the supply permission.

In still another aspect of the present invention, a computer-readable software product for realizing a method of producing a data replica is provided.

In the present invention, the responses to the multiplexed data processing request is detected, and the supply of another data processing request to the database management system (DBMS) is limited until all of the process responses are received. Instead, it is detected that the multiplexed data processing request reaches the database server, and the supply of another data processing request to the database management system is limited until all of the reach responses are received. In other words, the supply of the other data processing request to the database management system is limited, until the multiplexed data processing request reaches the database server at least. Thus, the coincidence of the supply order of the data processing requests to the plurality of database management systems are guaranteed.

BRIEF DESCRIPTION OF THE DRAWINGS

FIGS. 4A to 4E are a flow chart showing an operation of the data replica producing system in the first embodiment of the present invention;

FIG. 5 is a block diagram showing the configuration of the data replica producing system according to a second embodiment of the present invention;

FIGS. 6A to 6G are a flow chart showing an operation of the data replica producing system in the second embodiment of the present invention;

FIG. 7 is a block diagram showing the configuration of the data replica producing system according to a third embodiment of the present invention;

FIGS. 8A to 8D are a flow chart showing an operation of the data replica producing system in the third embodiment of the present invention;

FIGS. 12A to 12I are a flow chart showing an operation of the data replica producing system in the fifth embodiment of the present invention;

DESCRIPTION OF THE PREFERRED EMBODIMENTS

Hereinafter, a data replica producing system of the present invention will be described in detail with reference to the attached drawings.

First Embodiment

Figure 1:
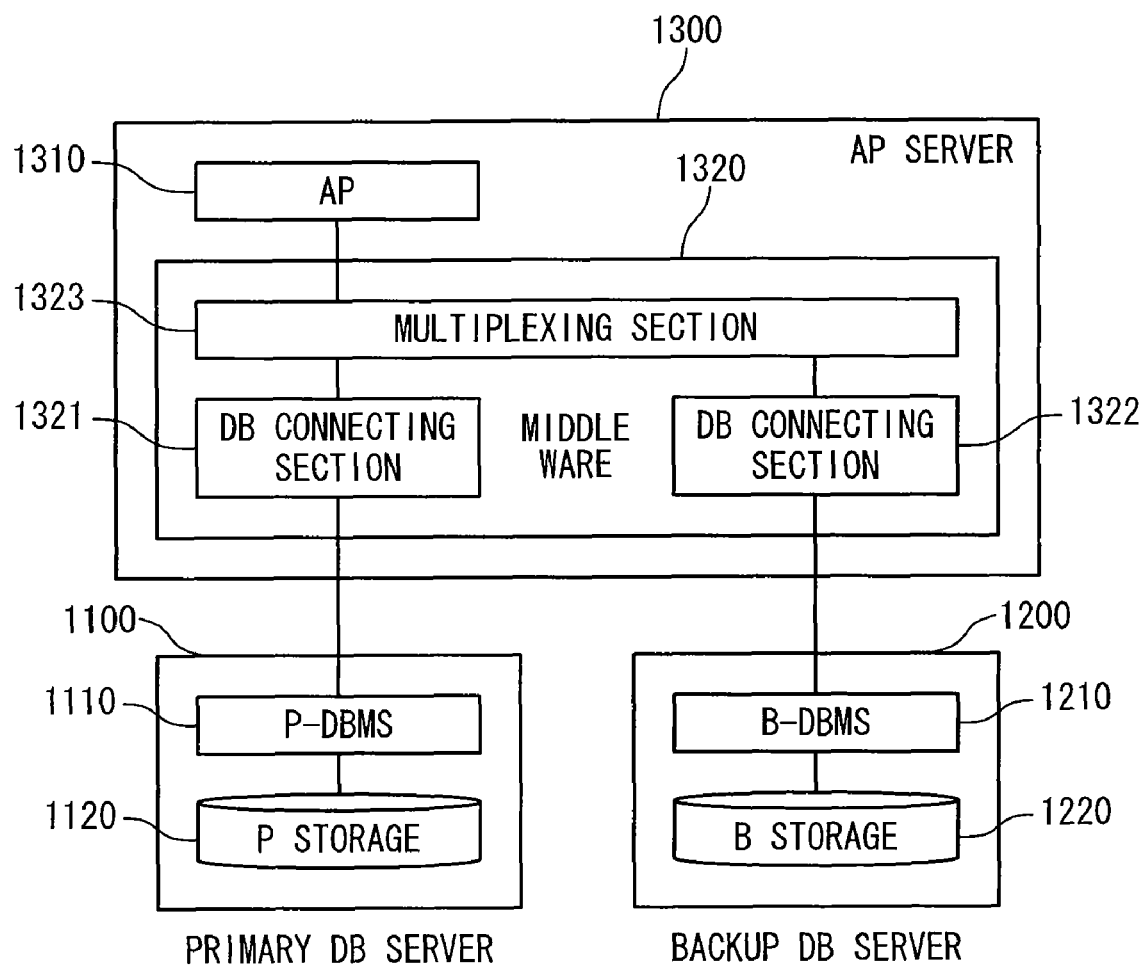
FIG. 1 is a block diagram showing the configuration of a conventional data replica producing system.
Figure 3:
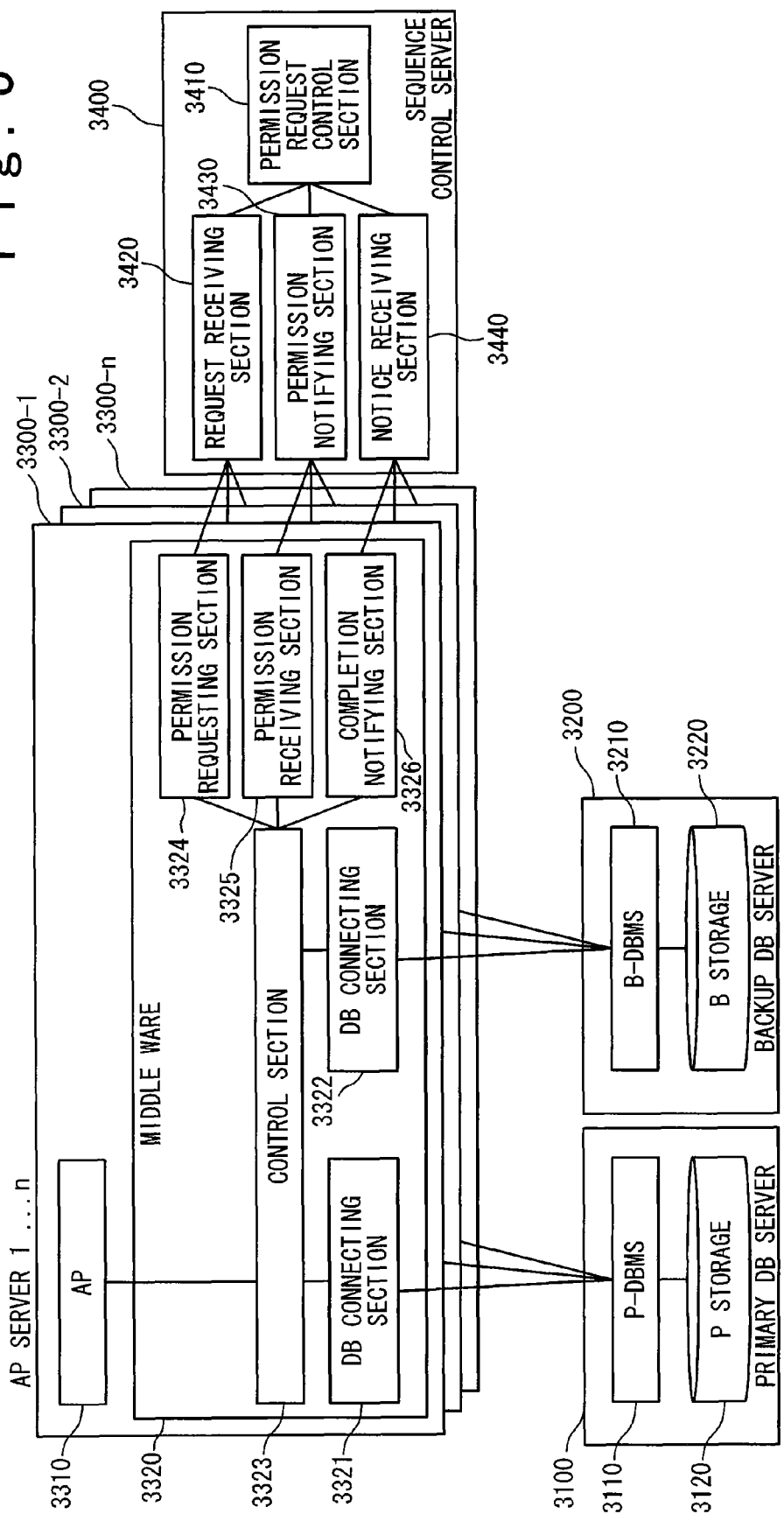
FIG. 3 is a block diagram showing a configuration of a data replica producing system according to a first embodiment of the present invention.
Figure 4C:
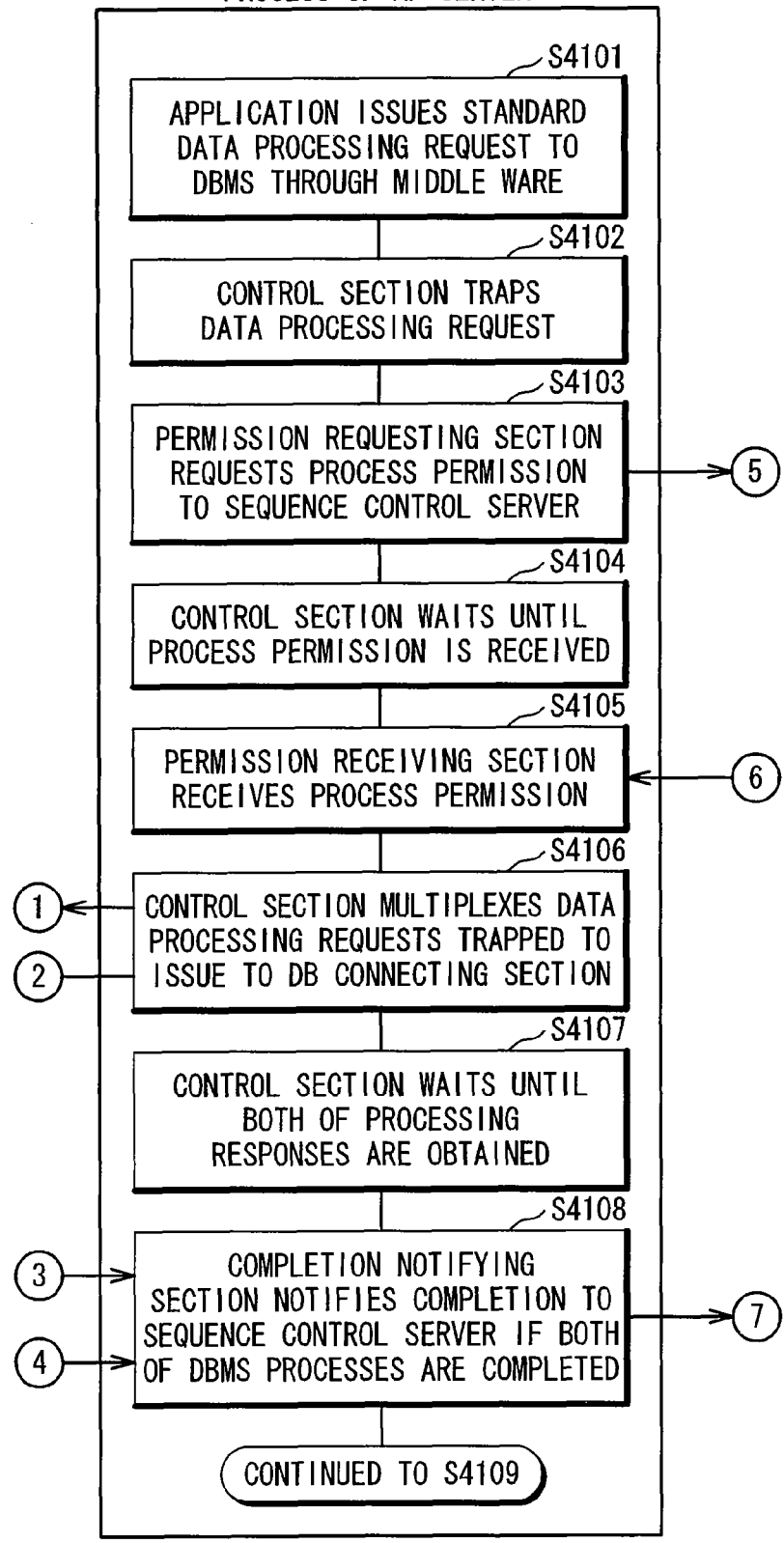
Figure 4D:
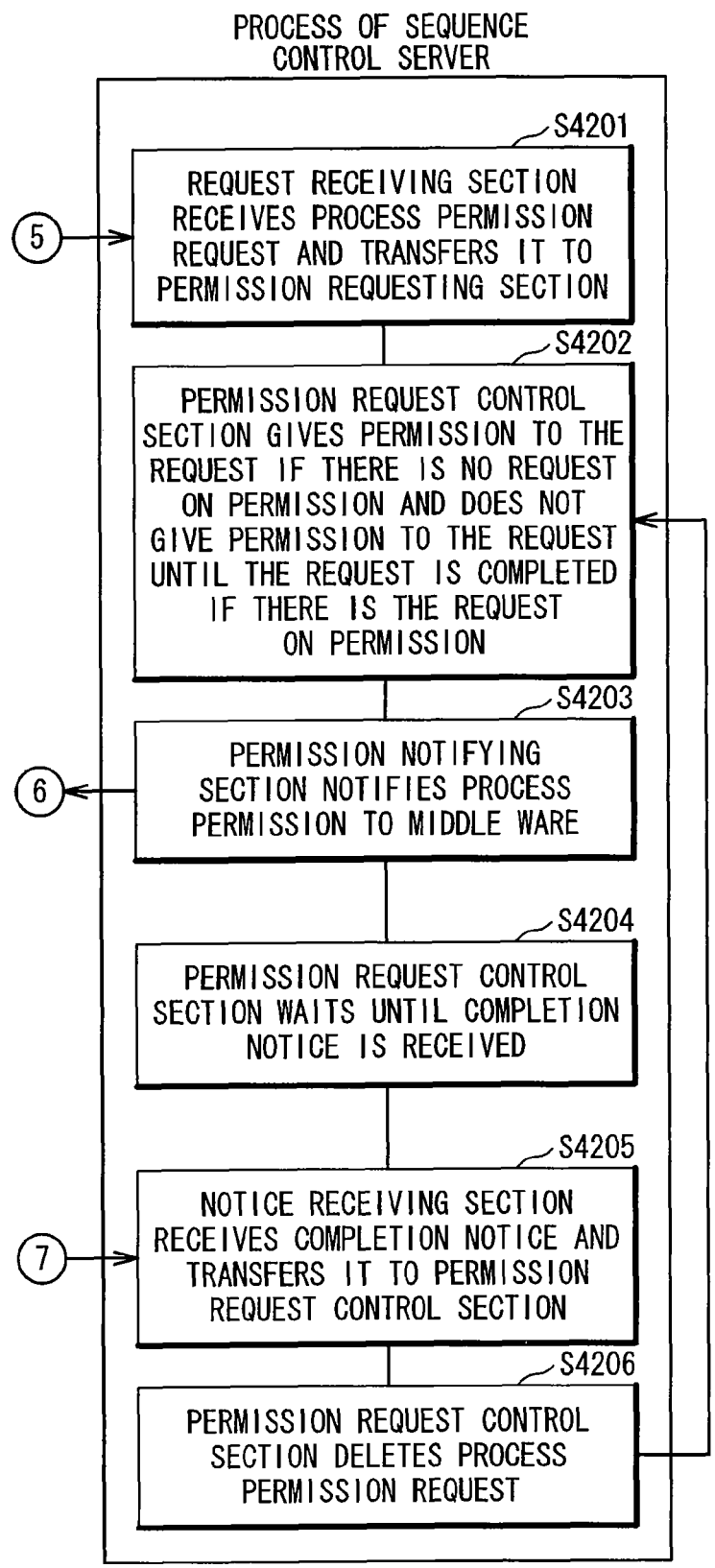
Figure 4E:
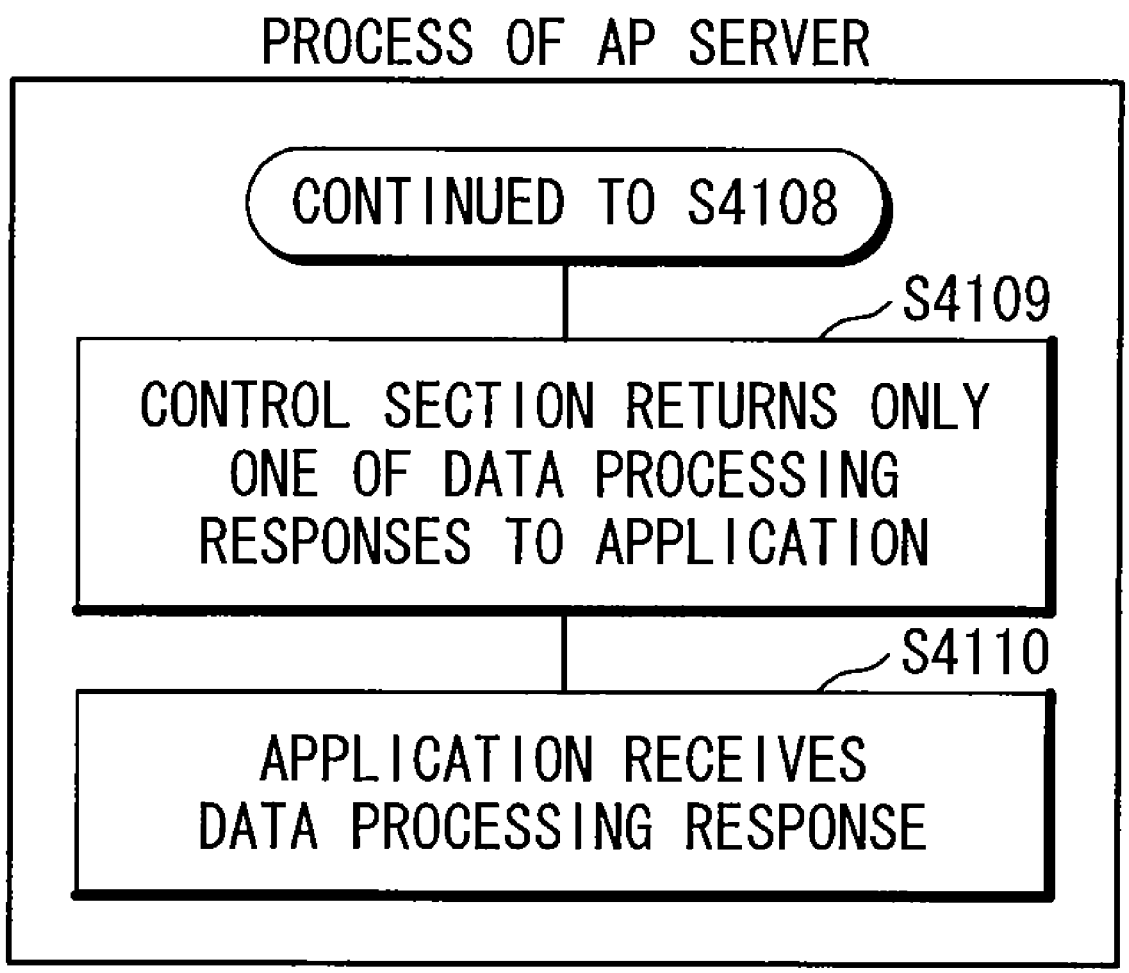
Figure 6C:
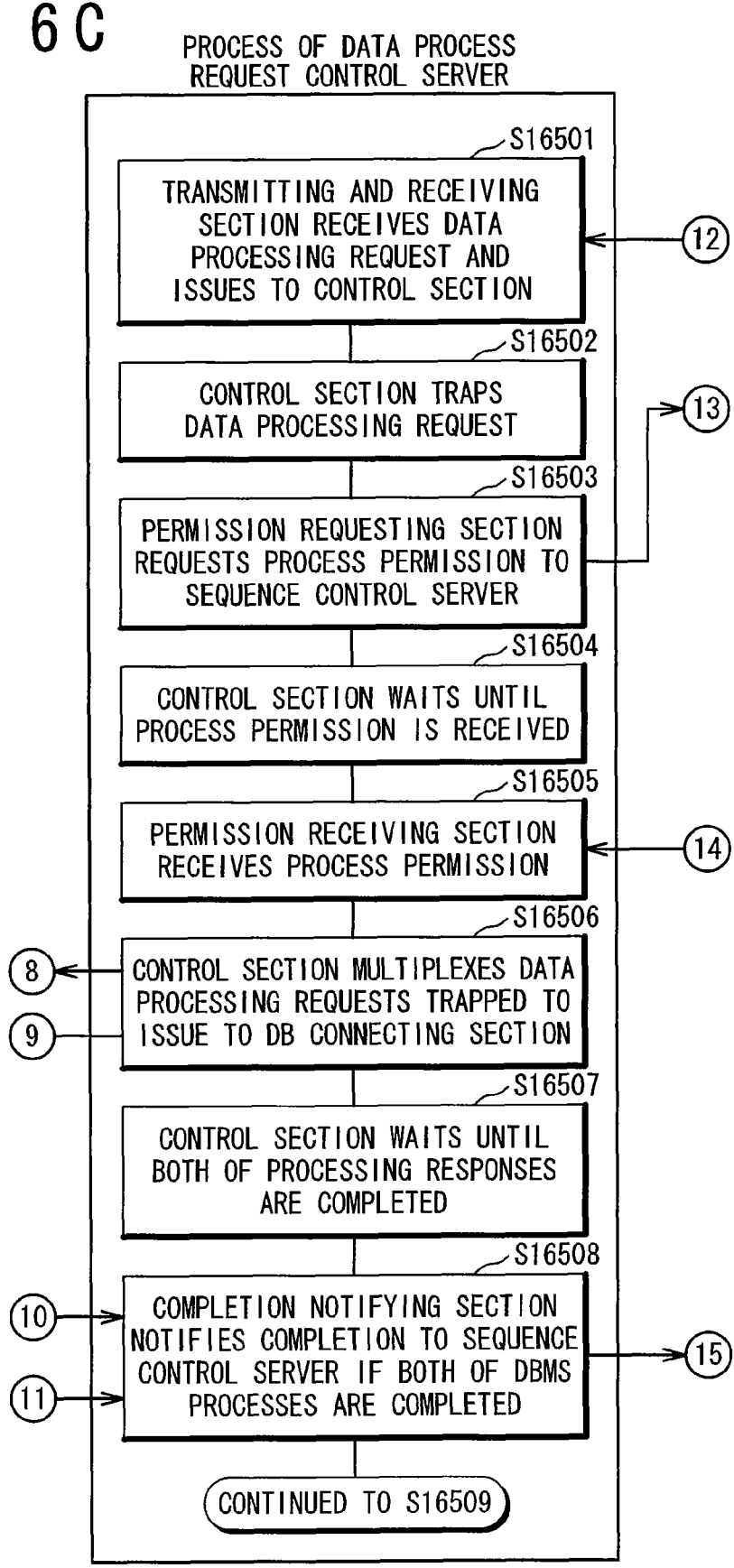
Figure 6E:
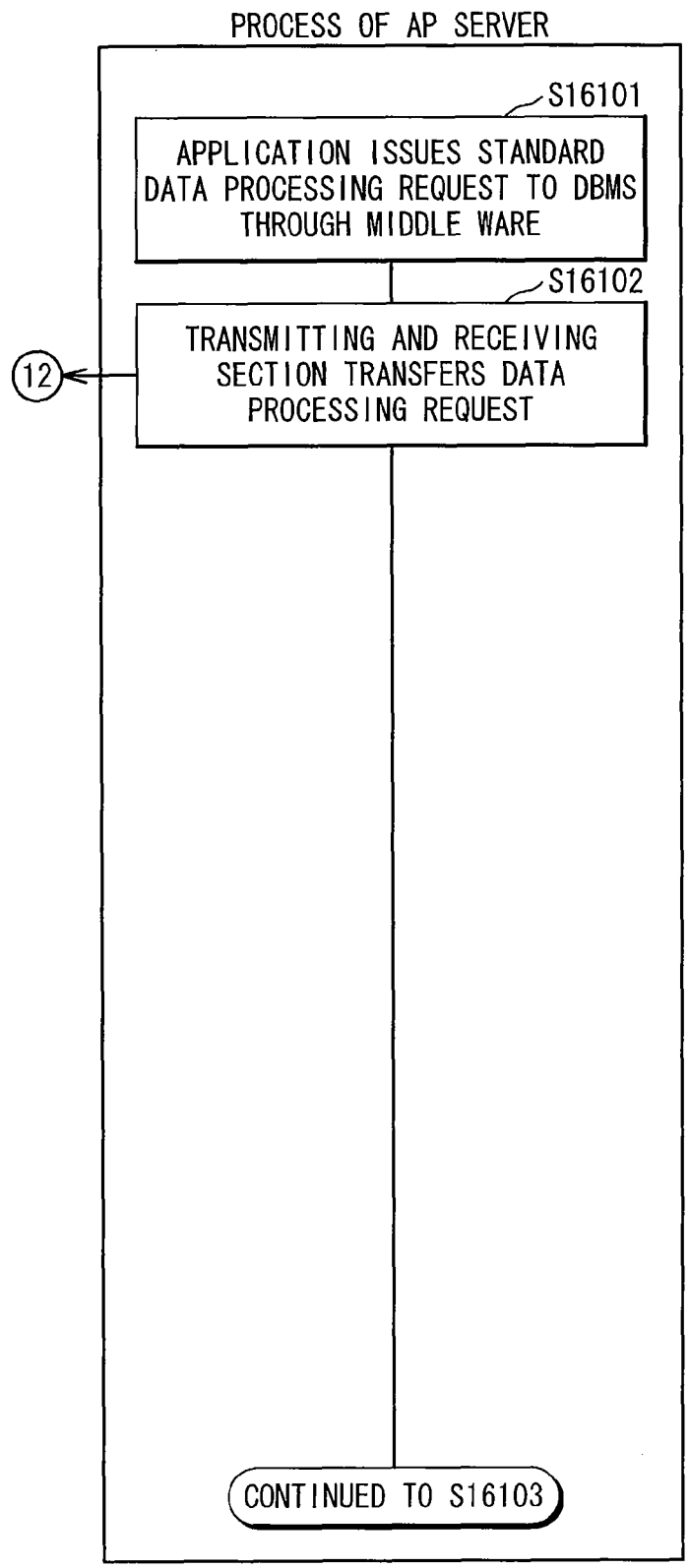
Figure 8C:
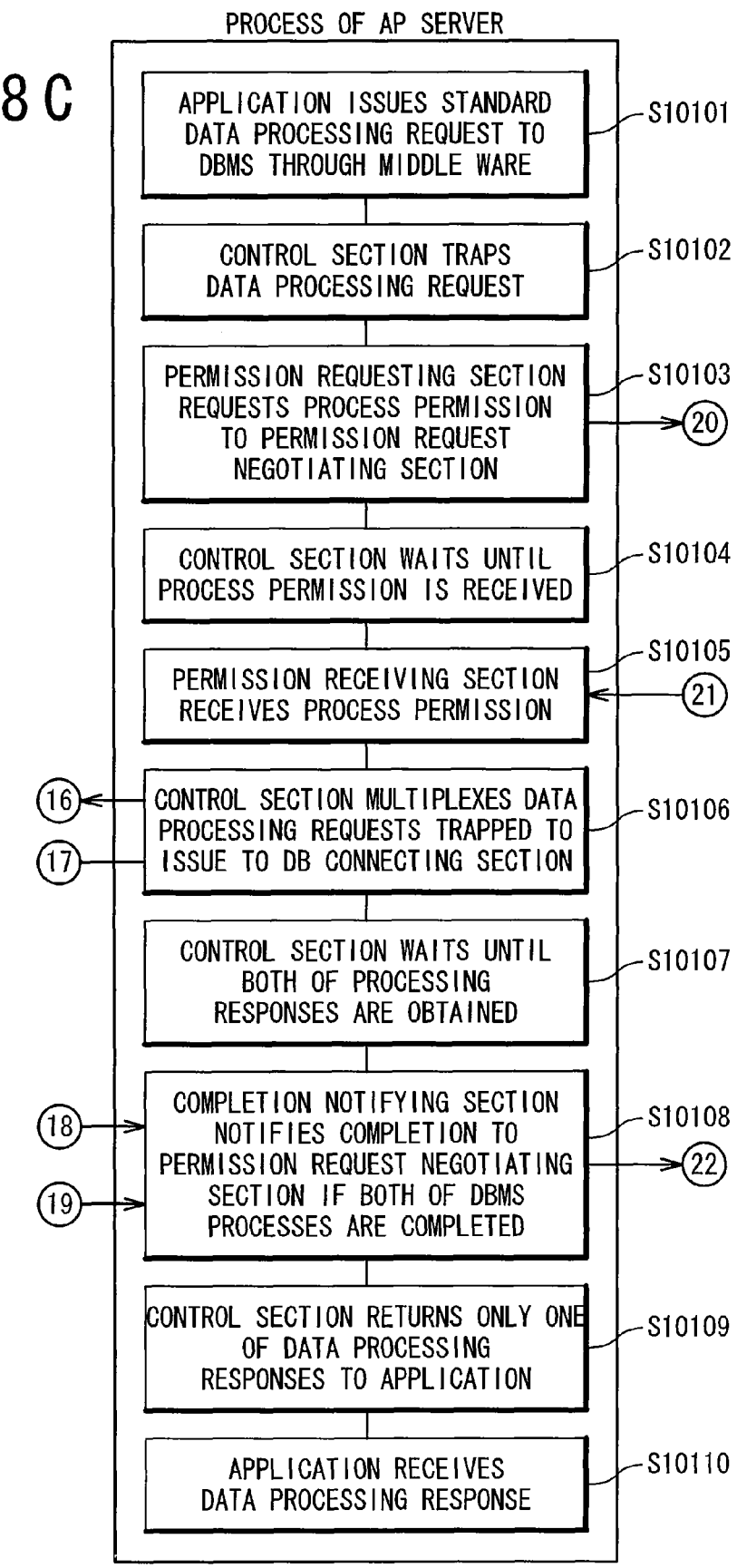
Figure 8D:
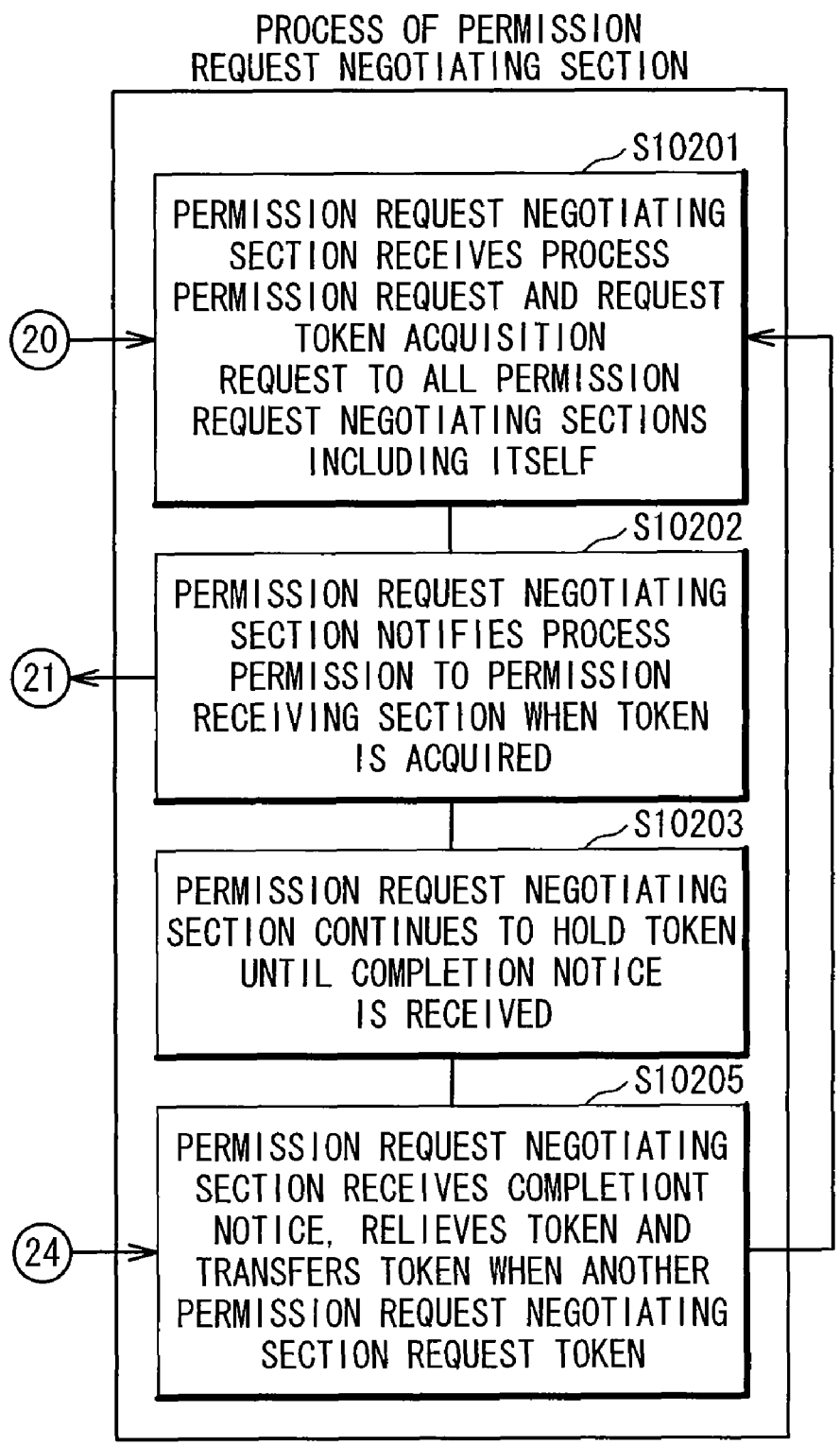

FIG. 3 is a block diagram showing a configuration of the data replica producing system according to the first embodiment of the present invention. Referring to FIG. 1, the data replica producing system in the first embodiment is composed n application servers 3300-1, 3300-2, . . . , and 3300-n which provide services, a primary database server 3100 which provides data to these application servers 3300-1, 3300-2, . . . , 3300-n, a backup database server 3200 which is a replica of the primary database server 3100, and a sequence control server 3400 which controls a process order of data processing requests. A computer system which realizes the application servers 3300-1, 3300-2, . . . , 3300-n, the database server 3100 and 3200 and the sequence control server 3400 may be configured by physically different computer systems or may be configured by a same computer system.

The primary database server 3100 is composed of a storage 3120 which stores data, and a database management system (DBMS) 3110 which manages the data in the storage 3120. The backup database server 3200 is also composed of a storage 3220 which stores data, and a database management system 3210 which manages the data in the storage 3220.

Each of the application servers 3300-1, 3300-2, . . . , 3300-n is composed of an application program 3310 which issues a data processing request to the (DBMS), and a middle ware 3320 which provides a common function to the plurality of application programs. The middle ware 3320 is composed of database connecting sections 3321 and 3322 for converting the data processing request issued from the application program 3310 into a data processing request peculiar to the database management system and converting a data processing response peculiar to the database management system into a response to the application program 3310, a control section 3323 for trapping and multiplexing the data processing request to transfer to the database connecting sections 3321 and 3322, and trapping the data processing response, to transfer to the application program 3310, a permission requesting section 3324 for requesting process permission of the data processing request to the sequence control server 3400, a permission receiving section 3325 for receiving permission to the process permission request from the sequence control server 3400, and a completion notifying section 3326 for notifying the completion of the data processing request in the database management system to the sequence control server 3400.

The sequence control server 3400 is composed of an request receiving section 3420 for receiving the process permission request from the middle ware 3320 of each of application servers 3300-1, 3300-2, . . . , 3300-n, a permission notifying section 3430 for notifying permission to the process permission request to the middle ware 3320, a notice receiving section 3440 for receiving a completion notice of the data process in the database management system from the middle ware 3320, and a permission request control section 3410 for controlling the order of the process permission requests.

Next, an operation of the data replica producing system in the first embodiment will be described with reference to FIG. 3 and a flow chart of FIGS. 4A to 4E.

The application program 3310 issues a standard data processing request which is based on a standard interface of the database connecting section 3321 through the middle ware 3320 when requesting data processing to the primary database management system 3110 (Step S4101). In the middle ware 3320 which receives the standard data processing request, the control section 3323 traps the data processing request (Step S4102). Then, the control section 3323 requests process permission of the data processing request to the sequence control server 3400 through the permission requesting section 3324 (Step S4103). Then, the control section 3323 waits for the process permission without issuing the data processing request (Step S4104).

On the other hand, in the sequence control server 3400, the request receiving section 3420 receives a process permission request and transfers it to the permission request control section 3410 (Step S4201). The permission request control section 3410 operates to stores the process permission request received one after another in a FIFO memory and so on, and to gives a permission to a single process permission request (Step S4202). That is, if there is no other process permission request, the permission is given to the first process permission request which has been received earliest. If there is another process permission request corresponding to a given permission, the permission request control section 3410 does not give a permission to any process permission request until receiving the completion notice of the process permission request corresponding to the given permission. When permission is given, the permission notifying section 3430 notifies the process permission to the middle ware 3320 having requested the process permission (Step S4203). The permission request control section 3410 waits without giving any permission to other process permission requests until the permission request control section 3410 receives the completion notice of the process permission request corresponding to the given permission (Step S4204).

Again, in the middle ware 3320, the permission receiving section 3325 receives the process permission (Step S4105). When receiving the process permission, the control section 3323 multiplexes the trapped data processing request to issue the requests to the database connecting sections 3321 and 3322 (Step S4106). Each of the database connecting sections 3321 and 3322 converts a received standard data processing request into a data processing request peculiar to the corresponding database management system and issues it to the corresponding database management system 3110 or 3210 (Step S4301). The database management systems 3110 and 3210 process the data in the storages 3120 and 3220 in response to the data processing request (Step S4401). Because the data processing request is logically common to the database management systems 3110 and 3210, the data in the primary storage 3120 and the data in the backup storage 3220 are similarly processed. Therefore, the data in the primary storage 3120 is same as that of the backup storage 3220. That is, the effect that the data in the primary storage 3120 is copied into the backup storage 3220 is achieved.

The database management systems 3110 and 3210 return the result of the data processing to the database connecting sections 3321 and 3322 as the data processing responses (Step S4402). The database connecting sections 3321 and 3322 receives the data processing responses and convert the data processing responses peculiar to the database management system into standard data processing responses and return them to the control section 3323 (Step S4302). Until this time, the control section 3323 waits for the data processing responses of both the database management systems (Step S4107).

When the data processing responses of both the database management systems are acquired, the completion notifying section 3326 notifies the completion that the data processing is completed, to the sequence control server 3400 (Step S4108). At the same time, the control section 3323 returns only one of the two data processing responses to the application program 3310 (Step S4109). If the data processing is normally carried out, the response is logically the same. Therefore, when the response is converted into the standard data processing response, the responses are same. Because the application program 3310 receives one data processing response to one data processing request, it is possible to provide service without being conscious of data replica and so on (Step S4110).

On the other hand, when the notice receiving section 3440 receives a completion notice to the process permission request corresponding to given permission, the sequence control server 3400 transfers the completion notice to the permission request control section 3410 (Step S4205). The permission request control section 3410 regards the process permission request to which the permission is given is completed, in response to the completion notice, and deletes this process permission request (Step S4206). Then, if there is a next process permission request, the permission request control section 3410 gives permission to the process permission request.

As mentioned above, in to operate, only one of the data processing requests can be always processed.

Next, the effect of the data replica producing system in this embodiment will be described.

In this embodiment, the data processing request, which is always only one over the whole system, is processed without converting the protocol itself of the data processing request by controlling a process permission request to the data processing request by the sequence control server. Therefore, because the coincidence of the supply order of the data processing requests to the primary database management system and the backup database management system can be guaranteed even if there are a plurality of connections to the database management system, the data replica can be produced right.

Also, even if one of the database servers is failed down, the other database server can provide data, because the data replica is always produced data. Therefore, it is possible to continue to provide service without any stop.

Also, this data replica can be produced generally without limiting the database management system and the application program, and transparently without changing the database management system and the application program. Therefore, the data replica can be produced between the database management systems with no replication function or the different database management systems.

Second Embodiment

Next, the data replica producing system according to the second embodiment of the present invention will be described in detail.

FIG. 5 is a block diagram showing the configuration of the data replica producing system in the second embodiment. Referring to FIG. 5, the data replica producing system in the second embodiment is composed of n application servers 15300-1, 15300-2, . . . , and 15300-n which provide services, a primary database server 15100 which provides data to these application servers 15300-1, 15300-2, . . . , and 15300-n, a backup database server 15200 which is a replica of the primary database server 15100, a sequence control server 15400 which controls the process order of the data processing requests, and a data processing request control server 15500 which controls the data processing requests from the application servers 15300-1, 15300-2, . . . , and 15300-n. The computers which realizes the application servers 15300-1, 15300-2, . . . , and 15300-n, the database server 15100 and 15200, the sequence control server 15400 and data processing request control server 15500 may be physically separate or may be same.

The primary database server 15100 is composed of a storage 15120 and a database management system 15110, like the primary database server 3100 in the first embodiment. Also, the backup database server 15200 is composed of a storage 15220 and database management system 15210, like the backup database server 3200 in the first embodiment.

Each of the application servers 15300-1, 15300-2, . . . , and 15300-n is composed of an application program 15310 which issues a data processing request to the database management system, and a middle ware 15320 which provides a common function to the plurality of application programs. The middle ware 15320 is composed of a transmitting and receiving section 15321 for transmitting the data processing request and receiving a response to the data processing request.

The sequence control server 15400 is composed of a request receiving section 15420, a permission notifying section 15430, a notice receiving section 15440 and a permission request control section 15410, like the sequence control server 3400 in the first embodiment.

The data processing request control server 15500 is composed of database connecting sections 15510 and 15520, a control section 15530, a permission requesting section 15540, a permission receiving section 15550 and a completion notifying section 15560, like the middle ware 3320 in the first embodiment. Also, the data processing request control server 15500 is composed of a transmitting and receiving section 15570 for transmitting and receiving the data processing request and the response to and from the transmitting and receiving section 15321 in the application servers 15300-1, 15300-2, . . . , and 15300-n.

Next, an operation of the data replica producing system in this embodiment will be described in detail with reference to FIG. 5 and FIGS. 6A to 6G.

When the application program 15310 of the application server 15300-1 requests data processing to the primary database management system 15110, the application program 15310 issues a standard data processing request which is based on the standard interface, through the middle ware 15320 (Step S16101). In the middle ware 15320 which receives the standard data processing request, the transmitting and receiving section 15321 transfers the data processing request to the data processing request control server 15500 (Step 16102). The transmitting and receiving section 15570 of the data processing request control server 15500 issues a received data processing request to the control section 15530 (Step 16501). The subsequent operations, that is, the operation of the data processing request control server 15500 in this embodiment shown in the steps S16502-S16508 of FIGS. 6A to 6G, the operation of the sequence control server 15400 in this embodiment shown in the steps S16201-S16206, the operation of the data processing request control server 15500 in this embodiment shown in the steps S16301-S16302, and the operations of the database servers 15100 and 15200 in this embodiment shown in the steps S16401-S16402 are same as the operation of the application server 3300 in the first embodiment shown in the steps S4102-S4108 of FIGS. 4A to 4E, the operation of the sequence control server 3400 in the first embodiment shown in the steps S4201-S4206, the operation of the application server 3300 in the first embodiment shown in the steps S4301-S4302, and the operations of the database servers 3100 and 3200 in the first embodiment shown in the steps S4401-S4402, respectively. Therefore, the description of these operations will be omitted.

If the data processing responses of both of the database management systems are received, the control section 15530 returns only one of the two data processing responses to the transmitting and receiving section 15570 (Step S16509). If the data processing is normally carried out, the responses are logically same. When the response is converted into the standard data processing response, the responses are same. Therefore, which of the responses is returned is not a problem. The transmitting and receiving section 15570 transfers the received data processing response to the application server 15300-1 (Step S16510). The transmitting and receiving section 15321 returns the received data processing response to the application server 15310 (Step S16103). Because the application program 15310 receives one data processing response to one data processing request, the application program 15310 can provide the service without being conscious of the production of the data replica (Step S16104).

As mentioned above, the data replica producing system operates to supply a single data processing request to both of the primary and backup database servers as a whole system.

In this embodiment, the same effect as in the first embodiment can be accomplished. At a same time, the maintainability can be improved by integrating a data processing request controlling functions in the data processing request control server. Also, the load of the application server can be lightened by making the data processing request controlling function independent of the application server.

Third Embodiment

Next, it refers to a drawing about the third embodiment of the present invention and it is explained in detail.

Referring to FIG. 7, the data replica producing system according to the third embodiment of the present invention is composed of n application servers 9300-1, 9300-2, . . . , 9300-n which provide services, a primary database server 9100 which provides data to these application servers 9300-1, 9300-2, . . . , 9300-n, and a backup database server 9200 which is a replica of the primary database server 9100. A computer system which realizes each of the application servers 9300-1, 9300-2, . . . , 9300-n and each of the database servers 9100 and 9200 may be separate physically and or may be same.

The primary database server 9100 is composed of a primary storage 9120 of and a database management system 9110, like the database server 3100 in the first embodiment like. The backup database server 9200 is composed of a database management system 9210 and a storage 9220, like the backup database server 3200 in the first embodiment.

The application servers 9300-1, 9300-2, . . . , 9300-n are composed of a application program 9310 which issues a data processing request to the database management systems and a middle ware 9320 which provides a common function to the plurality of application programs. The middle ware 9320 is composed of database connecting sections 9321 and 9322, a control section 9323, a permission requesting section 9324, a permission receiving section 9325 and a completion notifying section 9326, and is further composed of a permission request negotiating section 9327 for carrying out negotiation of the permission request with the middle ware of the other application server, like the middle ware 3320 in the first embodiment.

Next, an operation of the data replica producing system will be described below in detail with reference to FIGS. 7 and 8A to 8D.

There are known operations in this embodiment, such as an the operation of the application server 9300 shown in the steps S10101-S10110 and the steps S10301-S10302 in FIG. 6, and operations of the database servers 9100 and 9200 shown in the steps S10401-S10402. Such operations are same as an operation of application server 3300 in the first embodiment shown in the steps S4101-S4110 of FIG. 2 and the steps S4301-S4302, and the operations of the database servers 3100 and 3200 in the first embodiment shown in the steps S4401-S4402. Therefore, the description thereof will be omitted.

When receiving a permission requesting from the permission requesting section 9324, the permission request negotiating section 9327 negotiates with the permission request negotiating section in the middle ware of the other application server on whether the permission may be notified. In this embodiment, a token passing method is used as the negotiating method. Of course, the negotiating method is not limited to the above method.

In the token passing method, modules to want to carry out an operation exclusively exchanges so-called tokens as only one object in the system. In this embodiment, only the module having the token carries out a desired operation privilegedly. In this embodiment, only the permission request negotiating section having the token notifies the permission to the permission request.

First, the permission request negotiating section 9327 receives a permission request and issues a token acquisition request to the entire permission request negotiating sections in the system, including itself (Step S10201). If a token is released, the permission request negotiating section 9327 acquires the token and notifies a process permission to the permission receiving section 9325 (Step S10202). If the token is not released, the permission request negotiating section 9327 waits until the token can be acquired.

After notifying of the permission, the permission request negotiating section 9327 continues to secure a token until a completion notice is received (Step 10203).

The permission request negotiating section 9327 receives the completion notice from the completion notifying section 9326 releases a token (Step S10205). Since now, if the token acquiring request has been issued from the entire permission request negotiating sections in the system including itself, the token is transferred to the permission request negotiating section.

As mentioned above, only one data processing request is always received by both of the database servers in the whole system.

Next, the effect of the data replica producing system in this embodiment will be described. In this embodiment, the same effect as in the first embodiment can be accomplished. The availability can be improved, because the system does not have a single trouble point like the sequence control server.

Fourth Embodiment

Next, the data replica producing system according to the fourth embodiment of the present invention will be described below in detail.

Figure 9:
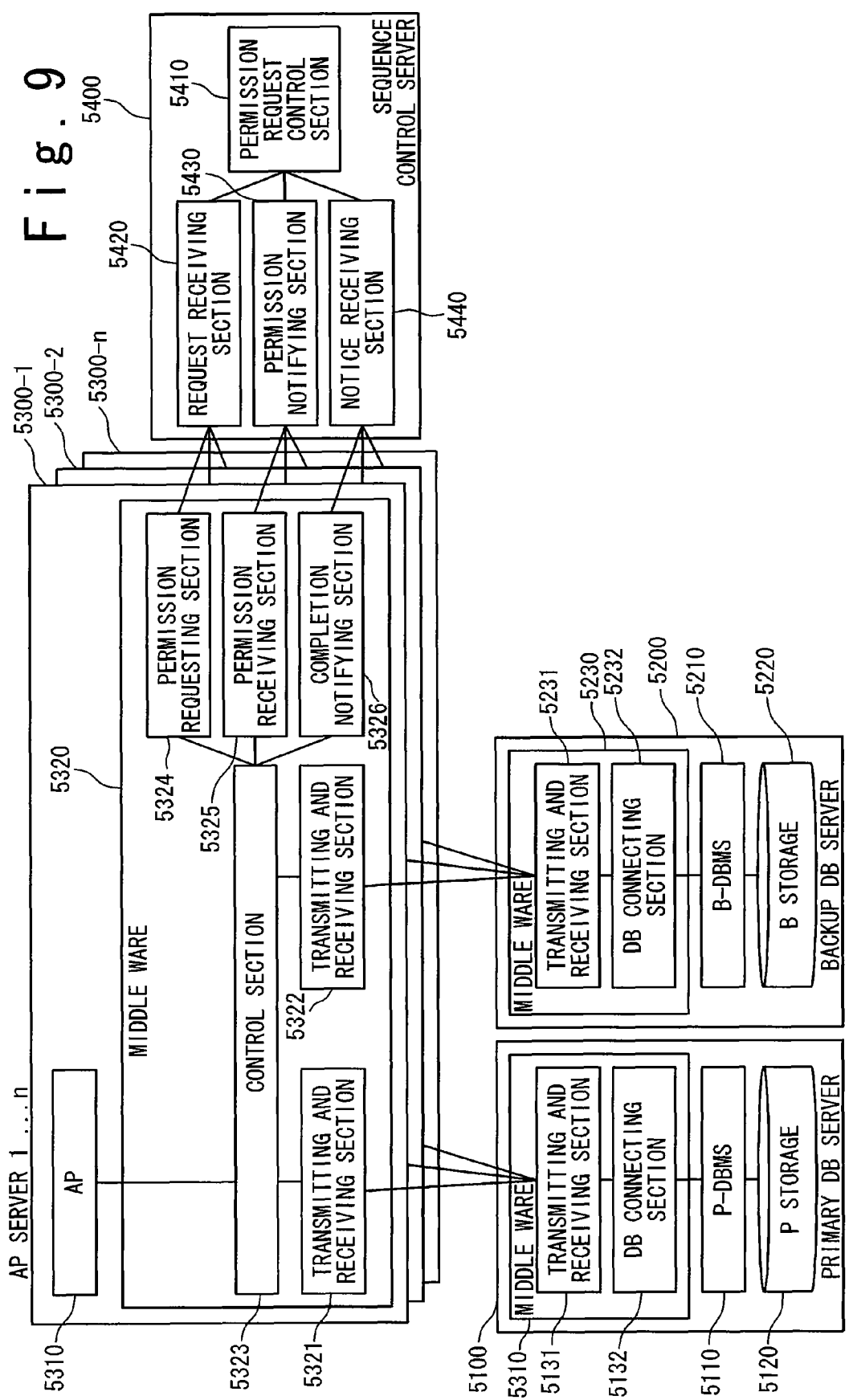
FIG. 9 is a block diagram showing the configuration of the data replica producing system according to a fourth embodiment of the present invention.

Referring to FIG. 9, the data replica producing system according to the fourth embodiment of the present invention is composed of a plurality of application servers 5300-1, 5300-2, . . . , 5300-n which provide services, a primary database server 5100 which provides data to these application servers 5300-1, 5300-2, . . . , 5300-n, a backup database server 5200 which is a replica of the primary database server 5100, and a sequence control server 5400 which controls an order of the data processing requests. The computer systems which realizes the application servers 5300-1, 5300-2, . . . , 5300-n, the database servers 5100 and 5200 and the sequence control server 5400 may be separate physically and may be same.

The primary database server 5100 is composed of a database management system 5110 and a storage 5120 like the primary database server 3100 in the first embodiment, and is further composed of a middle ware 5130 which carries out the control of the data processing requests on the side of the database server. This middle ware 5130 is composed of a transmitting and receiving section 5131 for carrying out the transmission and reception of the data processing request, a reach response and a data processing response to and from the application servers 5300-1, 5300-2, . . . , 5300-n and a database connecting section 5132 like the database connecting section 3321 in the first embodiment. The backup database server 5200 is composed of a database management system 5210 and a storage 5220 like the backup database server 3200 in the first embodiment and is further composed of a middle ware 5230 which carries out the control of the data processing request on the side of the database server. This middle ware 5230 is composed of a transmitting and receiving section 5231 for carrying out the transmission and reception of the data processing request, the reaching response and the response of the data processing among application servers 5300-1, 5300-2, . . . , 5300-n and the database connecting section 5232 of the first embodiment like the database connecting section 3322. The application servers 5300-1, 5300-2, . . . , 5300-n be composed of the application 5310 which issues a data processing request to the database management system and the middle ware 5320 which provides a common function to the plurality of application programs.

The middle ware 5320 is composed of a control section 5323, a permission requesting section 5324, a permission receiving section 5325 and a completion notifying section 5326, like the middle ware 3320 in the first embodiment. Also, the middle ware 5320 is composed of a primary database server 5100, and a backup database server 5200 and transmitting and receiving sections 5321 and 5322 for carrying out the transmission and reception of the data processing request, the reach response and a response of the data processing. However, this embodiment differs from the first embodiment in a point that when the reach response to the data processing request to have transmitted to the primary database server 5100 and the backup database server 5200 through the transmitting and receiving sections 5321 and 5322 is returned, the completion of the data processing request is notified to the sequence control server 5400 from the completion notifying section 5326.

The sequence control server 5400 is composed of a request receiving section 5420, a permission notifying section 5430, a notice receiving section 5440 and a permission request control section 5410, like the sequence control server 3400 in the first embodiment. The present embodiment is different from the first embodiment in a point that the notice receiving section 5440 receives a notice of the completion of the data processing request, and the permission application control section 5410 gives a permission to a process permission request of a next data processing request when receiving the notice of the completion of the data processing request.

Next, an operation of the data replica producing system in this embodiment will be described below in detail with reference to FIG. 7 and FIGS. 8A to 8D.

Figure 10B:
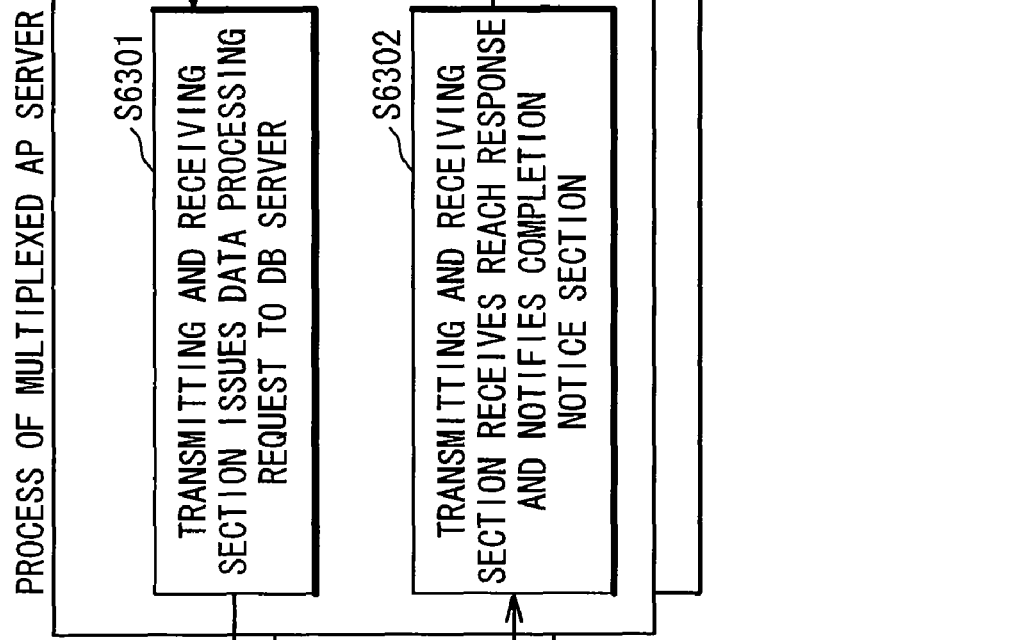
FIGS. 10A to 10G are a flow chart showing an operation of the data replica producing system in the fourth embodiment of the present invention.
Figure 10A:
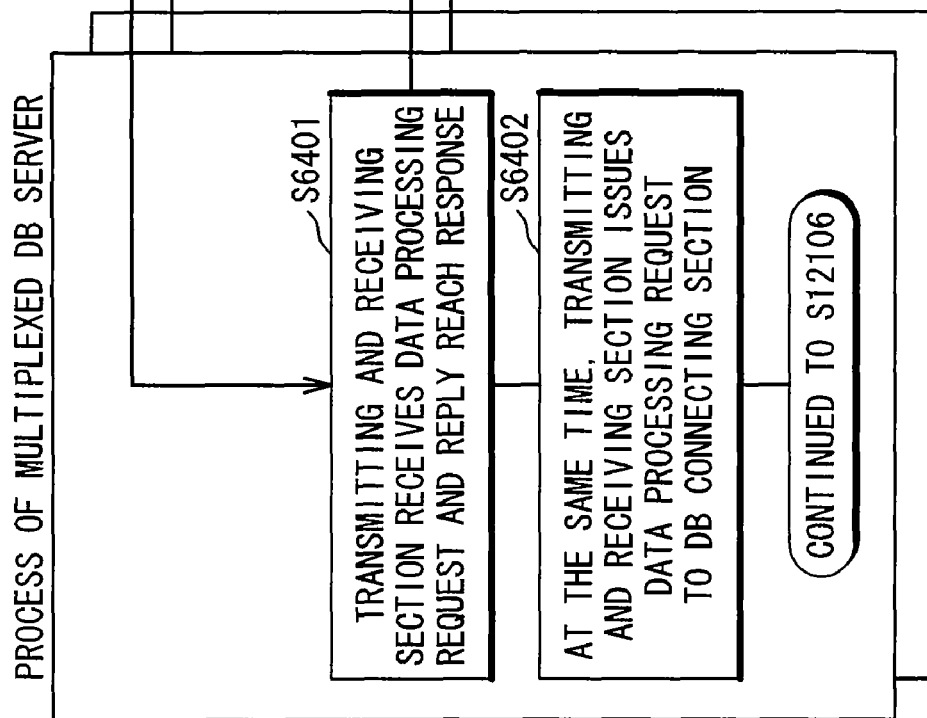
Figure 10C:
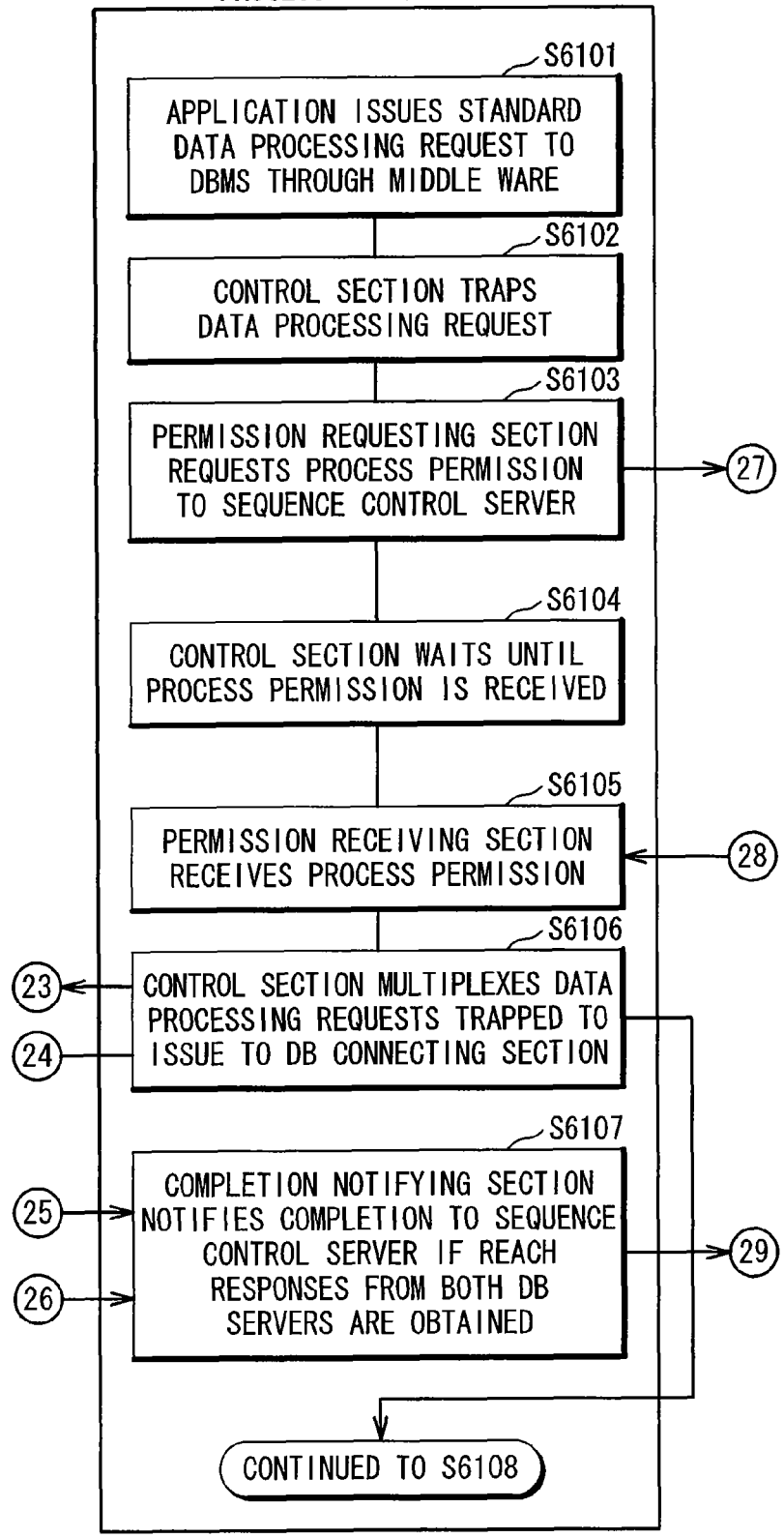
Figure 10D:
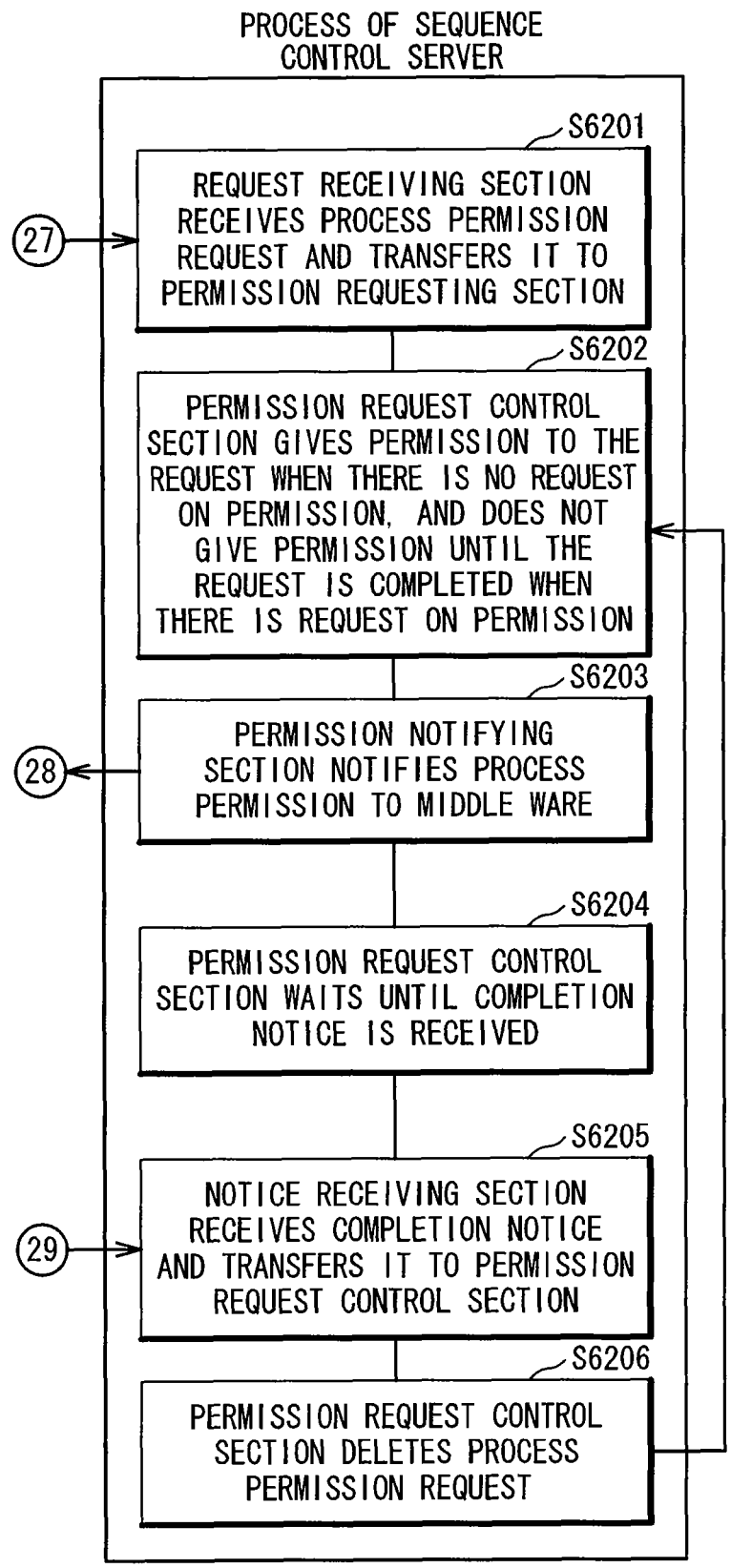
Figure 10E:
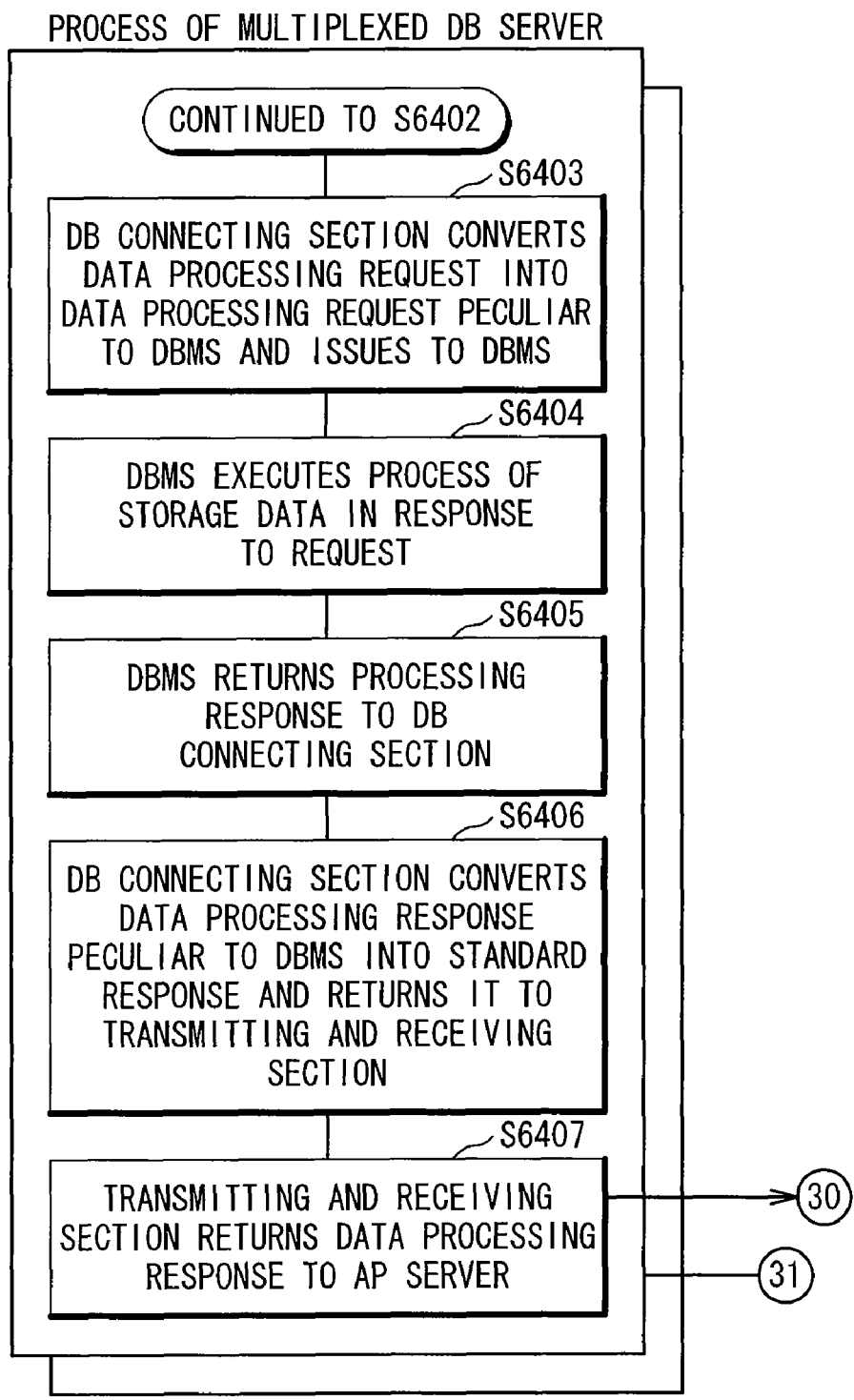
Figure 10F:
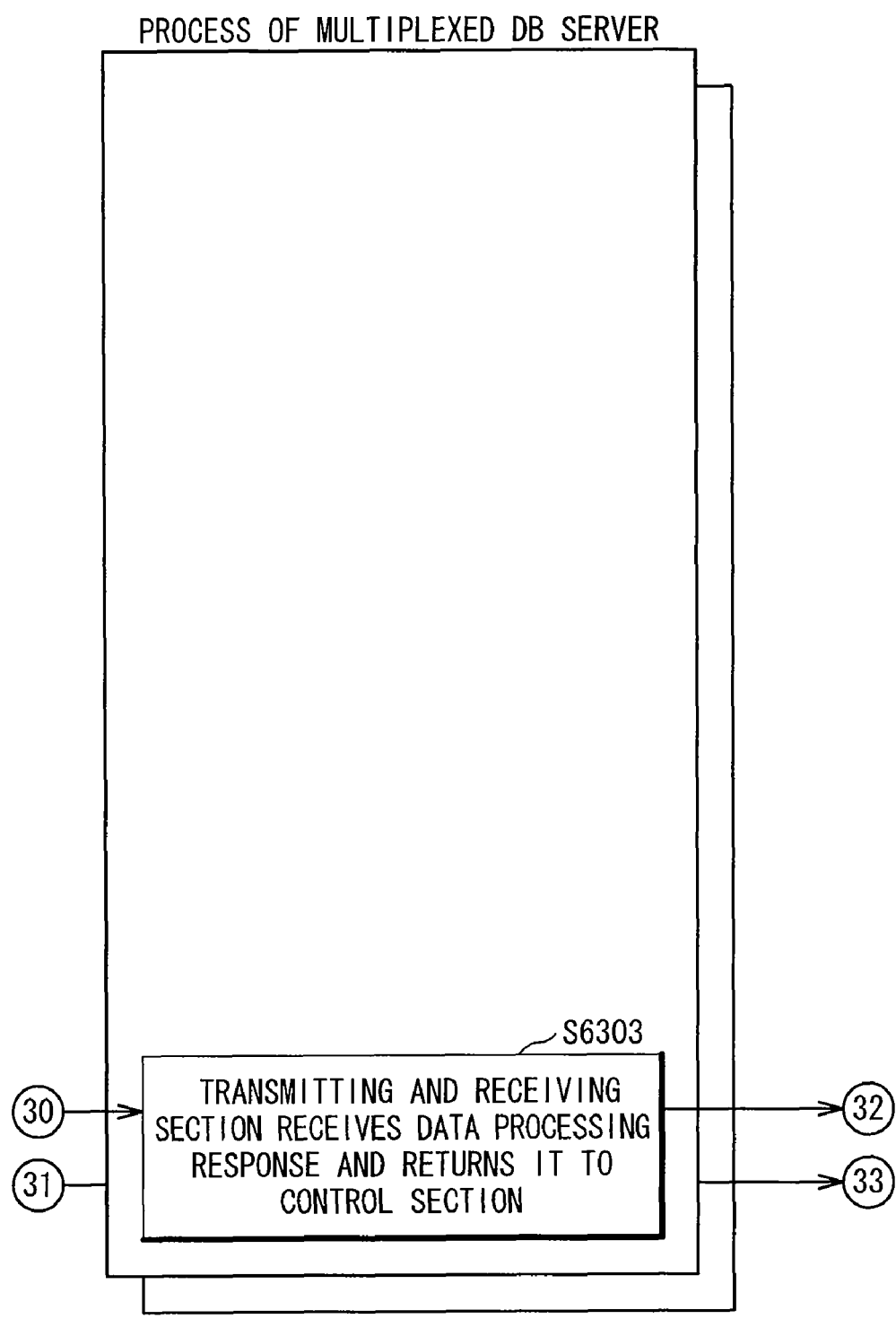
Figure 10G:
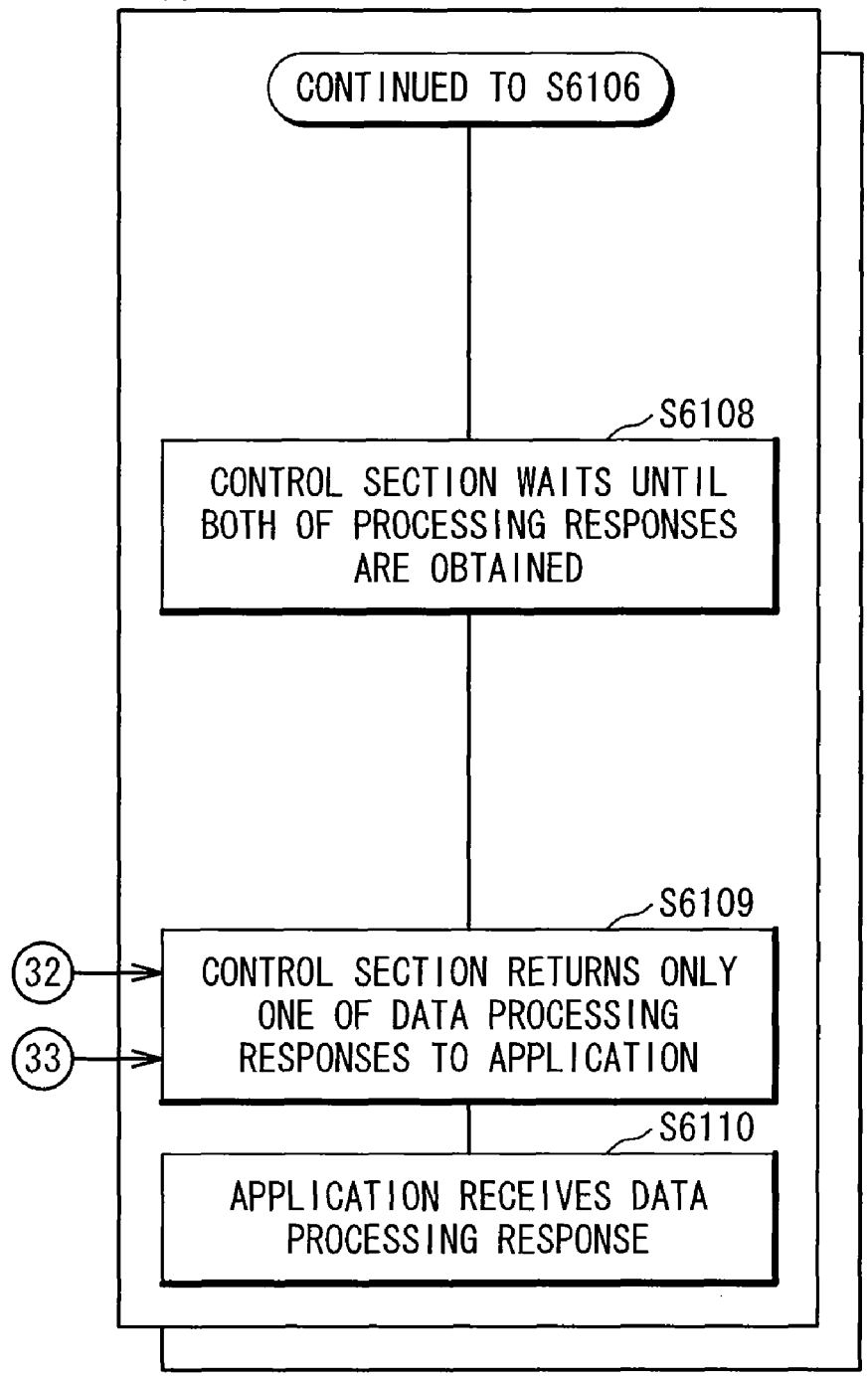

The operations of the application program 5310, the control section 5323, the permission requesting section 5324, the permission receiving section 5325 in this embodiment shown in the steps S6101-S6105 of FIG. 10A to 10C are same as those of the application program 3310, the control section 3323, the permission requesting section 3324, the permission receiving section 3325 in the first embodiment shown in the steps S4101-S4105 of FIGS. 4A to 4E. Therefore, the description will be omitted.

Figure 2:
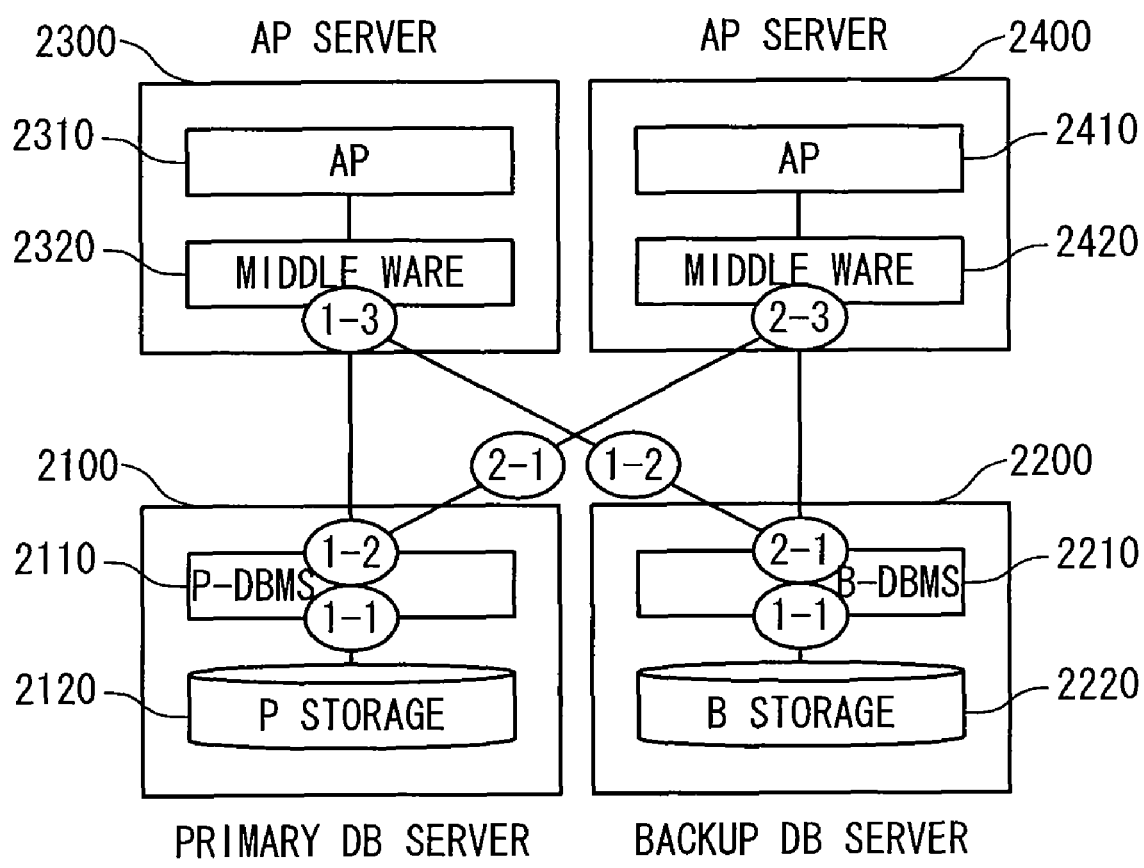
FIG. 2 is a diagram of the problem of the conventional data replica producing system.

Also, the operations of the sequence control server 5400 in this embodiment shown in the steps S6201-S6206 are same as those of the sequence control server 3400 in the first embodiment shown in the steps S4201-S4206 of FIG. 2. Therefore, the description will be omitted.

When process permission is received by the middle wares 5320 of the application servers 5300-1, 5300-2, . . . , 5300-n, the control section 5323 multiplexes the trapped data processing request and issues to the transmitting and receiving sections 5321 and 5322 (Step S6106). The transmitting and receiving sections 5321 and 5322 transfers the received data processing request to the database servers 5100 and 5200 (Step S6301). If the transmitting and receiving sections 5131 and 5231 receive the data processing request in the middle wares 5130 and 5230 of the database servers 5100 and 5200, the transmitting and receiving sections 5131 and 5231 reply reach responses to the transmitting and receiving sections 5321 and 5322 of the application server (Step S6401). If the transmitting and receiving sections 5321 and 5322 of the application server receive the reach responses, the transmitting and receiving sections 5321 and 5322 notify the reception of the reach responses to the completion notifying section 5326 (Step S6302). When that reach responses are received from both of the database servers, that is, it is confirmed that the data processing requests are supplied to both the database servers, the completion notifying section 5326 notifies that the data processing request is completed, to the sequence control server 5400 (Step S6307).

Again, in the middle wares 5130 and 5230 of the database servers 5100 and 5200, the transmitting and receiving sections 5131 and 5231 issue the received data processing requests to the database connecting sections 5132 and 5232 (Step S6402). The database connecting sections 5132 and 5232 convert the received standard data processing request into the data processing requests peculiar to the corresponding database management systems and issue them to the database management systems 5110 and 5210 (Step S6403). The database management systems 5110 and 5210 receive the data processing requests and process the data in the storages 5120 and 5220 according to the processing requests in a same way. Thus, the same effect that the data of the primary storage 5120 is copied to the backup storage 5220 can be accomplished (Step S6404).

The database management systems 5110 and 5210 return the results of the data processing to the database connecting sections 5132 and 5232 as the data processing responses (Step S6405). The database connecting sections 5132 and 5232 receive the data processing responses, convert the data processing responses peculiar to the database management systems into the standard data processing responses and return them to the transmitting and receiving sections 5131 and 5231 (Step S6406). The transmitting and receiving sections 5131 and 5231 transfer the received standard data processing responses to the application servers (Step S6407). If the transmitting and receiving sections 5321 and 5322 of the application server receive the data processing responses, the transmitting and receiving sections 5321 and 5322 transfer to the control section 5323 (Step S6303). Until this time, the control section 5323 waits the reception of both the data processing responses (Step S6108). If the data processing responses of both the database management systems are received, the control section 5323 returns only one of the two data processing responses to the application 5310 (Step S6109). If the data processing is normally carried out, the responses are logically same, and the responses has the same format when the responses are converted into the standard responses. Therefore, it is sufficient that one response is returned. Because the application program 5310 receives one data processing response to one data processing request, the service can be provided without being conscious of the producing process of the data replica and so on, (Step S6110). Through the above operation, only one data processing request is supplied to both the database servers in the whole system.

Next, the effect of the data replica producing system in this embodiment will be described. In this embodiment, the same effect as in the first embodiment can be accomplished, and in addition, the data processing can be at higher speed carried out. This is because the middle ware transfers the data processing request between the application server and the database server. Therefore, it is possible to detect that a data processing request is supplied to the database server. In the first embodiment, the database connecting section transfers the data processing request between the application program and the database server, and the protocol to be used is peculiar to the database. Therefore, it is impossible to detect the data processing request. When the data processing request is supplied to the database server, the completion can be notified to the sequence control server. The data processing request can be earlier issued, compared with the first embodiment after the process response is received from the database.

Fifth Embodiment

Figure 11:
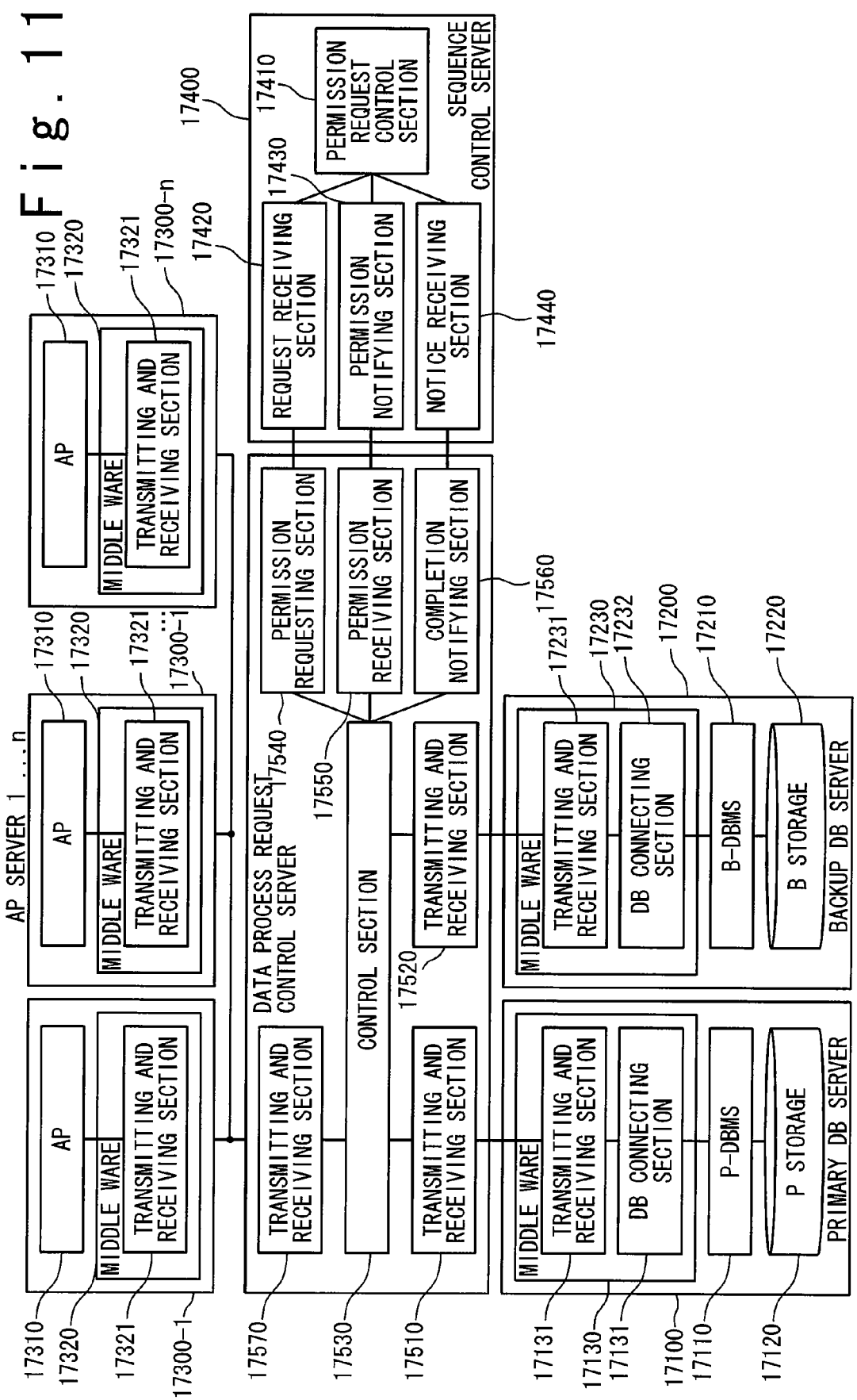
FIG. 11 is a block diagram showing the configuration of the data replica producing system according to a fifth embodiment of the present invention.
Figure 12D:
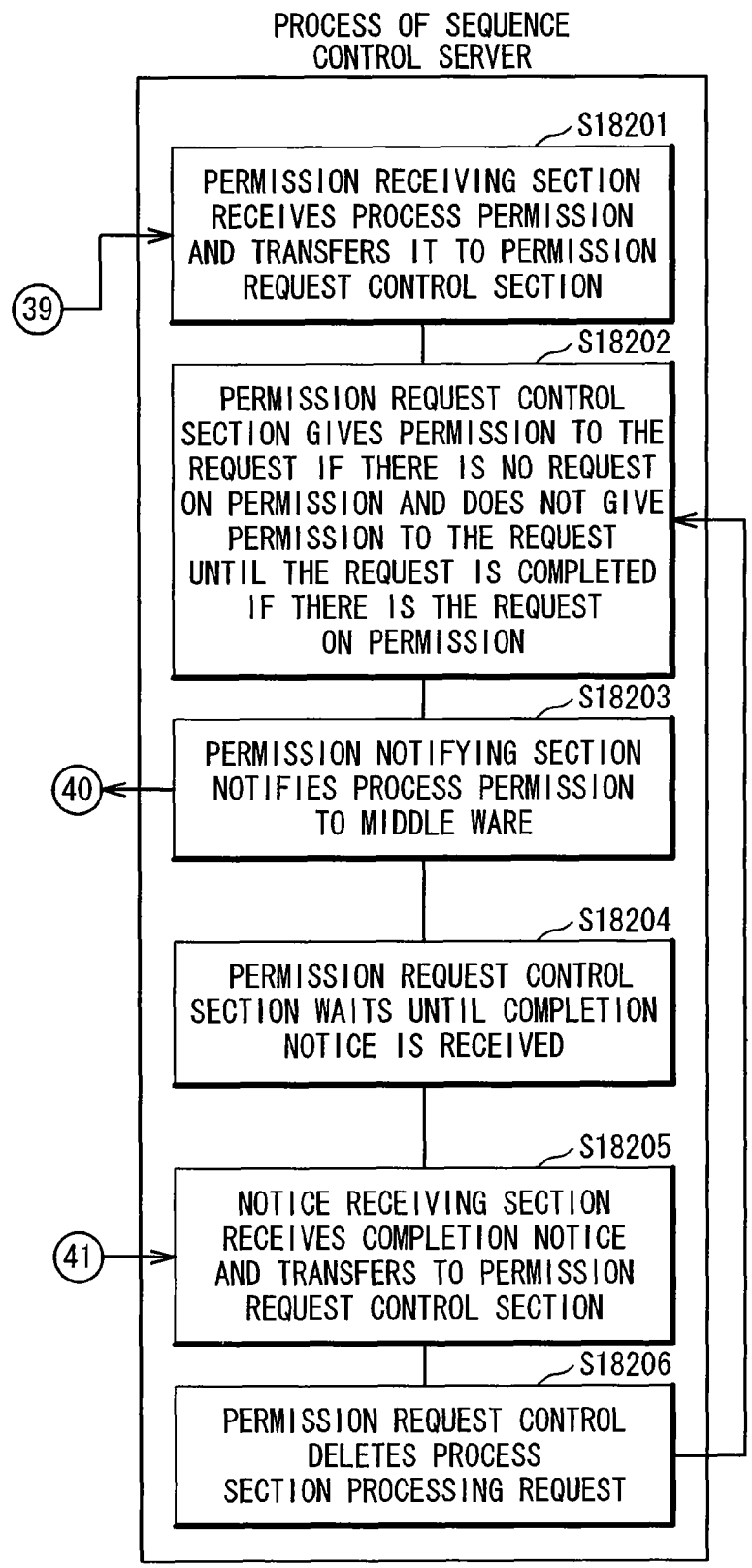
Figure 12E:
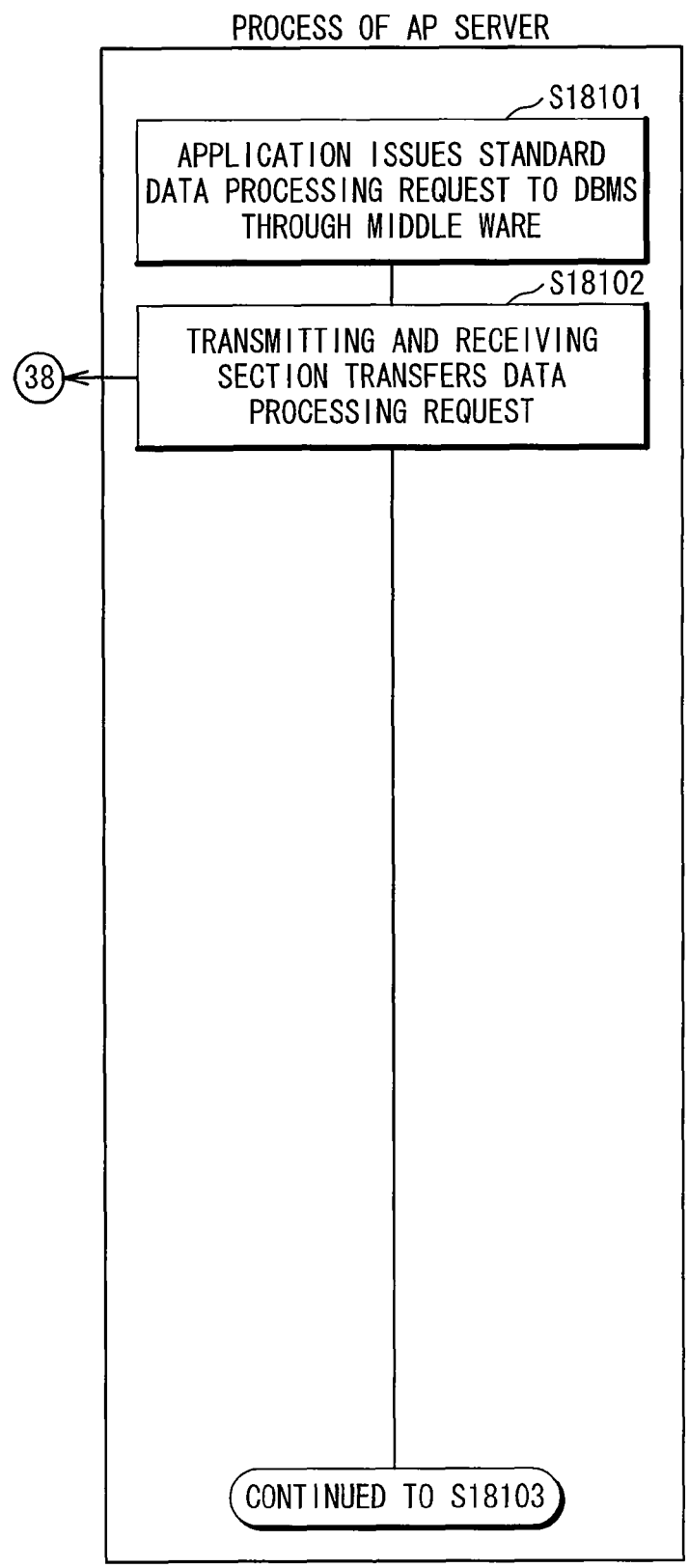
Figure 12F:
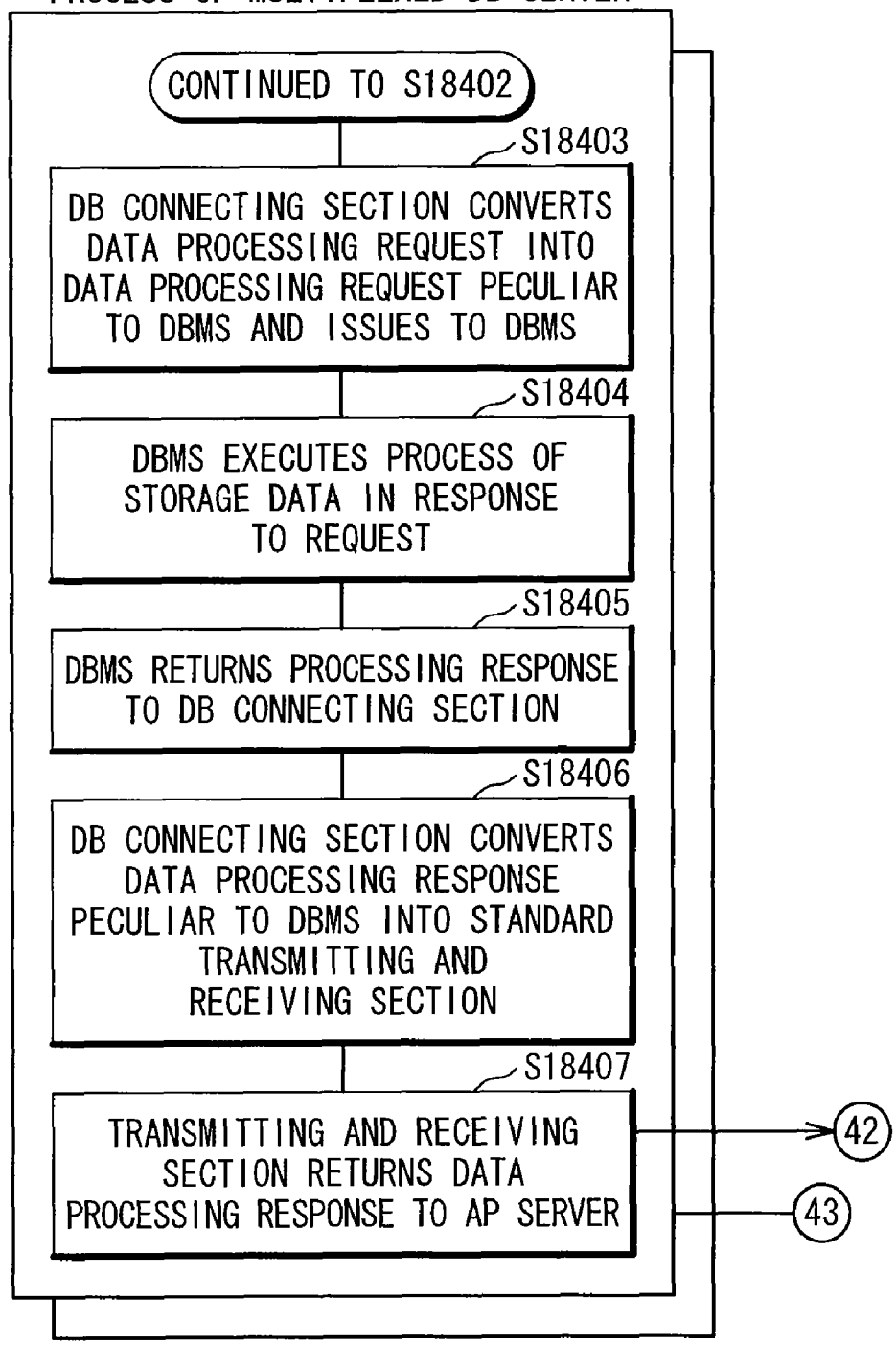
Figure 12G:
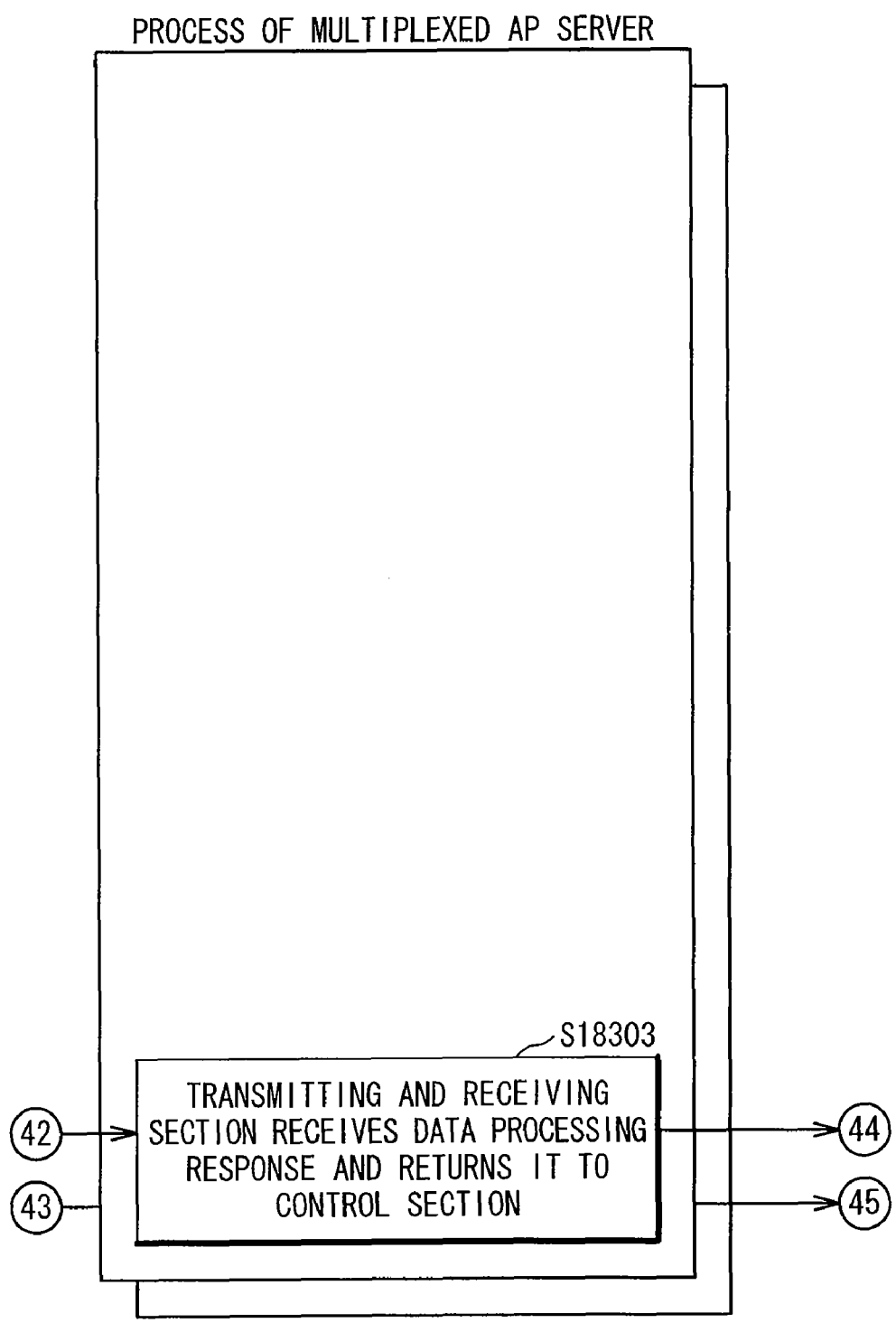
Figure 12H:
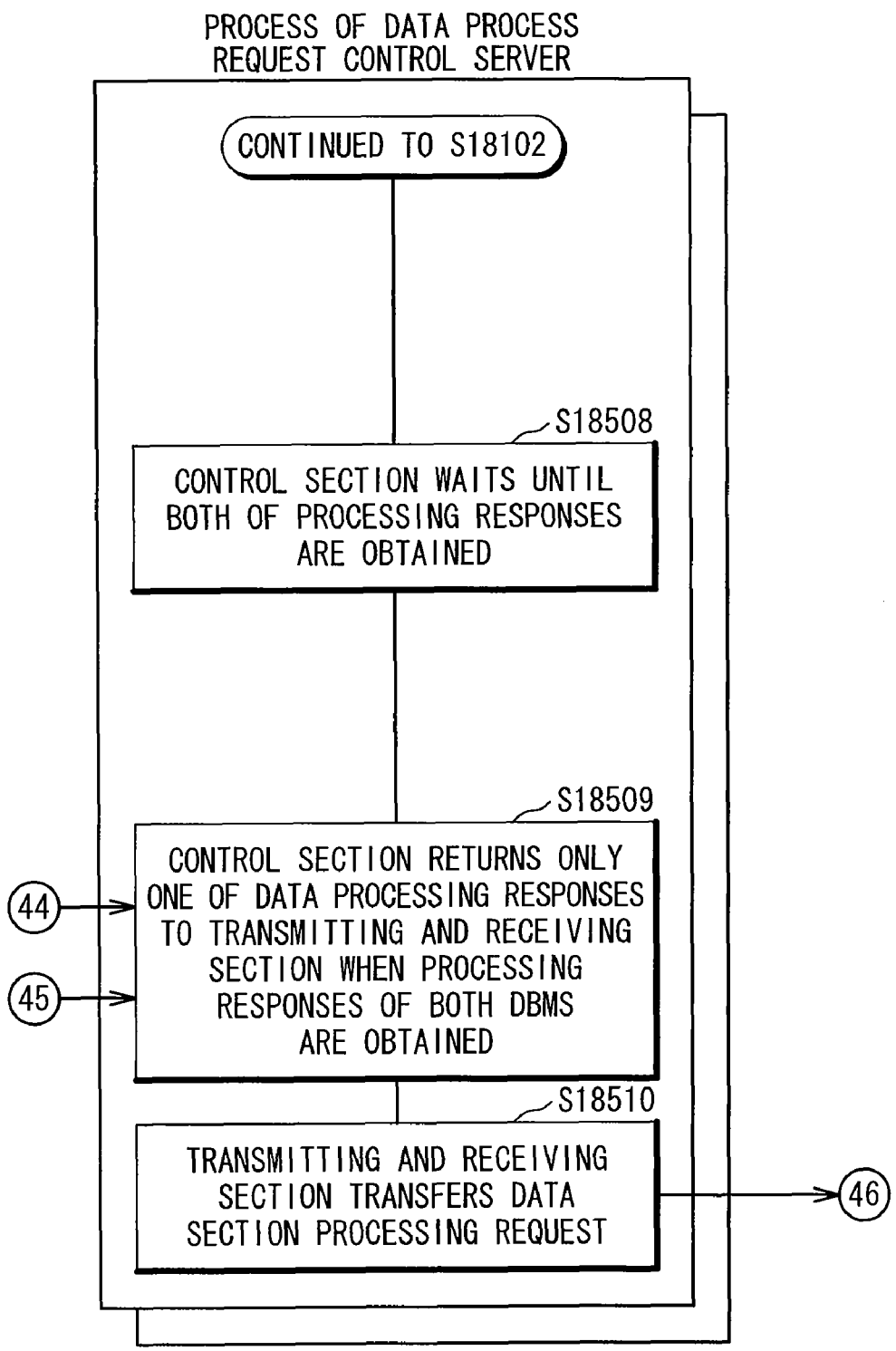
Figure 121:
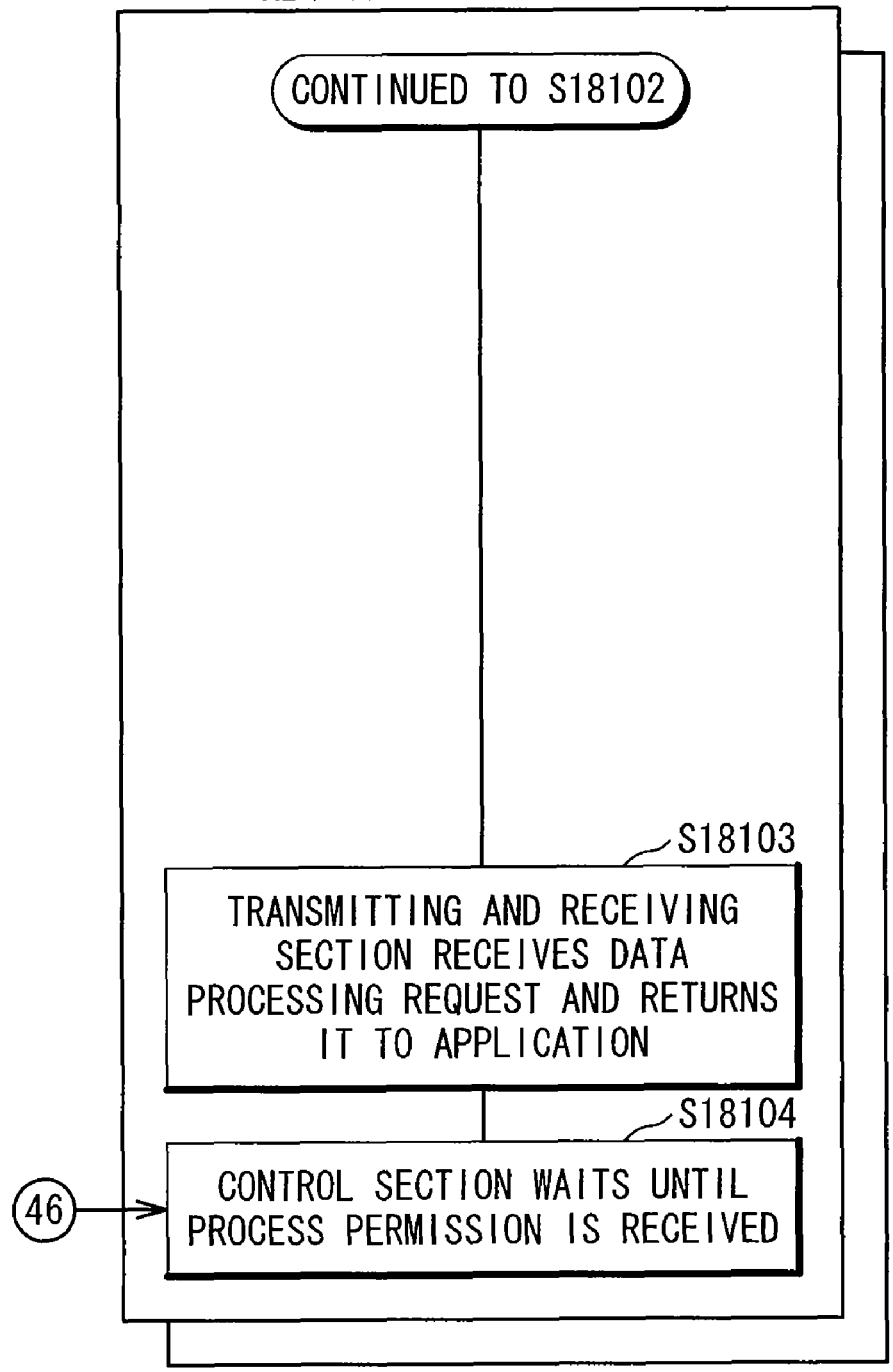

Next, the data replica producing system according to the fifth embodiment of the present invention will be described below in detail. Referring to FIG. 11, the data replica producing system according to the fifth embodiment of the present invention is composed of n application servers 17300-1, 17300-2, . . . , 17300-n which provide services, a primary database server 17100 on which provides data to these application servers 17300-1, 17300-2, . . . , 17300-n, a backup database server 17200 which is a replica of the primary database server 17100, a sequence control server 17400 which controls the process order of the data processing requests, and a data processing request control server 17500 which controls data processing requests from the application servers 17300-1, 17300-2, . . . , 17300-n. The computer systems which realize the application servers 17300-1, 17300-2, . . . , 17300-n, the database servers 17100 and 17200 and the sequence control server 17400 may be physically separate and may be the same.

The primary database server 17100 is composed of a storage 17120, a database management system 17110 and a middle ware 17130, like the primary database server 5100 in the fourth embodiment. This middle ware 17130 is composed of a transmitting and receiving section 17131 and a database connecting section 17132, like the middle ware 5130 in the fourth embodiment. The backup database server 17200 is composed of a storage 17220, a database management system 17210 and a middle ware 17230, like the backup database server 5200 in the fourth embodiment. The middle ware 17230 is composed of a transmitting and receiving section 17231 and a database connecting section 17232, like the middle ware 5230 in the fourth embodiment.

Each of the application servers 17300-1, 17300-2, . . . , 17300-*n* is composed of an application program 17310 which issues a data processing request to the database management system and a middle ware 17320 which provides a common function to the plurality of application programs. The middle ware 17320 is composed of a transmitting and receiving section 17321 for carrying out the transmission and reception of the data processing request.

The sequence control server 17400 is composed of a request receiving section 17420, a permission notifying section 17430, a notice receiving section 17440 and a permission request control section 17410, like the sequence control server 5400 in the fourth embodiment. The data processing request control server 17500 is composed of transmitting and receiving sections 17510 and 17520, a control section 17530, a permission requesting section 17540, a permission receiving section 17550 and a completion notifying section 17560, like the middle ware 5320 in the fourth embodiment, and is further composed of a transmitting and receiving section 17570 for carrying out the transmission and reception of the data processing request.

Next, the operation of the data replica producing system in this embodiment will be described below in detail with reference to FIG. 11 and a flow chart of FIGS. 12A to 12I.

The application program 17310 in the application server 17300-1 issues a standard data processing request, which is based on the standard interface, through the middle ware 17320 when requesting data processing to the primary database management system 17110 (Step S18101). The middle ware 17320 receives the standard data processing request, and the transmitting and receiving section 17321 transfers the data processing request to the data processing request control server 17500 (Step 18102). The transmitting and receiving section 17570 issues the received data processing request to the control section 17530 (Step 18501). Since this step, the operations of the data processing request control server 17500 in this embodiment shown in the steps S18502-S18508 of FIGS. 12A to 12I, the operations of the sequence control server 17400 in this embodiment shown in the steps S18201-S18206, the operations of the data processing request control server 17500 in this embodiment shown in the steps S18301-S18303, and the operations of the database servers 17100 and 17200 in this embodiment shown in the steps S18401-S18407 are same as the operations of the application server 5300 in the fourth embodiment shown in the steps S6102-S6108 of FIGS. 10A to 10G, the operations of the sequence control server 5400 in the fourth embodiment shown in the steps S6201-S6206, the operations of the application server 5300 in the fourth embodiment shown in the steps S6301-S6303, and the operations of the database servers 5100 and 5200 in the fourth embodiment shown in the steps S6401-S6407. Therefore, the description thereof will be omitted.

If the data processing responses are received from both the database management systems, the control section 17530 returns only one of the two data processing responses to the transmitting and receiving section 17570 (Step S18509). If the data processing is normally carried out, the responses are logically same. Also, the responses are same when the standard data processing response is converted. Therefore, it is sufficient that one response is returned.

The transmitting and receiving section 17570 receives the data processing response and transfers it to the application server 17300-1 (Step S18510). The transmitting and receiving section 17321 returns the received data processing response to the application program 17310 (Step S18103). Because the application program 17310 receives one data processing response to one data processing request, the service can be provided without being conscious of the producing process of the data replica and so on (Step S18104). Through the above operation, only one data processing request is always supplied to both of the database servers in the whole system.

Next, the effect of the data replica producing system in this embodiment will be described. In this embodiment, the same effect as in the fourth embodiment can be accomplished. In addition, the maintainability is improved by concentrating a data processing request controlling function in the data processing request control server. Also, the application server can be made lightened in load by separating a data processing request controlling function from the application server.

Sixth Embodiment

Next, the data replica producing system according to the sixth embodiment of the present invention will be described below in detail with reference to the drawings.

Figure 13:
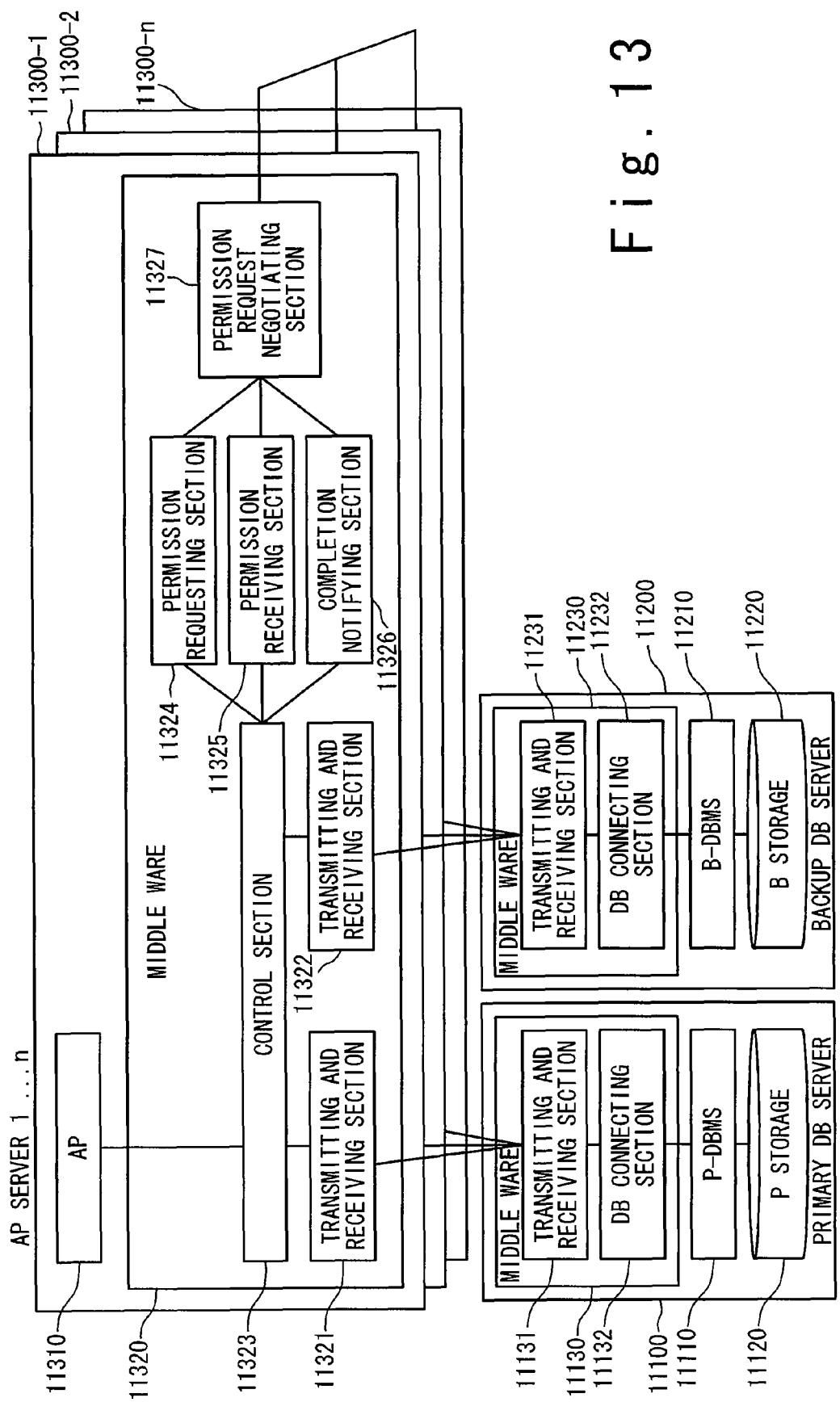
FIG. 13 is a block diagram showing the configuration of the data replica producing system according to a sixth embodiment of the present invention.
Figure 14B:
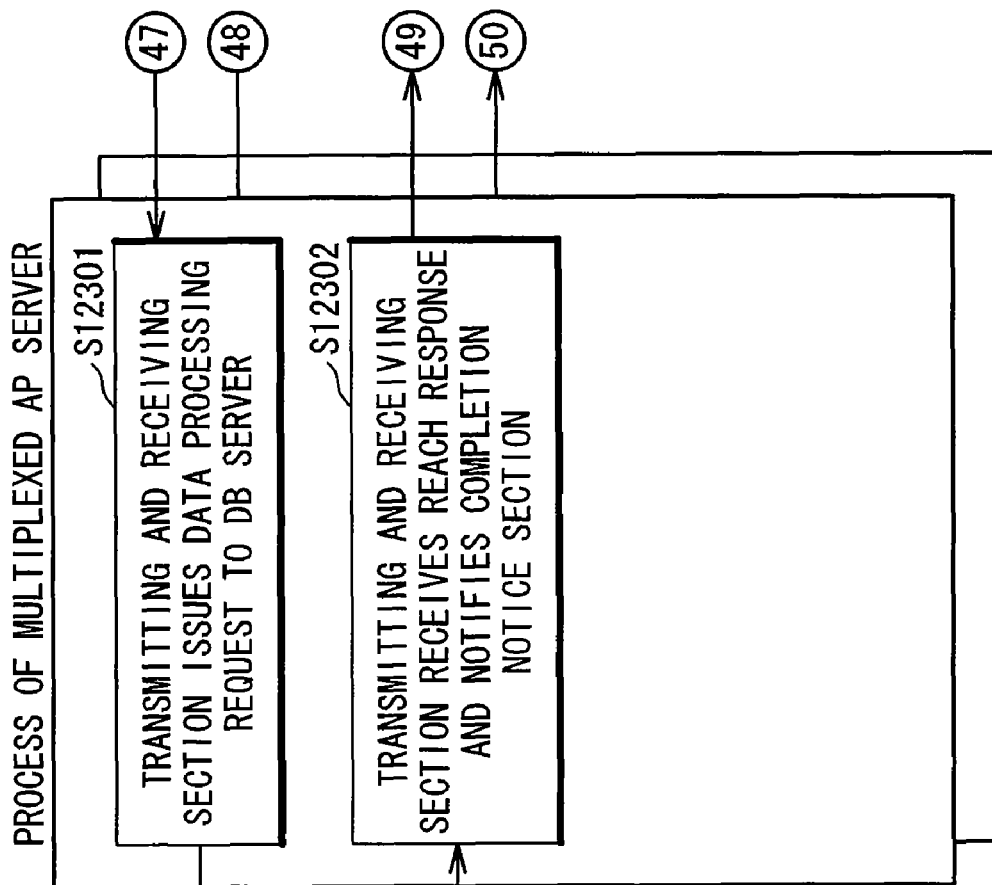
FIGS. 14A to 14G are a flow chart showing the operation of the data replica producing system in the sixth embodiment of the present invention.
Figure 14A:
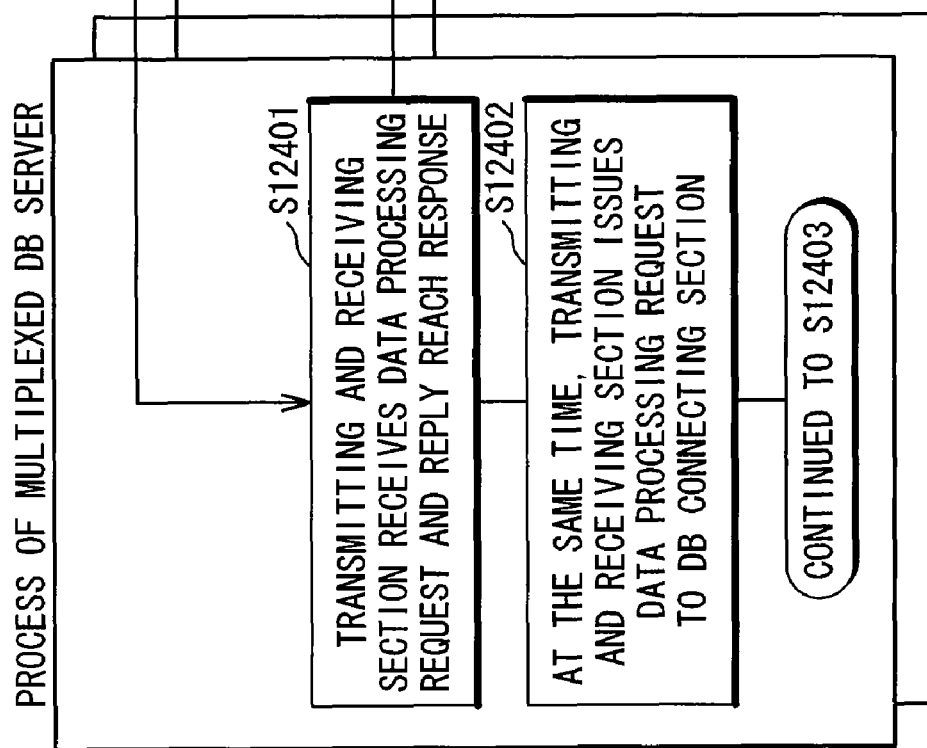
Figure 14C:
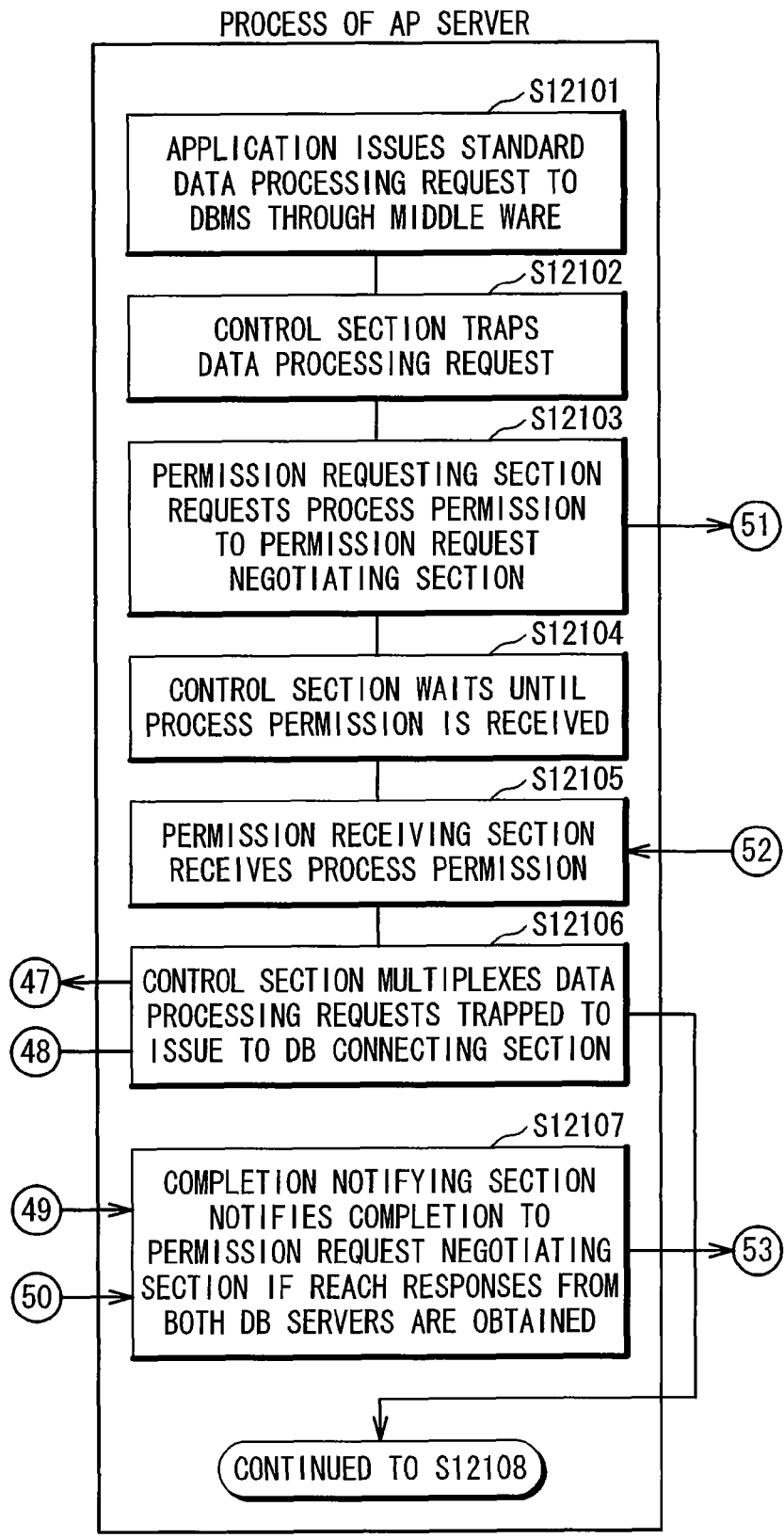
Figure 14D:
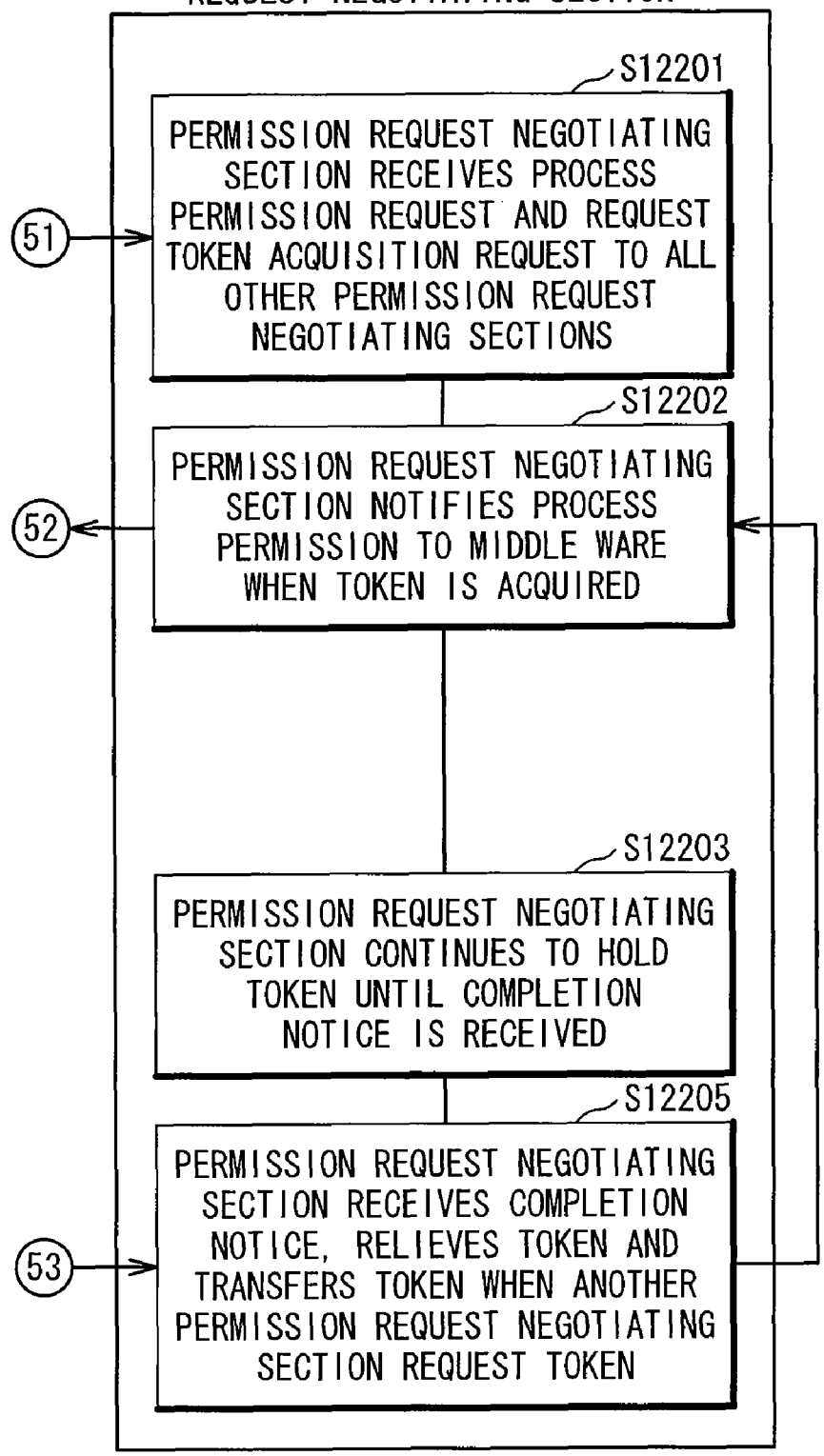
Figure 14E:
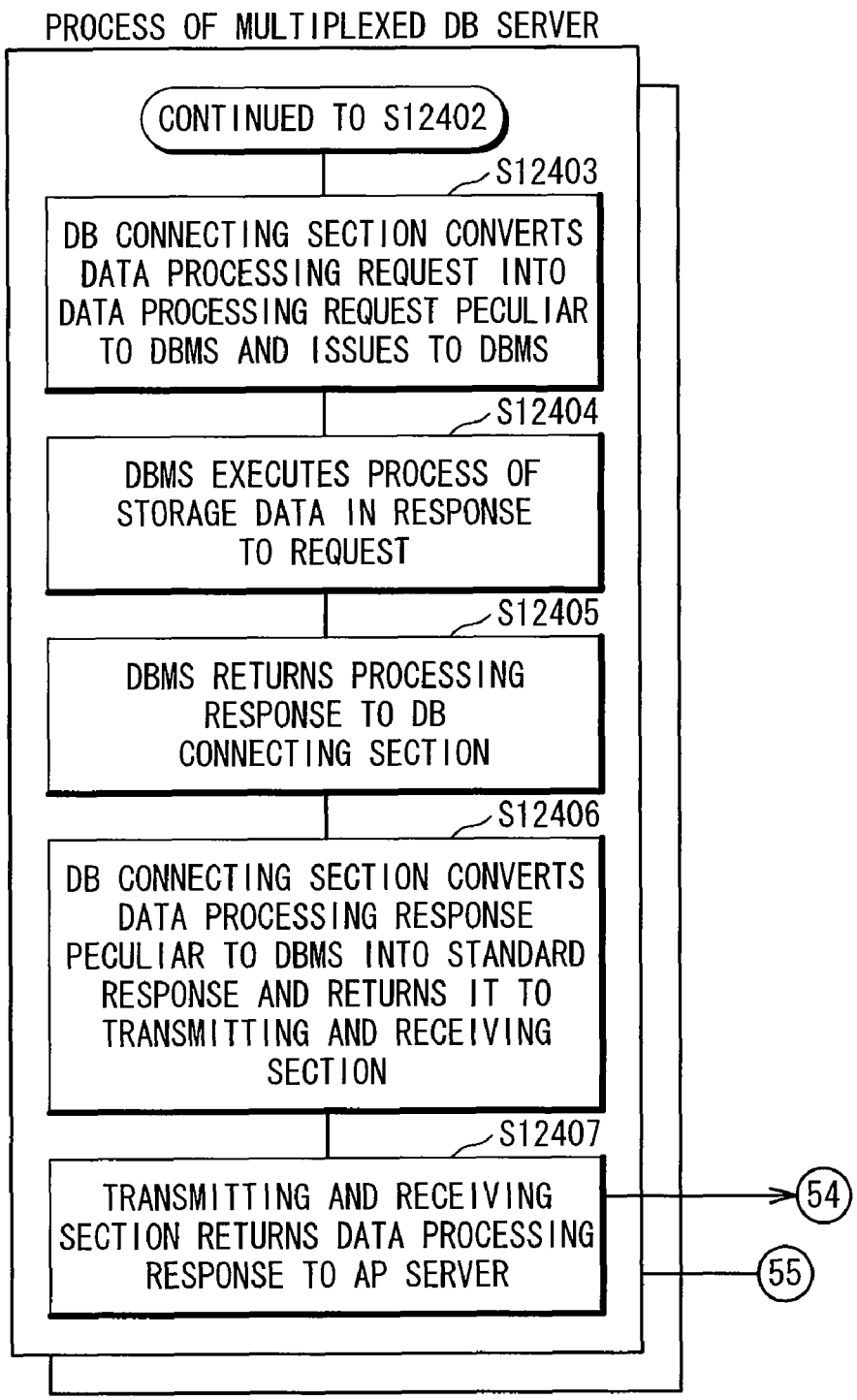
Figure 14F:
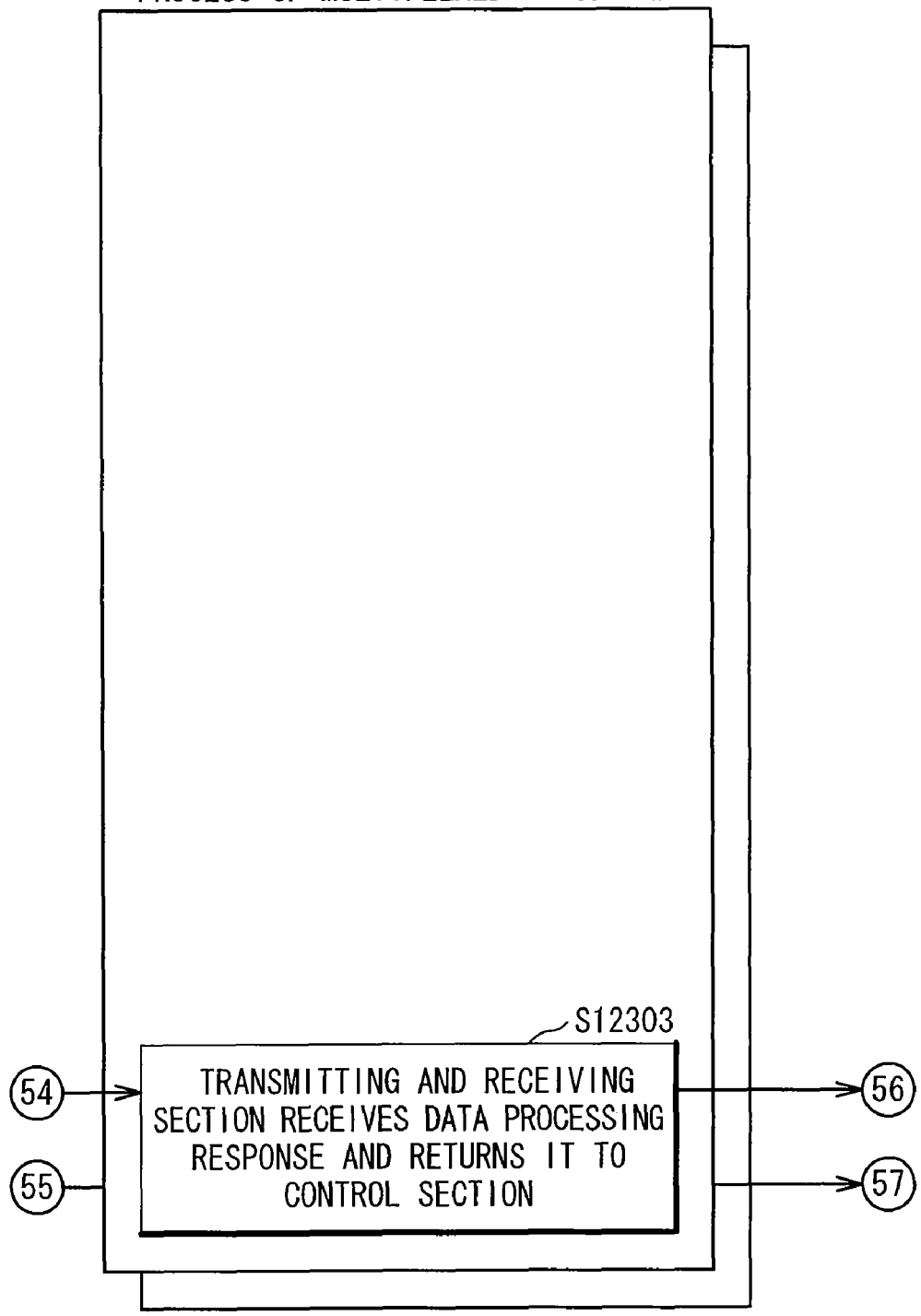
Figure 14G:
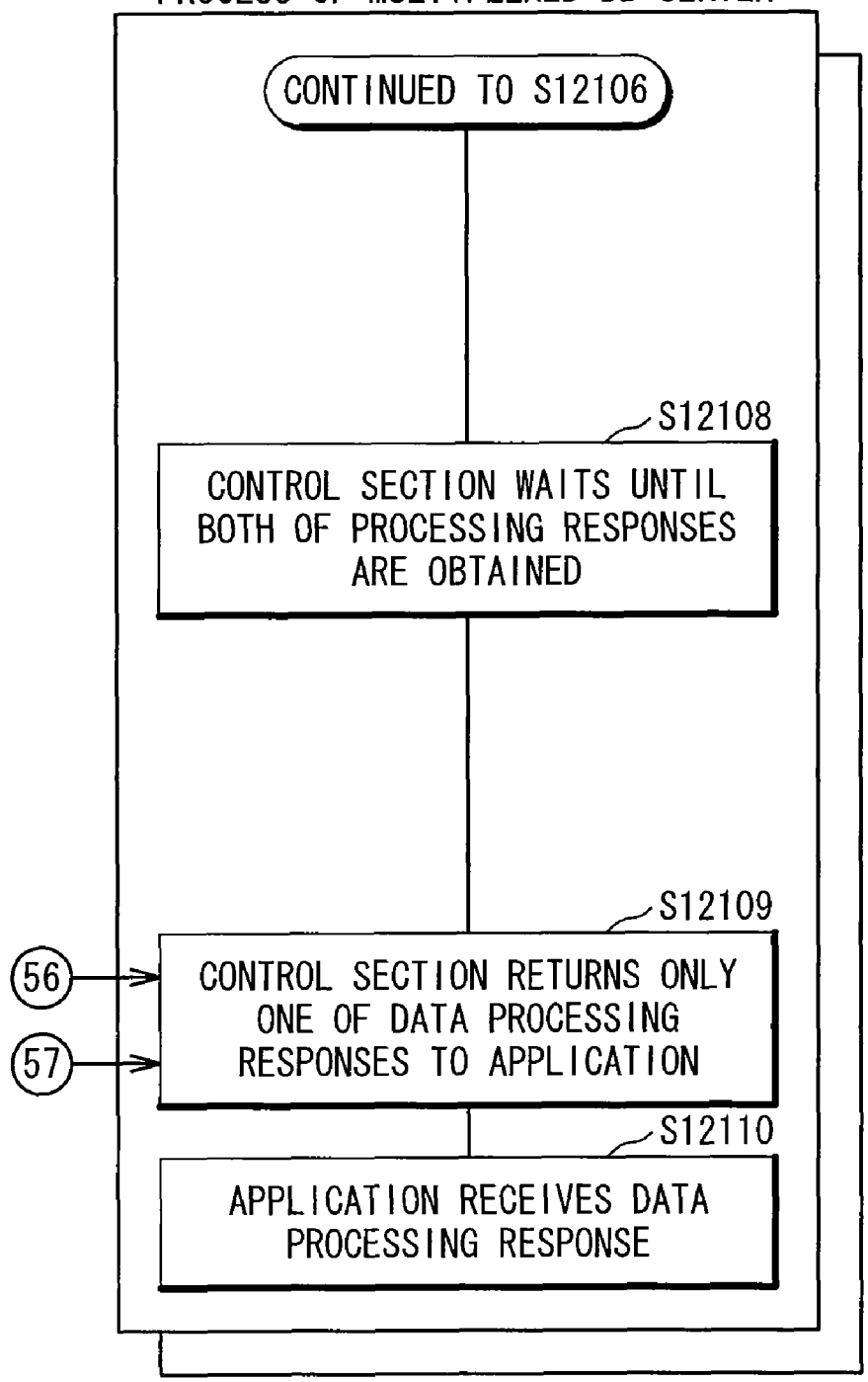

Referring to FIG. 13, the data replica producing system according to the sixth embodiment of the present invention is composed of n application servers 11300-1, 11300-2, . . . , 11300-*n* which provide services, a primary database server 11100 which provides data to these application servers 11300-1, 11300-2, . . . , 11300-*n*, and a backup database server 11200 which is a replica of the primary database server 11100. The computer systems which realize the application servers 11300-1, 11300-2, . . . , 11300-*n* and the database servers 11100, 11200 may be separate physically and may be same.

The primary database server 11100 is composed of a storage 11120, a database management system 11110 and a middle ware 11130, like the primary database server 5100 in the fourth embodiment. The middle ware 11130 is composed of a transmitting and receiving section 11131 and a database connecting section 11132, like the middle ware 5130 in the fourth embodiment. Also, the backup database server 11200 is composed of a storage 11220, a database management system 11210 and a middle ware 11230, like the backup database server 5200 in the fourth embodiment. The middle ware 11230 is composed of a transmitting and receiving section 11231 and a database connecting section 11232, like the middle ware 5230 in the fourth embodiment.

Each of the application servers 11300-1, 11300-2, . . . , 11300-*n* is composed of an application program 11310 which issues a data processing request to the database management system and a middle ware 11320 which provides a common function to the plurality of application. The middle ware 11320 is composed of transmitting and receiving sections 11321 and 11322, a control section 11323, a permission requesting section 11324, a permission receiving section 11325 and a completion notifying section 11326, like the middle ware 5320 in the fourth embodiment, and is further composed of a permission request negotiating section 11327 for negotiating with the middle ware of the other application server about the permission request.

Next, the operation of the data replica producing system in this embodiment will be described below in detail with reference to FIG. 13 and a flow chart of FIGS. 14A to 14G.

The operations of the application server 11300 in this embodiment shown in the steps S12101-S12110 and the steps S12301-S12303 of FIGS. 14A to 14G, the operations of the database servers 11100 and 11200 in this embodiment shown in the steps S12401-S12407 are same as the operations of the application server 5300 in the fourth embodiment shown in the steps S6101-S6110 and the steps S6301-S6303 of FIGS. 10A to 10G, and the operations of the database servers 5100 and 5200 in the first embodiment shown in the steps S6401-S6407. Therefore, the description thereof will be omitted.

When the permission request negotiating section 11327 receives a permission request from the permission requesting section 11324, the permission request negotiating section 11327 negotiates with the permission request negotiating section in the middle ware of the other application server on whether permission may be notified. In this embodiment, a token passing method is used as the negotiation method, but the method is not limited to this method.

First, the permission request negotiating section 11327 receives the permission request and issues a token acquisition request to the entire permission request negotiating sections in the system, including itself (Step S12201). If the token is released, the permission request negotiating section 11327 acquires the token and notifies process permission to the permission receiving section 11325 (Step S12202). If any token is not released, the permission request negotiating section 11327 waits until the token can be acquired.

The permission request negotiating section 11327 continues to secure a token until it receives a completion notice after notification of the permission notice (Step 12203). The permission request negotiating section 11327 receives the completion notice from the completion notifying section 11326 and releases the token (Step S12205). If there is a token acquisition request from any of the permission request negotiating sections in the system including itself, the permission request negotiating section 11327 hands over the token. Through the above operations, only one data processing request is supplied to both the database servers in the whole system.

Next, the effect of the data replica producing system in this embodiment will be described.

The present embodiment has the same effect as in the fourth embodiment and does not have a single trouble point such as the sequence control server. Therefore, the availability can be improved.

[Modifications]

As described above, the present invention has been described. However, the present invention is not limited to the above embodiments and various modifications are possible. For example, in each embodiment of the present invention, the sequence control server and the data processing request control server are realized in a single server. However, the functions of these servers may be provided for any one of the application servers or any one of the database servers. Also, a plurality of sequence control servers and data processing request control servers are prepared, and when a trouble has occurred in one sequence control server, another sequence control server may be automatically driven to achieve the function of the failed sequence control server. Otherwise, a permission request control is carried out by the sequence control server in a normal state. However, when a trouble has occurred in the sequence control server, the middle wares of the application servers negotiate with each other to carry out the permission request control.

Also, in each embodiment of the present invention, one backup database server is adopted to the application server group and the one primary database server. However, modifications having other configurations may be adopted. The modifications are only examples.

1) Modification 1 (One to N Configuration)

Figure 15:
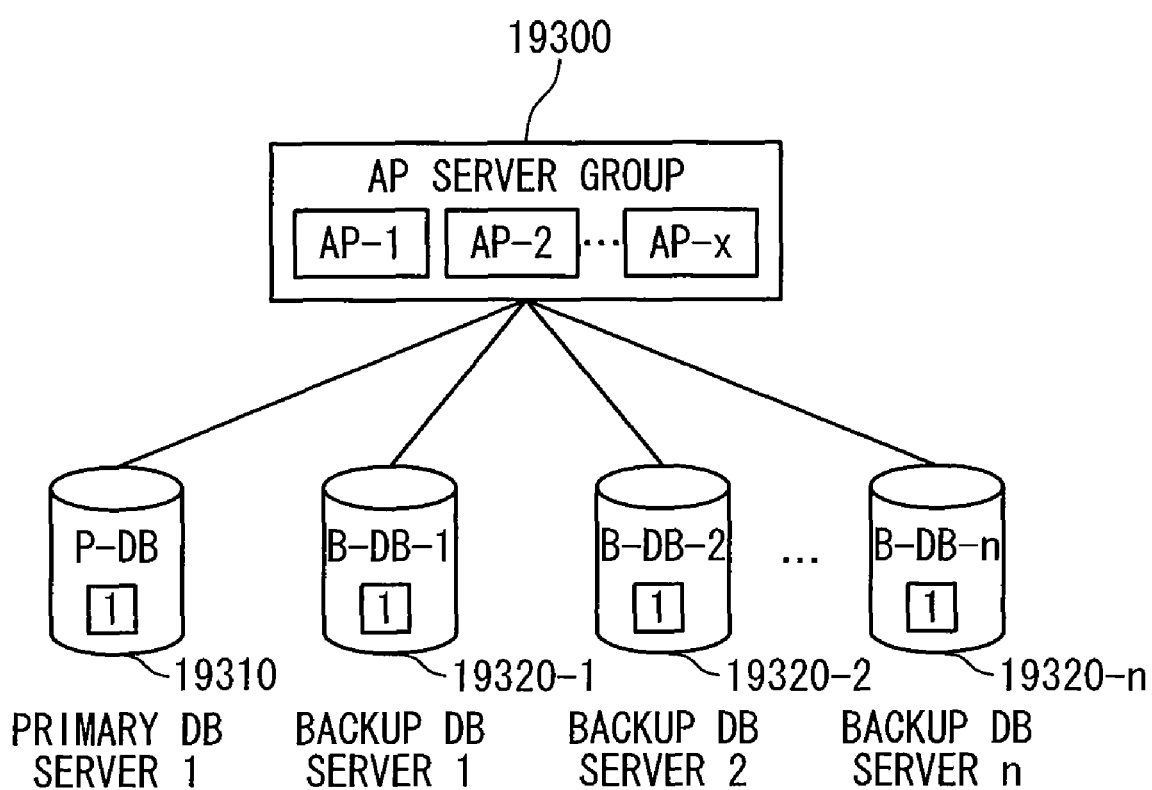
FIG. 15 is a block diagram showing a modification in a 1 to N configuration.

The outline of this modification is shown in FIG. 15. Referring to FIG. 15, this modification is composed of one application server group 19300, a primary database server 19310, and a plurality of backup database servers 19320-1, 19320-2, ..., 19320-n. The replica of data in the primary database server 19310 is produced in all the backup database servers 19320-1, 19320-2, ..., 19320-n.

This modification is realized by each application program of the application server group 19300 issuing a data processing request to not one backup database server but the plurality of backup database servers 19320-1, 19320-2, ..., 19320-n. In this modification, because the plurality of backup database servers exist, the service can be continued by using the data of left database server(s), even if a plurality of database servers including the primary database server 19310 are failed.

2) Modification 2 (N to 1 Configuration)

Figure 16:
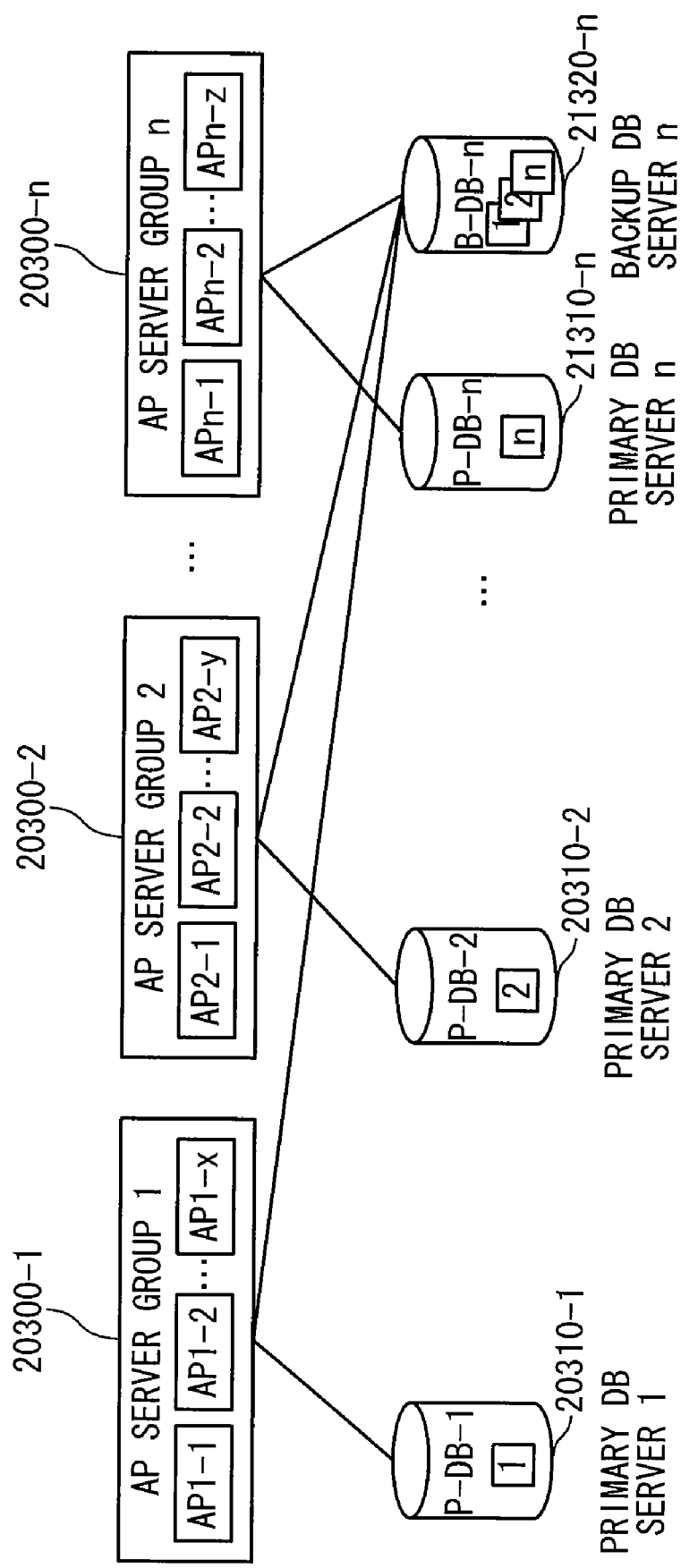
FIG. 16 is a block diagram showing modification in an N to 1 configuration.

The outline of this modification is shown in FIG. 16. Referring to FIG. 16, this modification is composed of a plurality of application server groups 20300-1, 20300-2, ..., 20300-n, and a plurality of primary database servers 20310-1, 20310-2, ..., 20310-n and a backup database server 20320. The data of the plurality of primary database servers 20310-1, 20310-2, ..., 20310-n are concentrated and the replica of the data is produced in the backup database server 20320.

This modification can be realized by the backup database server 20320 applying the data processing requests issued from the plurality of application server groups 20300-1, 20300-2, ..., 20300-n to logically different areas of the backup database server 20320. In this modification, because it is not necessary to prepare backup systems for the application server groups and the primary database servers, the whole system can be configured with a low cost.

3) Modification 3 (N to M Configuration)

Figure 17:
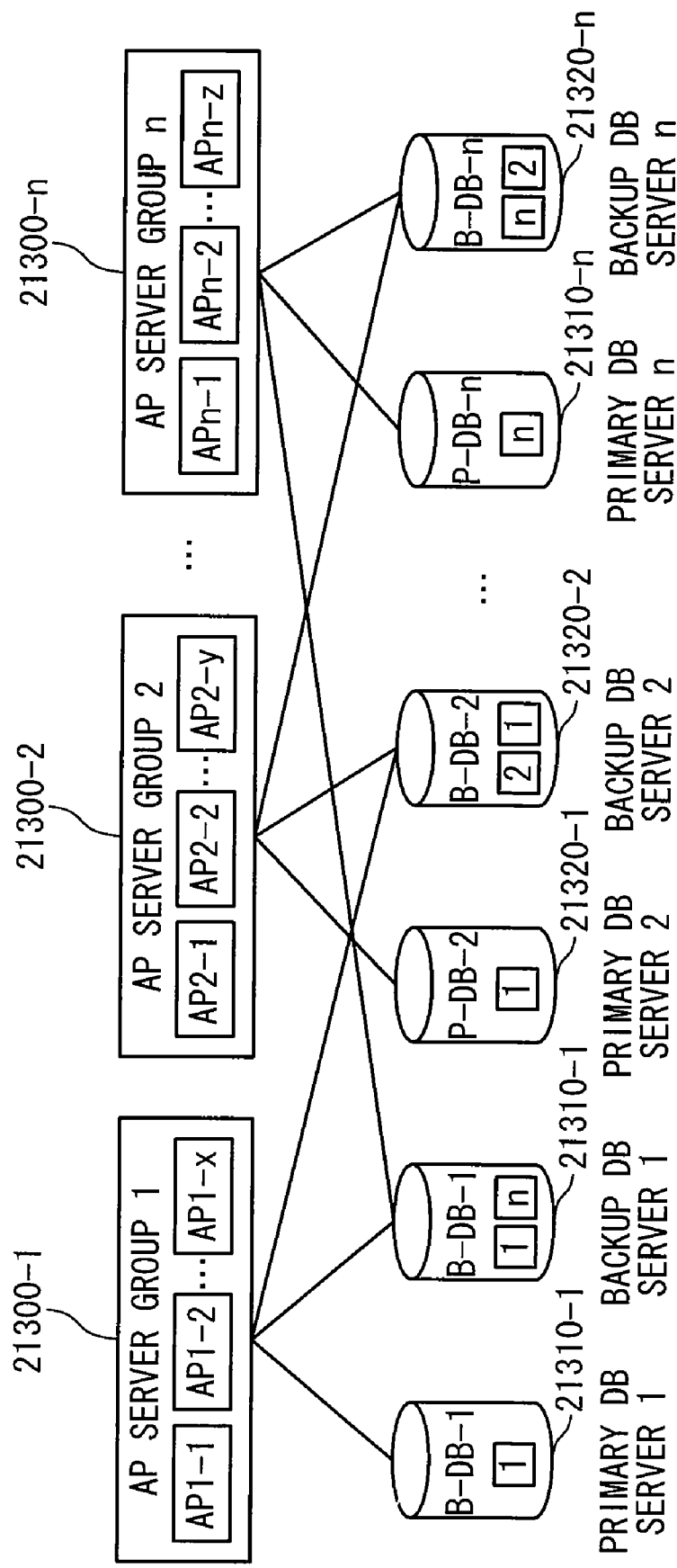
FIG. 17 is a block diagram showing a modification in an N to M configuration.

The outline of this modification is shown in FIG. 17. Referring to FIG. 17, this modification is composed of a plurality of application server groups 21300-1, 21300-2, ..., 21300-n, a plurality of primary database servers 21310-1, 21310-2, ..., 21310-n, and a plurality of backup database servers 21320-1, 21320-2, ..., 21320-m. The replica of the data of one of the plurality of primary database servers 21310-1, 21310-2, ..., 21310-n is produced on one or more of the plurality of backup database servers 21320-1, 21320-2, ..., 21320-m.

In this modification, each application program of the application server groups 21300-1, 21300-2, ..., 21300-n issues a data processing request to one or more of the plurality of backup database servers 21320-1, 21320-2, ..., 21320-m. Moreover, each of the one or more backup database servers 21320-1, 21320-2, ..., 21320-m applies the data processing requests issued from the application programs of the application server groups 21300-1, 21300-2, ..., 21300-n to logically different areas of the backup database server.

In this modification, the fault endurance is high, because the plurality of backup database servers exist as in case of 1 to N configuration. Also, the cost of the system construction can be reduced because the data are concentrated as in case of the N to 1 configuration.

4) Modification 4 (Chain Configuration)

Figure 18:
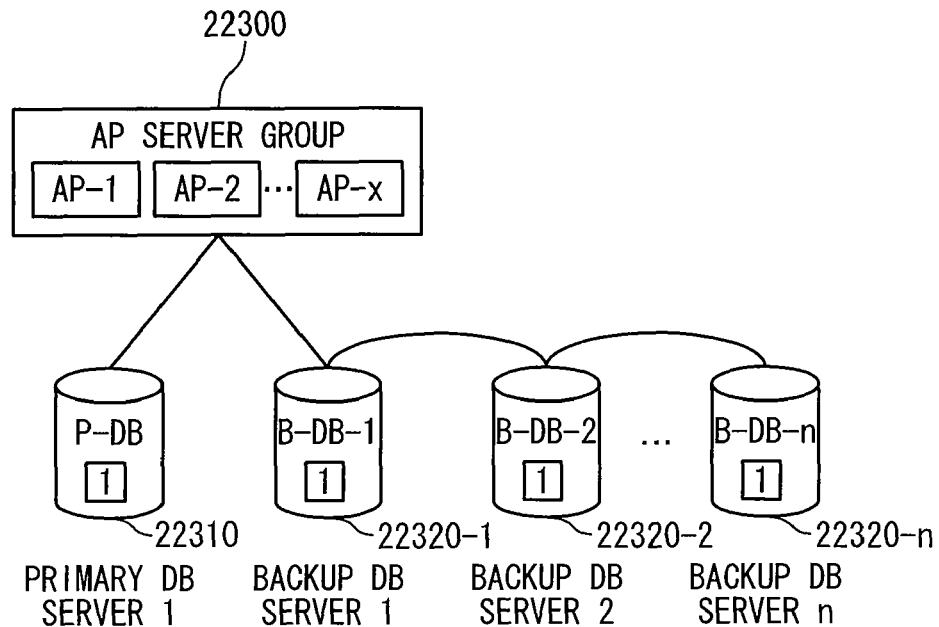
FIG. 18 is a block diagram showing a modification of a chain configuration.

The outline of this modification is shown in FIG. 18. Referring to FIG. 18, this modification is composed of one application server group 22300, one primary database server 22310, and a plurality of backup database servers 22320-1, 22320-2, ..., 22320-n which are connected in series. A replica of the data of the primary database server 22310 is produced in all the backup database servers 22320-1, 22320-2, ..., 22320-n.

In this modification, each of the backup database servers 22320-1, 22320-2, ..., 22320-$n$ can receive a data processing request and may transfer the data processing request to another. In this modification, the fault endurance is high, the plurality of backup database servers exist as in case of 1 to N configuration. Also, each application program of application server group 22300 issues a data processing request only to one 22320-1 of backup database servers in addition of the primary database server 22310. The backup database server 22320-1 transfers the data processing request to another. Therefore, it is possible to avoid concentration of the data processing to a specific one backup database server.

5) Modification 5 (Mutual Configuration)

Figure 19:
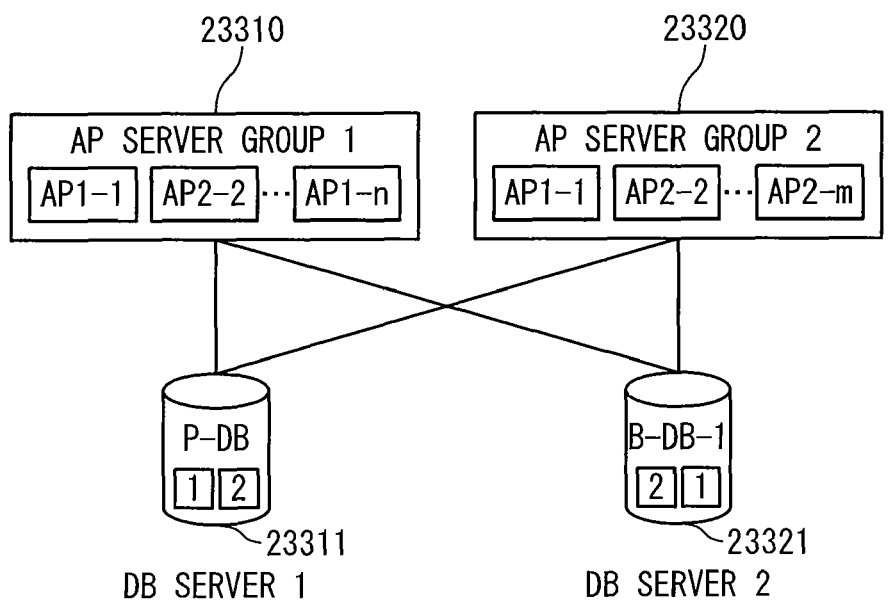
FIG. 19 is a block diagram showing a modification in mutual configuration.

The outline of this modification is shown in FIG. 19. Referring to FIG. 19, this modification is composed of application server groups 23310 and 23320 and database servers 23311 and 23321. A replica of the data of database server 23311 is produced by the database server 23321 and a replica of the data of database server 23321 is produced by the database server 23311.

In this embodiment, the application server group 23310 regards the database server 23311 as a primary database server and the database server 23321 as a backup database server. Also, the application server group 23320 regards the database server 23311 as a backup database server and the database server 23321 as a primary database server. Moreover, the database servers 23311 and 23321 apply the data processing requests issued from the application server groups 23310 and 23320 to the logically different areas of the application server group 23310.

This modification is to provide service for the backup system to make operate application and can utilize a system without any wastefulness. Also, in case that a plurality of sets of the application server group and the primary database server are already present in the system, it is possible to synchronously produce a replica, even if a backup database server is not prepared newly. It should be noted that this example is composed of two systems but the number of systems may be two or more.

Also, each component which realizes the data multiplexing function in each embodiment of the present invention can be realized by a computer and a program in addition to realizing the function in hardware. The program is recorded to the computer-readable recording medium such as a magnetic disk and a semiconductor memory and is read by the computer at start-up of the computer. The function is achieved as the component in each embodiment by controlling the operation of the computer.

The present invention can be applied to a field such as the construction of the system requiring high reliability in the system which provides service using the database management system.

According to the present invention, a computer system is composed of a database management system and an application program. When a plurality of connections to the database management systems exist, the coincidence of the supply order of the data processing requests to the primary database management system, the backup database management system is guaranteed between those connections and a replica data can be produced without any contradiction. This is because until the multiplexed data processing request reaches the database server at least, the supply of another data processing request to the database management system is limited. Thus, the coincidence of the supply order of the data processing requests to the plurality of database management systems is guaranteed. Especially, the method is adopted of detecting that the multiplied data processing request reaches the database servers and limiting supply of another data processing request to the database management systems until all the reach responses are received. This method can carry out processing at higher speed than a method of limiting the supply of another data processing request to the database management systems until all process responses are received.

What is claimed is:

1. A method of producing a data replica on a data replica producing system that includes one or more application servers and database servers, the method comprising:
    issuing data processing requests from application programs running in the application servers;
    executing data processing corresponding to each of said data processing requests in each of the database servers;
    replying a result of the data processing as a response to one of said application programs which has issued said data processing request; and
    controlling supply of said data processing requests to said database servers by detecting receipt, by all of said database servers, of a data processing request from an application program before sending a subsequent data processing request by an application program,
    wherein said controlling comprises:
        trapping the issued data processing requests;
        multiplexing the trapped data processing request in response to process permission,
        requesting process permission of the trapped data processing request; and
        generating said process permission based on previous data processing requests in response to the request of said process permission, and
    wherein said executing comprises:
        converting said multiplexed data processing request into a data processing request peculiar to a database management system of each of said database servers, and
        said replying comprises: converting the data processing result into a data processing response as the response to said application program which has issued said data processing request.

2. The method according to claim 1, wherein said controlling comprises:
    detecting that one of the data processing requests reaches each of said database servers; and
    supplying a next one of the data processing requests to said database servers when it is detected that said one data processing request reaches each of said database servers.

3. The method according to claim 1, wherein said controlling comprises:
    receiving the data processing result as the response from each of said database servers to said application program which has issued said data processing request; and
    supplying a next one of the data processing requests to said database servers when the responses are received from said database servers.

4. A data replica producing system comprising:
    one or more application servers; and database servers,
        wherein each of said database servers comprises:
        a storage configured to store data; and
        database management system configured to manage data of said storage, execute a data processing request to reply a processing result as a data processing response,
    each of said application servers comprises an application program executed to issue the data processing request, said data replica producing system further comprises:
an order control section configured to control supply of the data processing requests by detecting receipt, by all of said database servers, of a data processing request from an application program before sending a subsequent data processing request by an application program,
wherein the controlling comprises:
trapping the issued data processing requests;
multiplexing the trapped data processing request in response to process permission,
requesting process permission of the trapped data processing request; and
generating said process permission based on previous data processing requests in response to the request of said process permission; and
wherein the executing comprises:
converting said multiplexed data processing request into a data processing request peculiar to a database management system of each of said database servers, and
the replying comprises: converting the data processing result into a data processing response as the response to the application program which has issued the data processing request.

5. The data replica producing system according to claim 4, wherein said order control section permits the supply of the data processing requests to said database servers one by one in response to completion notices from said database servers.

6. The data replica producing system according to claim 5, wherein
each of said application servers further comprises: a middle ware section configured to generate a permission request to said order control section when each of said data processing requests is received, transfers the completion notices from said database servers to said order control section, and supplies one of the data processing requests corresponding to supply permission from said order control section to said database servers, and
said order control section controls said application servers by issuing the supply permission.

7. The data replica producing system according to claim 6, wherein said middle ware section further comprises: a database connecting section provided for each of said database servers to convert the data processing request corresponding to the supply permission into a data processing request peculiar to the database management system of said database server, and to convert the data processing response from said database server into a response to said application program which has issued said data processing request.

8. The data replica producing system according to claim 6, wherein each of said database servers further comprises: a database connecting section configured to convert the data processing request corresponding to the supply permission into a data processing request peculiar to the database management system of said database server, and to convert the data processing response from said database server into a response to said application program which has issued said data processing request.

9. The data replica producing system according to claim 5, further comprising: a request control section provided for said application servers to generate a permission request to said order control section when each of said data processing requests is received, transfers the completion notices from said database servers to said order control section, and supplies one of the data processing requests corresponding to supply permission from said order control section to said database servers, and said order control section controls said application servers by issuing the supply permission.

10. The data replica producing system according to claim 9, wherein said middle ware section further comprises: a database connecting section provided for each of said database servers to convert the data processing request corresponding to the supply permission into a data processing request peculiar to the database management system of said database server, and to convert the data processing response from said database server into a response to said application program which has issued said data processing request.

11. The data replica producing system according to claim 9, wherein each of said database servers further comprises: a database connecting section configured to convert the data processing request corresponding to the supply permission into a data processing request peculiar to the database management system of said database server, and to convert the data processing response from said database server into a response to said application program which has issued said data processing request.

12. The data replica producing system according to claim 4, wherein said order control section comprises negotiating sections provided for said application servers, respectively, said negotiating section negotiates with the other negotiating sections to permit the supply of the data processing requests to said database servers one by one in response to completion notices from said database servers.

13. The data replica producing system according to claim 12, wherein each of said application servers further comprises: a middle ware section configured to generate a permission request to said order control section when each of said data processing requests is received, transfers the completion notices from said database servers to said order control section, and supplies one of the data processing requests corresponding to supply permission from said order control section to said database servers, and said order control section controls said application servers by issuing the supply permission.

14. A computer-readable medium storing a software product for realizing a method of producing a data replica, wherein said method comprising:
issuing data processing requests from application programs running in application servers;
executing data processing corresponding to each of said data processing requests in each of database servers;
replying a result of the data processing as a response to one of said application programs which has issued said data processing request; and
controlling supply of said data processing requests to said database servers by detecting receipt, by all of said database servers, of a data processing request from an application program before sending a subsequent data processing request by an application program,
wherein said controlling comprises:
trapping the issued data processing requests;
multiplexing the trapped data processing request in response to process permission,
requesting process permission of the trapped data processing request; and
generating said process permission based on previous data processing requests in response to the request of said process permission, and wherein
said executing comprises: converting said multiplexed data processing request into a data processing request peculiar to a database management system of each of said database servers, and
said replying comprises: converting the data processing result into a data processing response as the response to said application program which has issued said data processing request.

16. The computer-readable storage medium according to claim 14, wherein said controlling comprises: detecting that one of the data processing requests reaches each of said database servers; and supplying a next one of the data processing requests to said database servers when it is detected that said one data processing request reaches each of said database servers.

16. The computer-readable storage medium according to claim 14, wherein said controlling comprises: receiving the data processing result as the response from each of said database servers to said application program which has issued said data processing request; and supplying a next one of the data processing requests to said database servers when the responses are received from said database servers.

* * * * *